United States Patent [19]
Thomas

[11] Patent Number: 5,996,626
[45] Date of Patent: Dec. 7, 1999

[54] SLEEVE FOR ROTARY VALVE

[75] Inventor: Andrew Donald Thomas, East Ryde, Australia

[73] Assignees: A.E. Bishop & Associates PTY Limited, North Ryde; Unisearch Ltd., Kensington, both of Australia

[21] Appl. No.: 09/207,616

[22] Filed: Dec. 9, 1998

Related U.S. Application Data

[60] Division of application No. 08/848,070, Apr. 29, 1997, Pat. No. 5,881,771, which is a continuation-in-part of application No. PCT/AU96/00266, May 3, 1996.

[30] Foreign Application Priority Data

| May 5, 1995 | [AU] | Australia | PN 2835 |
| Jun. 8, 1995 | [AU] | Australia | PN 3436 |
| Nov. 30, 1995 | [AU] | Australia | PN 6876 |

[51] Int. Cl.⁶ ..................................................... F15B 9/10
[52] U.S. Cl. ..................................... 137/625.23; 91/375 A
[58] Field of Search ...................... 91/375 A; 137/625.23

[56] References Cited

U.S. PATENT DOCUMENTS

| 4,335,749 | 6/1982 | Walter . | |
| 4,470,432 | 9/1984 | Kervagoret | 91/375 A X |
| 4,471,808 | 9/1984 | Thomsen et al. . | |
| 4,561,516 | 12/1985 | Bishop et al. | 180/142 |
| 4,577,660 | 3/1986 | Haga et al. . | |
| 4,848,402 | 7/1989 | Elser et al. . | |
| 5,263,512 | 11/1993 | Emori et al. . | |
| 5,267,588 | 12/1993 | Bishop et al. . | |

*Primary Examiner*—Gerald A. Michalsky
*Attorney, Agent, or Firm*—Nikaido, Marmelstein, Murray & Oram, LLP

[57] ABSTRACT

A rotary valve of a hydraulic power steering gear includes an input-shaft journalled within a sleeve. In the bore of the sleeve, an array of eight axially extending blind-ended slots and an array of two primary and two secondary axially extending return channels are formed. The primary return channels are diametrically opposed, and the secondary return channels are diametrically opposed. The return channels extend to at least one axial extremity of the bore to communicate hydraulic fluid to a return port. Further, the radial depth of the secondary return channels is substantially less than the radial depth of the primary return channels at or near the axial extremity.

10 Claims, 39 Drawing Sheets

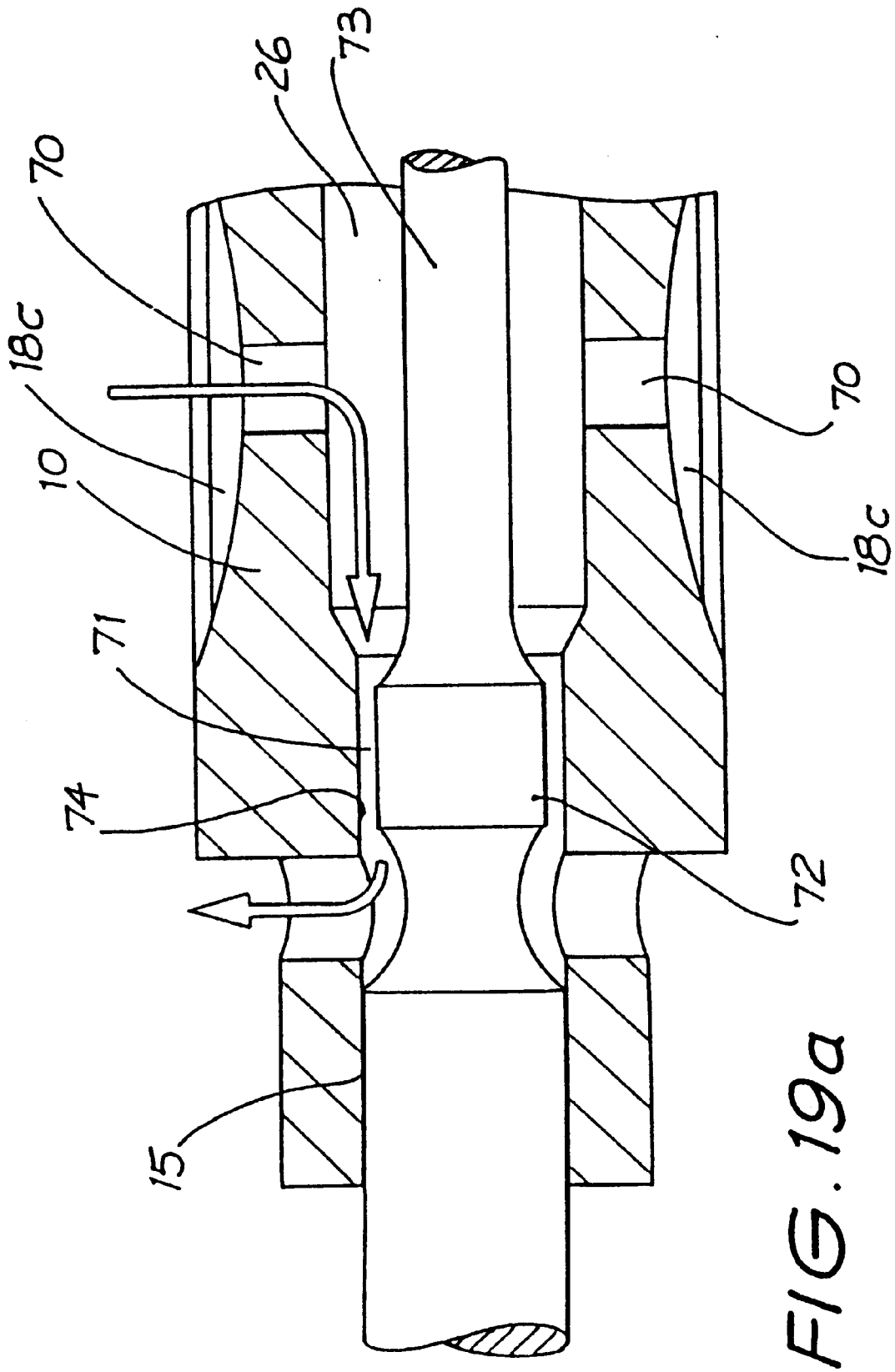

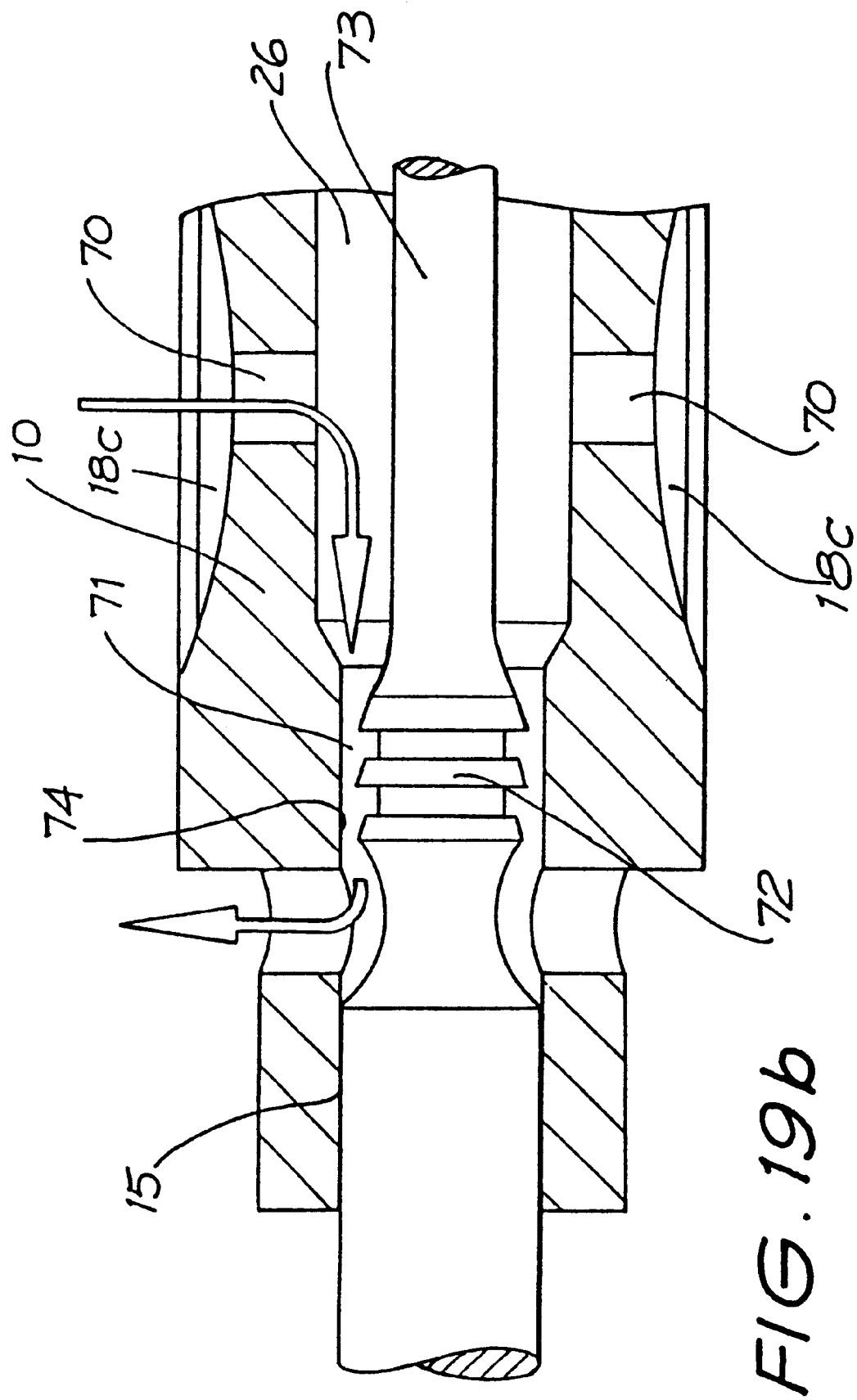

SLEEVE FOR ROTARY VALVE

This application is a divisional of U.S. application Ser. No. 08/848,070 filed Apr. 29, 1997, now U.S. Pat. No. 5,881,771, which is a Continuation-in-part of PCT International Application Number PCT/AU96/00266, filed May 3, 1996.

TECHNICAL FIELD

This invention relates to rotary valves such as are used in hydraulic power steering gears for vehicles. More particularly the present invention provides low noise rotary valves offering flexibility in the design of the boost characteristic.

BACKGROUND ART

Such rotary valves typically include an input-shaft which incorporates in its outer periphery a plurality of blind-ended, axially extending grooves separated by lands. Journalled on the input-shaft is a sleeve having in its bore an array of axially extending blind-ended slots circumferentially aligned with the lands on the input-shaft. The interfaces between the coacting input-shaft grooves and sleeve slots define axially extending orifices which open and close when relative rotation occurs between the input-shaft and the sleeve. The sides of the input-shaft grooves are contoured so as to provide a specific orifice configuration and are referred to as metering edge contours. These orifices are ported as a network such that they form sets of hydraulic Wheatstone bridges which act in parallel. Such hydraulic Wheatstone bridges are analogous in operation to conventional electrical Wheatstone bridges.

Drilled passages in the input-shaft and sleeve, together with circumferential grooves in the periphery of the sleeve, serve to communicate oil between the grooves in the input-shaft and the slots in the sleeve, a hydraulic pump, and right-hand and left-hand hydraulic assist cylinder chambers incorporated in the steering gear.

A torsion bar incorporated in the input-shaft serves to urge the input-shaft and sleeve towards a neutral, centred position when no power assistance is required. When input torque is applied by the driver to the steering wheel, the torsion bar deflects, causing relative rotation of the sleeve and input-shaft from the neutral position. This so called "valve operating angle" imbalances the sets of hydraulic Wheatstone bridges and hence causes a differential pressure to be developed between the right-hand and left-hand cylinder chambers. The "boost characteristic" of the rotary valve, that is the functional relationship between the above mentioned input torque and differential pressure, is largely determined for a given steering gear application by the geometry of the metering edge contours.

Traditionally the networl( of orifices in a rotary valve employ 2, 3 or 4 Wheatstone bridges, necessitating respectively 4, 6 or 8 input-shaft grooves and sleeve slots. Each Wheatstone bridge comprises a right-hand and a left-hand oil flow path, henceforth termed "limbs", and each right-hand and left-hand limb in turn comprises upper and lower portions. The upper and lower portions of each right-hand and left-hand limb meet respectively at a point of connection to the right-hand and left-hand cylinder chamber, henceforth termed the right-hand and left-hand "cylinder ports" of the valve.

In the neutral position of the rotary valve, oil from the hydraulic pump divides and enters each Wheatstone bridge at the valve "inlet port". At this point flow further divides and enters the upper right-hand and left-hand limbs, each containing an "inlet orifice". After being metered through such inlet orifices, oil is communicated to the respective cylinder ports and to the respective interconnection to the lower limbs. Depending on the intercylinder flow rate drawn by the motion of the piston in the cylinder chamber, oil continues to flow through the tower right-hand and left-hand limbs, metering through a "return orifice" in each limb, and recombining immediately upstream of the "return port" of the rotary valve.

The networl of two inlet orifices and two return orifices, constituting each Wheatstone bridge, is ported in the rotary valve such that, for a given relative angular displacement of the input-shaft and sleeve from their neutral position, mutually opposite orifices on each Wheatstone bridge simultaneously close or open. For example, the left-hand inlet and right-hand return orifices both close (ie. increase in restriction to oil flow) while the right-hand inlet and left-hand return orifices both open (ie. decrease in restriction to oil flow). According to classical Wheatstone bridge theory, for a given oil flow through each Wheatstone bridge, a differential pressure is therefore developed between the right-hand and left-hand cylinder ports, providing the necessary level of power assistance for each value of valve operating angle.

The general method of operation of such traditional rotary valves is well known in the prior art of power steering design and described in greater detail in U.S. Pat. No. 3,022,772 (Zeigler et al), commonly held as being the "original" patent describing the rotary valve concept. Rotary valves of this format will henceforth be termed "direct mode valves" since all Wheatstone bridges within the valve incorporate direct hydraulic communication to the cylinder ports.

Rotary valves are nowadays regularly incorporated in firewall-mounted rack and pinion steering gears, and in this situation, any noises such as hiss emanating from the valve are very apparent to the driver. Hiss results from cavitation of the hydraulic oil as it flows in the orifices defined by the metering edge contours and the adjacent edges of the sleeve slots, particularly during times of high pressure operation of the valve such as during parking, where differential pressures of 8–10 MPa or more can be generated. It is well known in the art of power steering valves that an orifice is less prone to cavitation if the associated metering edge contour has a high aspect ratio of axial length to radial depth, thereby constraining the oil to flow as a thin sheet of constant depth along the full axial extent of one metering edge contour and if, furthermore, the flow of oil is evenly divided amongst several metering edge contours ported to act in parallel, so further effectively reducing the flow of oil that may flow through any one orifice. It is also well known that cavitation is less likely to occur if the metering edge contour, where it intersects the outside diameter of the input-shaft, is nearly tangential thereto, hence constituting a shallow chamfer typically inclined at an angle of between 4 deg and 8 deg.

Such shallow chamfers have been widely used in rotary valves for noise suppression over the last 20 years. In order to achieve the necessary depth and form accuracy, these chamfers are normally ground in special indexable or cam-type grinding machines resulting in long overall cycle times, relatively expensive capital equipment, and hence high overall manufacturing cost.

Another requirement which is increasingly becoming accepted for the design of rotary valves is the need for a linear boost characteristic. During vehicle cornering, it is advantageous that a substantially linear relationship exists between the driver's input torque and the differential pressure associated with such a cornering manoeuvre. This leads to the sensation of "progression" in the power assistance and maximises steering feel in such critical situations. Associated with the requirement for a linear boost characteristic, it is also highly desirable to maximise the extent of the linear region before the maximum parking torque (and hence parking pressure) is reached. This necessitates a fast transition or "turn-around" of the linear boost characteristic to a region of much steeper slope associated with the higher differential pressures used for parking. For a given slope and extent of the linear boost characteristic of the rotary valve during cornering, the torque required to be exerted by the driver during parking is therefore minimised.

Chamfer type metering edge contours can, to some limited degree, generate a low noise linear boost characteristic if the chamfer is designed as a scroll, as disclosed in U.S. Pat. No. 5,267,588 (Bishop et al), or as a series of flat facets, as disclosed in U.S. Pat. No. 4,460,016 (Haga et al). However, in both these cases, the extent of the linear boost region is relatively short and the transition to the steeper parking region of the boost characteristic is prolonged, and therefore not optimal in terms of minimising parking torque.

Another technique, well known in the art, for suppressing valve noise in power steering valves is the application of back pressure to an otherwise cavitating orifice, thereby raising pressures within the orifice above the vapour pressure of the hydraulic oil and hence preventing the onset of cavitation. Chamfer style metering edge contours need not necessarily be used on the input-shaft if this alternative method of noise suppression is employed. Much steeper and axially shorter metering edge contours can in fact be used, contours which would otherwise be excessively noisy in the absence of such back pressure. Such steeper and generally more complex shaped metering edge contours can be manufactured by coining, roll-imprinting or traditional hobbing methods and, if appropriately designed, can generate the previously described desirable linear boost characteristic with a fast turn-around. U.S. Pat. No. 4,335,749 (Walter) shows a direct mode valve incorporating an extra (second) orifice in the lower portions of the left-hand and right-hand limbs of each bridge. This orifice progressively closes with increasing valve operating angle until a constant orifice area is reached which, based on the flow through the limb, applies a predetermined back pressure to the closing upstream inlet orifice. Such a valve format is based on 6 orifices per bridge and, if 3 bridges are employed in the valve, requires 9 input-shaft grooves and 9 sleeve slots. If 4 bridges are employed (as in the case of a traditional 8 groove/slot rotary valve), 12 input-shaft grooves and 12 sleeve slots are required. This format is therefore non-standard and requires extra manufacturing cost.

Further however, experiments have shown that elimination of cavitation noise in an orifice generating 10 MPa (say) differential pressure requires a downstream back pressure to be applied which is as much as 1 MPa or more . If such high levels of back pressure were generated by the return orifices according to the methodology disclosed in U.S. Pat. No. 4,335,749 (Walter), this back pressure would raise the inlet pressure required to be supplied by the hydraulic pump by the same 1 MPa, without any of this additional pressure being applied differentially at the cylinder chamber. This is because this direct mode valve arrangement contains cylinder port connections in every bridge and the return orifice used for back pressure generation is downstream of such connections. The 1 MPa increase in valve inlet pressure would be totally wasted in terms of generating power assistance force and would simply raise the operating pressure of the hydraulic pump. The latter situation is highly undesirable since energy loss in the hydraulic system is proportionally increased. Also pump noise, leakage and potential hydraulic line failure all become bigger problems as the pump relief valve setting is necessarily increased to accommodate the increased valve operating pressure, for example from 10 MPa to 11 MPa in this case.

For this reason the practical level of back pressure that can be applied by the return orifice according to the above prior art invention is limited to about 300–400 kPa, well short of the 1 MPa or more needed to substantially eliminate cavitation noise through the operating pressure range of the power steering valve.

Another class of rotary valve, henceforth termed "bypass mode valves", is quite distinct from the class of direct mode valves earlier described. Bypass mode valves also utilise parallel arrangements of Wheatstone bridges, however not all bridges in this case contain a hydraulic connection to a cylinder port between the inlet and return orifices. The bridges which employ a cylinder connection will henceforth be termed "primary bridges" and those which don't employ a cylinder connection termed "secondary bridges". In the latter case the left-hand and right-hand limbs contain one or more inlet and return orifices but with no interposed cylinder port connection. In this manner, for certain valve operating angles, hydraulic oil at least partially by-passes the primary bridge(s) which incorporate the connection to the cylinder.

Such bypass mode valves were first put forward for speed sensitive power steering applications. For example, arrangements described in U.S. Pat. Nos. 4,570,735 (Duffy) and 4,570,736 (Waldorf) and Japanese Patent 04-031175 (Suzuki et al) involve a bypass mode valve with an electronically modulated variable orifice residing in the inlet to the secondary bridges and modulated as a function of vehicle speed. Other later arrangements such as shown in Japanese Patent 02-306878 (Suzuki) and U.S. Pat. No. 5,092,418 (Suzuki et al) use an electronically modulated variable orifice residing in the return line from the secondary bridges. In such speed sensitive applications, the degree of bypass of hydraulic oil through the secondary bridges is used to control the boost characteristic as a function of vehicle speed.

Bypass mode valves have also been utilised in a non-speed sensitive format to improve the linearity and produce a fast turn-around of the boost characteristic for valves employing chamfered metering edge contours. For example Japanese Patents 04-031176, 05-042880 and 06-278623 (all Suzuki et al) and U.S. Pat. No. 4,470,432 (Kervagoret) show orifice networks very similar to the abovementioned speed sensitive applications except that the electronically modulated variable orifice is now a fixed "drill-hole" style orifice either upstream or downstream of the secondary bridges. In situations where relatively conventional metering edges are used in the orifices of the secondary bridges, such arrangements will tend to be noisy for two reasons. Firstly the very low aspect ratio of the fixed orifices (ie. unity for a drill hole will be a source of cavitation for the relatively high oil flows involved. Secondly in these arrangements, for high valve operating pressures, all pump flow is communicated to the return port via only two stages of pressure drop: the restrictions offered by relevant closing secondary orifice and the fixed orifice (or vice versa).

U.S. Pat. No. 4,577,660 (Haga) shows an 8 slot by-pass valve again intended to produce a linear boost characteristic with a fast turn around. In this case the secondary inlet orifices are overlapped and in fact closed on-centre, their sudden opening off-centre intended to produce the required discontinuity in the boost characteristic. However such an arrangement, with a substantial portion of the valve closed on-centre, would naturally exhibit higher than usual back pressure on-centre and would therefore be energy inefficient.

Japanese Patent 04-292265 (Suzuki et al) shows a relatively complex by-pass mode valve employing 10 input-shaft grooves and corresponding 10 sleeve slots. An extra orifice is positioned in the lower portion of each secondary bridge limb and, as it closes, provides a similar flow redistribution function to the earlier mentioned fixed orifice. Such a valve arrangement is expensive because of the larger quantity of input-shaft grooves and sleeve slots, and the associated interconnecting porting (eg. drill holes) to hydraulically communicate such slots/grooves. Moreover 10 input-shaft grooves and 10 sleeve slots are difficult to package using a standard input-shaft outside diameter (or corresponding sleeve inside diameter), typically in the range 19.0–22.5 mm, and yet still retain sufficient inter and intra slot/groove spacing to accommodate such interconnecting porting.

However the nature of the diversion of oil flow in bypass mode valves between the primary and secondary bridges means that, when such valves generate a large differential pressure at the cylinder, essentially only the secondary bridges transmit any oil flow. This means that the individual orifices in the secondary bridges tend to be prone to cavitation noise even if shallow chamfers are employed as the metering edge contours according to the prior art. Japanese Patent 05-310136 (Suzuki et al) proposes to reduce this problem by employing an electronically modulated variable orifice positioned at the return port of a bypass mode valve, this variable orifice controlled to produce a restriction (and hence generate back pressure) as a function of the sensed inlet pressure to the valve. For reasons earlier described, such an arrangement is energy inefficient and, moreover in this case, adds significant cost to the power steering system.

Nevertheless, bypass mode valves do offer a major advantage over direct mode valves in that, any back pressure applied within the secondary bridge network to suppress cavitation noise generated by the respective orifices does not raise the overall inlet pressure to the valve, as supplied by the hydraulic pump, for a given differential pressure applied at the cylinder. Hence such back pressure is not wasteful in terms of energy and in fact is usefully used to generate some portion of the power assistance at the cylinder. There is therefore no need to use higher pump relief valve settings and the previously referred to large levels of back pressure (eg. 1 MPa) can be theoretically utilised to substantially eliminate cavitation noise without any major disadvantage in terms of valve function.

The first and second aspects of the present invention are directed at utilising the above mentioned benefits of bypass mode valves, and yet provide low levels of cavitation noise in a rotary valve without necessarily increasing the number of input-shaft grooves or sleeve slots. Another aim is to permit such low levels of cavitation noise to be achieved using metering edge contours of the more steeply sloping variety earlier referred to. Such metering edge contours can be produced by coining, roll-imprinting or hobbing and not only offer significant cost savings compared to shallow chamfers which generally must be ground, but also enable much more flexibility in the design of the boost characteristic, particularly the provision of a linear boost characteristic with a fast turn-around. Also such steeply sloping metering edge contours can generally be designed to be axially shorter than the comparable shallow chamfer, enabling the overall rotary valve package to be likewise shortened.

The first aspect of the present invention consists in a rotary valve for a hydraulic power steering gear comprising a valve housing having an inlet port to receive hydraulic fluid from a pump, a return port to return hydraulic fluid to the pump, and cylinder ports to communicate hydraulic fluid to left and right-hand cylinder chambers of the power steering gear, the valve also comprising an input-shaft having in its outer periphery a plurality of axially extending grooves separated by lands, a sleeve journalled on said input-shaft, said sleeve having in its bore an array of axially extending slots circumferentially aligned with the lands on the input-shaft, the interfaces between the coacting input-shaft grooves and sleeve slots defining axially extending orifices controlling fluid flow within the valve, the orifices opening and closing when relative rotation occurs between the input-shaft and sleeve from a neutral position, the orifices being ported as a network such that they form one or more primary and one or more secondary hydraulic Wheatstone bridges arranged in parallel, each said bridge comprising two limbs hydraulically communicating the inlet and return ports, each said limb containing an inlet orifice hydraulically communicating to the inlet port and a return orifice hydraulically communicating to the return port, the magnitude of the hydraulic flow through each bridge varying in accordance with the restriction offered by the respective inlet and return orifices in that bridge, the limbs of the primary bridge incorporating means providing hydraulic communication to one of the cylinder ports at a point of interconnection of the respective inlet and return orifices in that limb, the limbs of the secondary bridge not incorporating means providing hydraulic communication to the cylinder ports, characterised in that the return orifice in each limb of said secondary bridge is formed by a metering edge contour on the edge of the secondary return groove associated with said return orifice, said metering edge contour circumferentially overlapping the adjacent sleeve bore land when the rotary valve is in its neutral position to such an extent that said return orifice provides a restriction to hydraulic flow as the upstream inlet orifice in the same limb closes for all valve operating angles from said neutral position, said return orifice applying a back pressure to said upstream inlet orifice, said back pressure being sufficient to significantly suppress the generation of cavitation noise in said inlet orifice.

It is preferred that a substantially constant restriction area is provided by said return orifice as the upstream inlet orifice in the same limb closes for all valve operating angles from said neutral position.

It is preferred that the input-shaft metering edge contour employed in said return orifice is formed in cross-section such that a region of locally reduced metering edge depth lies in the overlapped region of the coacting input-shaft metering edge contour and adjacent sleeve bore land, that is in the region lying radially inside the adjacent sleeve land. Said substantially constant restriction area provided by said return orifice can be considered as constituting a hydraulic throat which serves to significantly suppress cavitation noise or turbulence as the hydraulic oil flows past the adjacent sleeve edge and enters this return orifice.

It is preferred that cavitation and other flow noise can be further reduced by raising the back pressure downstream of the secondary return orifice.

It is preferred that hydraulic flow from the primary bridge is hydraulically communicated to the return port via a primary return path and the hydraulic flow from the secondary bridge is hydraulically communicated to the return port via a secondary return path, a restriction existing in the secondary return path.

In first and second embodiments it is preferred that the secondary return path passes through the bore of the input-shaft.

In a first embodiment it is preferred that the radial holes which hydraulically communicate the secondary return groove to the input-shaft bore are reduced in diameter, thereby generating back pressure in the secondary return groove downstream of the secondary return orifice.

The capability of these radial holes to apply such back pressure without themselves causing a noise problem can be further enhanced if conical or tapered entries are employed on these holes. This can be readily and cheaply achieved via a step form on the drill used to machine these holes or by laser erosion.

In the case of this first embodiment, it is also preferred that the primary return path also passes through the bore of the input-shaft. However the radial holes which hydraulically communicate the primary return grooves to the input-shaft bore are sufficiently large in diameter in this case that no substantial restriction is generated.

In a second embodiment, and also in a later referred to fifth embodiment, the restriction existing in the secondary return path is preferably annular in geometry. It is preferred that this annular restriction has a cross-section to flow which has a high aspect ratio, in order to suppress its generation of cavitation noise. In this second embodiment it is preferred that only the secondary return path passes through the bore of the input-shaft. Oil entering the input-shaft bore via the aforementioned radial holes is restricted using a diametrically enlarged portion on the torsion bar. This enlarged portion is arranged to have a small radial clearance with respect to the input-shaft bore, hence creating an annular restriction for hydraulic oil as it flows axially in this bore towards the return port of the valve housing.

According to this embodiment, hydraulic oil from the primary bridge is ported directly to the return port so that it is not required to flow through the input-shaft bore, and hence is not subject to this additional restriction. This is achieved by axially extending the input-shaft grooves associated with the primary return orifices in the form of channels, allowing hydraulic oil flow in the primary bridge to exit directly axially from these grooves through these channels.

The diametrically enlarged portion of the torsion bar can be integrally machined as part of the torsion bar during its manufacture. However, in order to maximise the working length of the reduced diameter portion of the torsion bar, and hence lower the maximum stress endured by the torsion bar for a given working diameter and torsional spring rate, the diametrically enlarged portion on the torsion bar is preferably formed as an annular bush which is plastic moulded around the metallic portion of the torsion bar as a separate subsequent operation. The plastic material must be chemically resistant to hydraulic oil and is preferably an engineering plastic such as Delrin® or Lurathane®.

If the annular bush is made to additionally extend axially such that it overlaps the secondary return radial holes in the input-shaft, the use of such compliant plastic material for this bush has been found to assist dampening the hydraulic turbulence noise generated by the secondary return oil as it flows radially into the input-shaft bore and thence necessarily turns perpendicularly to continue flowing axially down this bore.

In a third embodiment it is preferred that the secondary return path does not pass through the bore of the input-shaft. Axially extending secondary return channels are formed in the sleeve bore which are circumferentially aligned with the secondary return grooves. The channels extend to the axial extremity of the sleeve bore and arranged to communicate hydraulic fluid to the return port. The radial depth of the channels is small, thereby interacting with the adjacent outside diameter of the input-shaft to form a high aspect ratio restriction in the secondary return path downstream of the secondary return grooves. It is preferred that at least one secondary return channel extends to both axial extremities of the sleeve bore.

It is also preferred that axially extending primary return channels are formed in the sleeve bore and arranged to be circumferentially aligned with the primary return grooves. These additional channels also extend to the axial extremity of the sleeve bore and are arranged to communicate hydraulic fluid to the return port. It is preferred that the radial depth of the primary return channels is larger than that of the aforementioned shallow secondary return channels since no restriction is required to be generated in the primary return path. It is also preferred that at least one of the primary return channels extends to both axial extremities of the sleeve bore.

For reasons of ease of manufacture, it is preferred that all primary and secondary return channels extend to both axial extremities of the sleeve bore, enabling all such channels to be formed with a single multi-tooth broaching tool.

In a fourth embodiment it is also preferred that the secondary return path does not pass through the bore of the input-shaft. The secondary return grooves are axially extended as shallow, high aspect ratio channels formed via their interaction with the adjacent sleeve bore. These channels extend to the axial extremity of the sleeve bore, thereby providing a restriction in the secondary return path. It is also preferred that the primary return grooves are similarly axially extended as radially deeper channels to facilitate a relatively unrestricted primary return path.

In a fifth embodiment is is also preferred that the secondary return path does not pass through the bore of the input-shaft. The secondary return grooves are axially extended in at least one direction to communicate with an annular cavity formed by the interaction of a reduced diameter portion of the input-shaft outer periphery and the sleeve bore. The annular cavity acts as a manifold to gather secondary return oil flow, which is then communicated via an annular restriction to the return port. The annular restriction is preferably generated by a predetermined small radial clearance existing between the above mentioned reduced diameter portion of the input-shaft and the inside diameter of a radially inwardly extending portion of the sleeve bore. Preferably the radially inwardly extending portion of the sleeve bore is formed as an accurately internally and externally sized annular pressed-metal cup which is press-fitted inside the sleeve skirt to seal against the axial extremity of the sleeve bore. Preferably the predetermined radial clearance is such that the resulting annular restriction has a high aspect ratio in order to suppress its generation of cavitation noise. It is also preferred that the primary return path passes through the bore of the input-shaft in a similar manner to that described in reference to the first embodiment, thereby bypassing the annular restriction en-route to the return port.

It is preferred that the rotary valve has eight input-shaft grooves.

It is preferred that the rotary valve has eight sleeve slots.

The second aspect of the present invention consists in a rotary valve for a hydraulic power steering gear comprising a valve housing having an inlet port to receive hydraulic fluid from a pump, a return port to return hydraulic fluid to the pump, and cylinder ports to communicate hydraulic fluid to left and right-hand cylinder chambers of the power steering gear, the valve also comprising an input-shaft having in its outer periphery a plurality of axially extending grooves separated by lands, a sleeve journalled on said input-shaft and rotationally secured to a driven member, said sleeve having in its bore an array of axially extending slots circumferentially aligned with the lands on the input-shaft, the interfaces between the coacting input-shaft grooves and sleeve slots defining axially extending orifices controlling fluid flow within the valve, the orifices opening and closing when relative rotation occurs between the input-shaft and sleeve from a neutral position, a torsion bar residing in a bore of the input-shaft compliantly connecting the input-shaft and driven member, and arranged to urge the sleeve and input-shaft to the neutral position, the orifices being ported as a network such that they form one or more primary and one or more secondary hydraulic Wheatstone bridges arranged in parallel, each said bridge comprising two limbs hydraulically communicating the inlet and return ports, each said limb containing an inlet orifice hydraulically communicating to the inlet port and a return orifice hydraulically communicating to the return port, the magnitude of the hydraulic flow through each bridge varying in accordance with the restriction offered by the respective inlet and return orifices in that bridge, the limbs of the primary bridge incorporating means providing hydraulic communication to one of the cylinder ports at a point of interconnection of the respective inlet and return orifices in that limb, the limbs of the secondary bridge not incorporating means providing hydraulic communication to the cylinder ports, characterised in that hydraulic flow from said primary bridge is hydraulically communicated to the return port via a primary return path and the hydraulic flow from the secondary bridge is hydraulically communicated to the return port via a secondary return path, an annular restriction existing in the secondary return path.

It is preferred that the annular restriction existing in the secondary return path has a cross-section to flow which has a high aspect ratio.

It is preferred that the aspect ratio be greater than 10.

It is preferred that one but not both of the primary or secondary return paths passes through the bore of the input-shaft.

In a first embodiment it is preferred that the secondary return path passes through the bore of the input-shaft and the annular restriction is formed within this bore.

It is preferred that the annular restriction formed in the bore of the input-shaft is generated by virtue of a small radial clearance existing between a diametrically enlarged portion of the torsion bar and the input-shaft bore.

It is preferred that hydraulic flow from the primary bridge is directly communicated to the return port via channels formed as an axial extension of the input-shaft grooves associated with the primary return orifices. Because this hydraulic flow is not communicated through the input-shaft bore, it is not subject to the abovementioned annular restriction.

Various preferred embodiments are possible for the geometry and construction of the diametrically enlarged portion of the torsion bar and have already been described in reference to the first aspect of the present invention.

In a second embodiment is is preferred that the secondary return path does not pass through the bore of the input-shaft and the annular restriction is formed at the input-shaft/sleeve interface. The secondary return grooves are axially extended in at least one direction to communicate with an annular cavity formed by the interaction of a reduced-diameter portion of the input-shaft outer periphery and the sleeve bore. The annular cavity acts as a manifold to gather secondary return oil flow, which is then communicated via an annular restriction to the return port. The annular restriction is preferably generated by a predetermined small radial clearance existing between the above mentioned reduced diameter portion of the input-shaft and the inside diameter of a radially inwardly extending portion of the sleeve bore. Preferably the radially inwardly extending portion of the sleeve bore is formed as an accurately internally and externally sized annular pressed metal cup which press-fitted inside the sleeve skirt to seal against the axial extremity of the sleeve bore. Preferably the predetermined radial clearance is such that the resulting annular restriction has a high aspect ratio in order to suppress its generation of cavitation noise. It is also preferred that the primary return path passes through the bore of the input-shaft in a similar manner to that described in reference to the first embodiment of the first aspect of the present invention, thereby bypassing the annular restriction en-route to the return port.

In the case of both first and second embodiments of the second aspect of the present invention, hydraulic flow from the secondary bridge passes axially through the relevant annular restrictions and hence applies a back pressure to all secondary orifices upstream of this restriction. The restriction area is therefore substantially constant and arranged to provide sufficient back pressure to suppress the generation of cavitation noise in these secondary orifices for all valve operating angles.

It is preferred that the rotary valve has eight input-shaft grooves.

It is preferred that the rotary valve has eight sleeve slots.

BRIEF DESCRIPTION OF THE DRAWINGS

In order that the first and second aspects of the present invention may be better understood, various embodiments thereof are now described, by way of example, with reference to the accompanying drawings, in which.

BEST MODES

Figure 1:
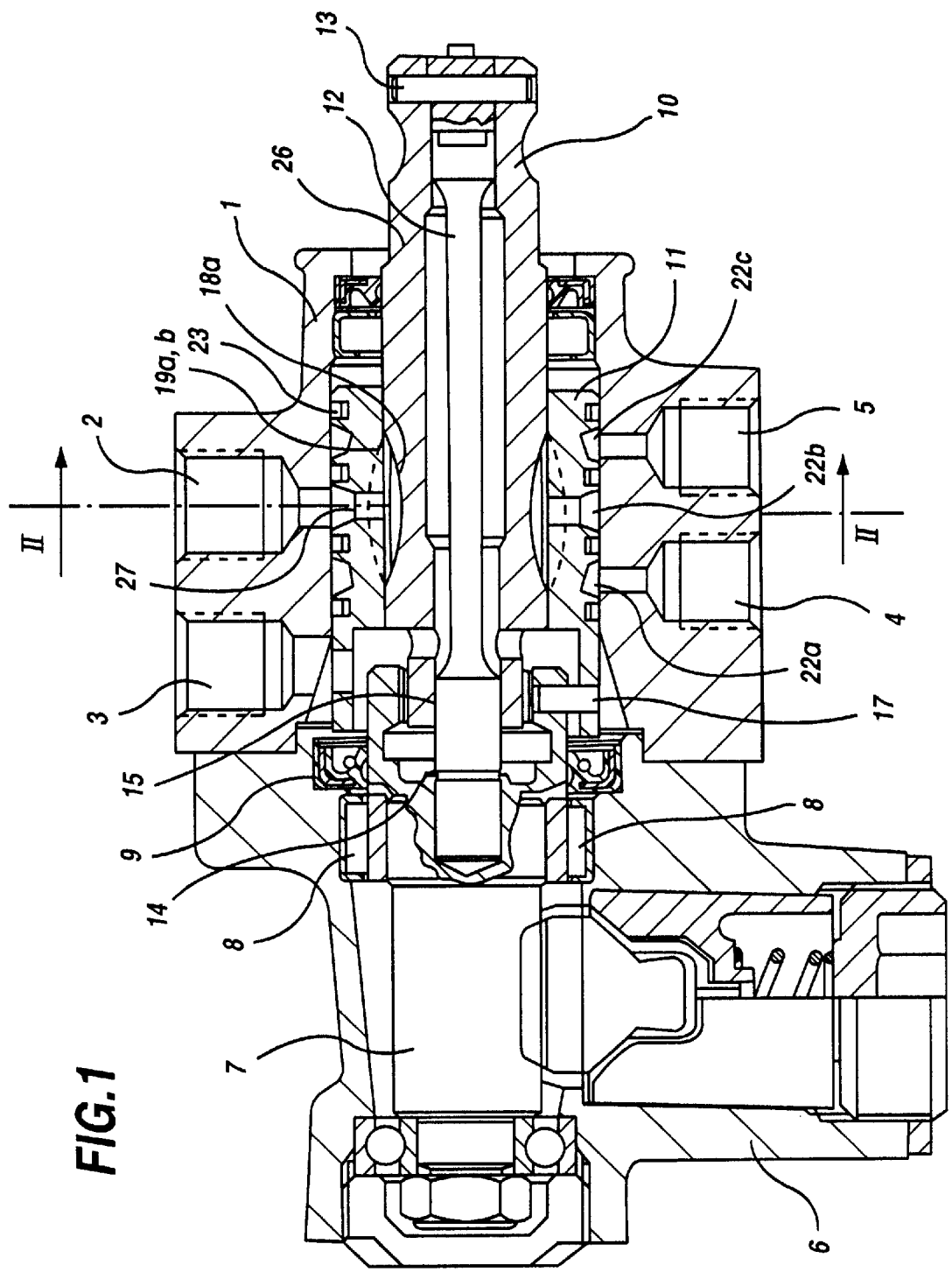
FIG. 1 is an axial cross-sectional view on plane I—I in FIG. 2 of a rotary valve installed in a valve housing of a power steering gear according to a first embodiment of the first aspect of the present invention.

FIGS. 1–15 and FIG. 21 refer to a first embodiment of the first aspect of the present invention. Referring to FIG. 1 valve housing 1 is provided with pump inlet and return ports 2 and 3 respectively and right and left-hand cylinder ports 4 and 5. Steering gear housing 6, to which valve housing 1 is attached, contains the mechanical steering elements, for example, a driven member in the form of pinion 7, journalled by needle roller bearing 8 and provided with seal 9. The three main rotary valve elements comprise input-shaft 10, sleeve 11 journalled thereon, and torsion bar 12. Torsion bar 12 is secured by pin 13 to input-shaft 10 at one end, and secured by swageing 14 to pinion 7 at the other. Torsion bar 12 also provides a journal for input-shaft 10 at overlapping portion 15. Sleeve 11 has an annular extension having therein hole 16 engaging pin 17 extending radially from pinion 7.

Figure 2:
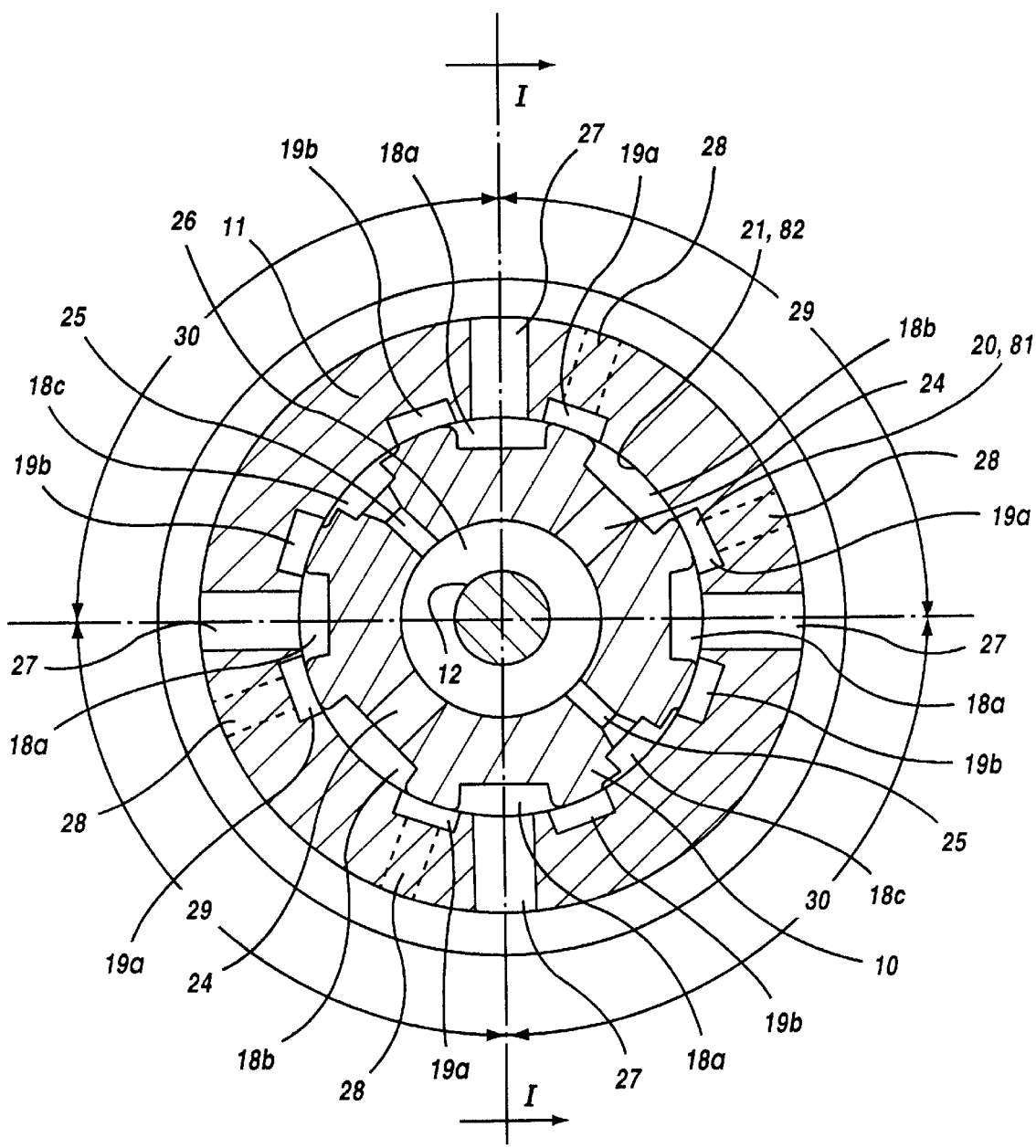
FIG. 2 is a cross-sectional view of the input-shaft and surrounding sleeve components of the rotary valve on plane II—II in FIG. 1.

Referring now also to FIG. 2, input-shaft 10 incorporates on its outside diameter 20 eight axially extending, blind-ended grooves 18a–c separated by lands 81: four grooves of the type indicated as 18a, two of the type indicated as 18b, and two of the type indicated as 18c. Sleeve 11 incorporates in its bore 21 an array of eight axially extending, blind-ended slots 19a–b separated by lands 82: four slots of the type indicated as 19a and four of the type indicated as 19b. Slots 19a–b are circumferentially aligned with lands 81 on input-shaft 10. Similarly grooves 18a–c are circumferentially aligned with lands 82 on bore 21 of sleeve 11.

Metering edge contours are formed on the sides of all eight grooves 18a–c and coact with the respective adjacent edges of slots 19a–b to define sixteen axially extending orifices which open and close when relative rotation occurs between input-shaft 10 and sleeve 11.

Sleeve 11 is also provided on its outside periphery with three axially spaced circumferential grooves 22a–c separated by high pressure seals 23 (see FIG. 1). Radial holes 24 and 25 in input-shaft 10 hydraulically communicate grooves 18b and 18c respectively to bore 26 of input-shaft 10, whence return oil can flow back to the pump reservoir (not shown) via return port 3.

Radial holes 27 in sleeve 11 hydraulically communicate the remaining four alternate grooves 18a of input-shaft 10 to the central circumferential groove 22b, and so to the supply from the hydraulic pump (not shown) via inlet port 2.

Radial holes 28 in sleeve 11 hydraulically communicate pairs of adjacent slots 19a of sleeve 11 to circumferential grooves 22a and 22c and thence to the right-hand and left-hand cylinder chambers (not shown) via right-hand cylinder port 4 and left-hand cylinder port 5 respectively.

The aforementioned sixteen axially extending orifices in the rotary valve are ported as a network such that they form a set of four hydraulic Wheatstone bridges: two primary bridges residing in sectors 29 of the valve and two secondary bridges residing in sectors 30. The parallel action of the diametrically opposed bridges of the same type ensures that substantially zero net side force is produced on the input-shaft due to the pressure distribution in the valve, minimising friction at the input-shaft/sleeve journal interface. The two primary bridges 29 are seen to incorporate hydraulic communication to cylinder ports 4 and 5 via radial holes 28, a feature absent in the two secondary bridges 30.

Four styles of metering edge contours (henceforth termed "metering edges") are employed on input-shaft 10, defining four types of orifices in the rotary valve: inlet and return orifices in the primary bridges henceforth termed primary inlet and primary return orifices respectively, and inlet and return orifices in the secondary bridges henceforth termed secondary inlet and secondary return orifices respectively.

Figure 3:
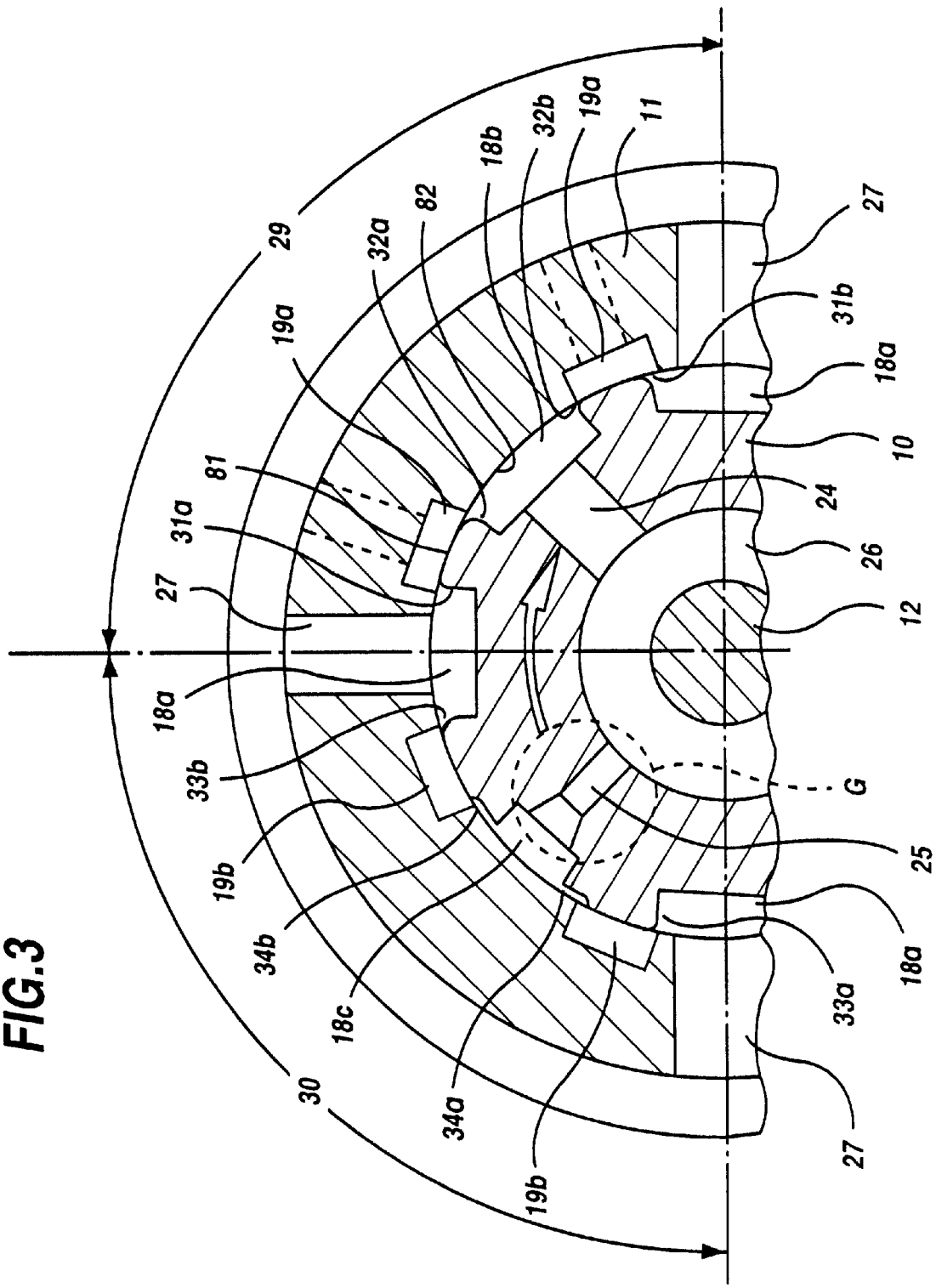
FIG. 3 is an enlarged version of the upper half of the cross-sectional view shown in FIG. 2, indicating the orifices in the primary and secondary bridges.

FIG. 3 shows the upper half of FIG. 2 at a greater scale, and therefore incorporates a single primary bridge 29 and a single secondary bridge 30. Primary inlet orifices 31a, 31b are formed at the interface of coacting input-shaft grooves 18a and sleeve slots 19a. Primary return orifices 32a, 32b are formed at the interface of coacting input-shaft grooves 18b and sleeve slots 19a. Secondary inlet orifices 33a, 33b are formed at the interface of coacting input-shaft grooves 18a and sleeve slots 19b. Secondary return orifices 34a, 34b are formed at the interface of coacting input-shaft grooves 18c and sleeve slots 19b.

Figure 4:
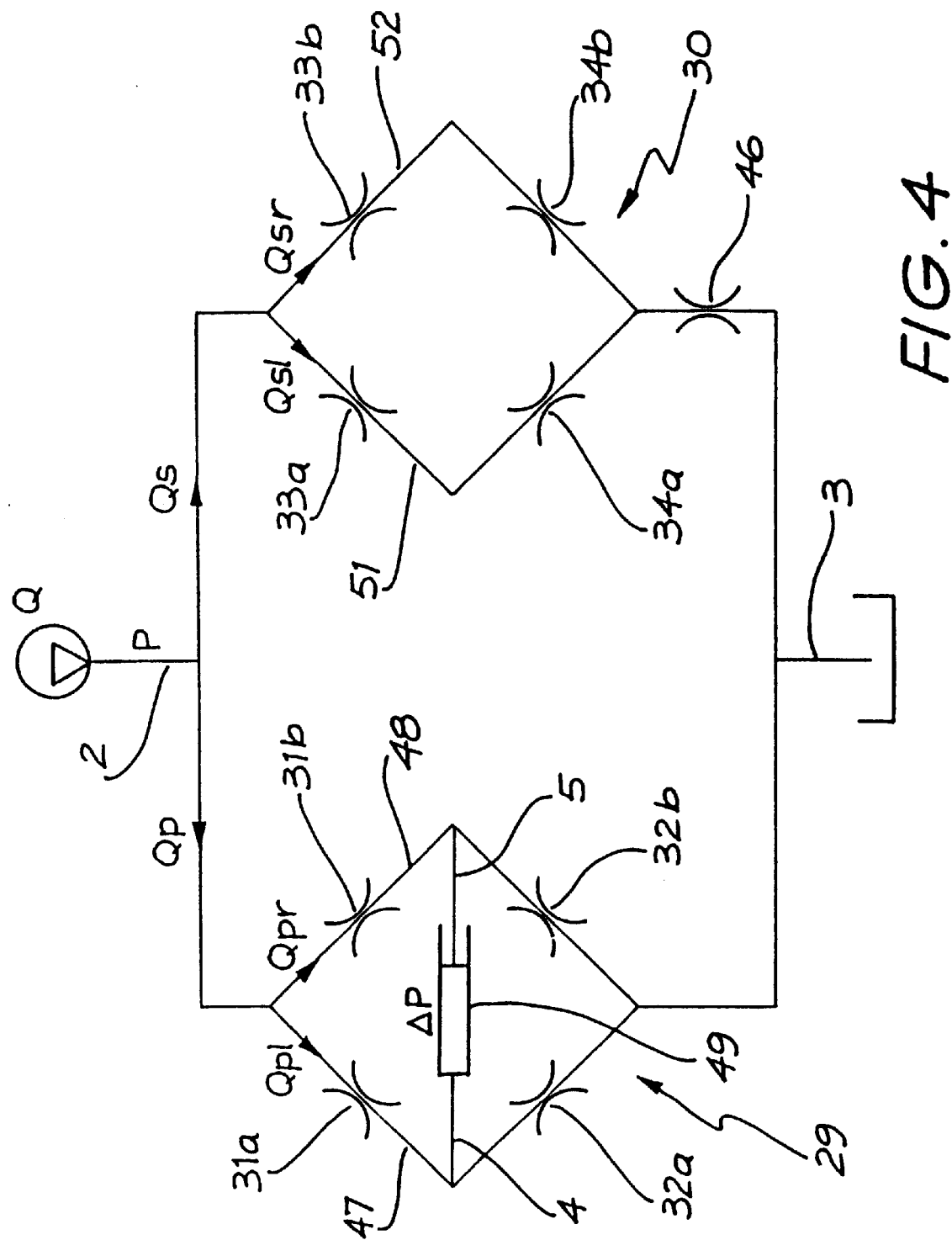
FIG. 4 is the hydraulic "flow diagram" for the network of orifices shown in FIG. 3 corresponding to one primary and one secondary bridge in parallel ie. one half of the overall rotary valve hydraulic circuit.

The hydraulic "flow diagram" for this network of orifices is shown in FIG. 4. As can be seen from FIG. 2, the lower (hidden) half of the rotary valve in FIG. 3 is axi-symmetric with respect to the upper half and these halves function in parallel. The pump supply flow Q indicated in FIG. 4 is therefore one half the total pump supply flow.

The manner of operation of the rotary valve will now be described in reference to the actual metering edge contours employed on the sides of the input-shaft grooves. These metering edge contours coact with the adjacent sleeve edges to generate the required restriction variation characteristic, as a function of valve operating angle θ.

Figure 5:
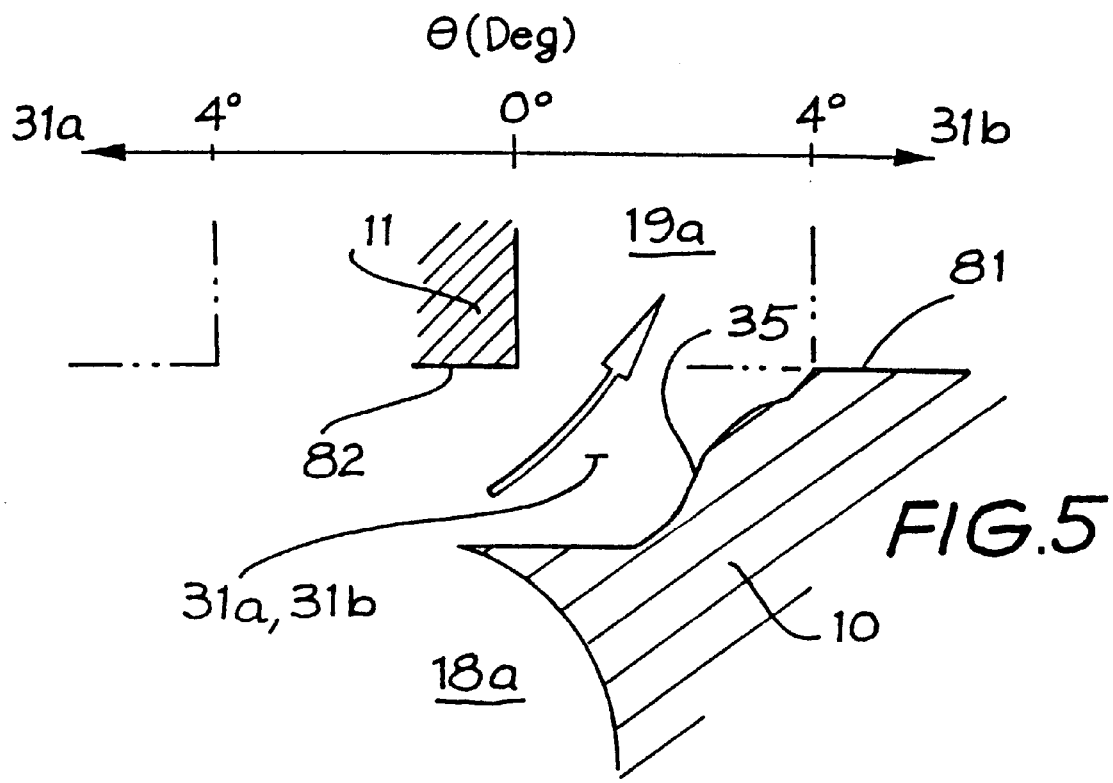
FIG. 5 shows details of the primary inlet orifices.

Primary inlet orifices 31a, 31b are generated by primary inlet metering edges 35, formed on one side of grooves 18a (refer to FIG. 5). Primary return orifices 32a, 32b are generated by primary return metering edges 36, formed on both sides of grooves 18b (refer to FIG. 6). Secondary inlet orifices 33a, 33b are generated by secondary inlet metering edges 37, formed on one side of grooves 18a opposite primary inlet metering edge 35 (refer to FIG. 7). Secondary return orifices 34a, 34b are generated by secondary return metering edges 38, formed on both sides of grooves 18c (refer to FIG. 8).

FIGS. 5–8 depict the geometry of the four types of orifices at the neutral position of the rotary valve, designated θ=0 deg. In the forthcoming description, a clockwise rotation of input-shaft 10 with respect to sleeve 11, numerically equal to a positive valve operating angle θ, is considered to take place (refer to bold arrow in FIG. 3). Each pair of orifices of each type will therefore comprise one orifice which is tending to close and one which is tending to open from this neutral position. For example, referring to FIG. 6, primary return orifice 32a tends to close, and eventually fully closes at θ=1.5 deg when edge 39 of sleeve slot 19a reaches position 40. On the other hand, primary return orifice 32b tends to open further from this neutral position and, for this same valve operating angle of θ=1.5°, edge 39 reaches position 41. Note that, for simplicity in this description, relative angular rotation of input-shaft 10 and sleeve 11 is diagrammatically shown as lateral motion of edge 39 with respect to a fixed input-shaft metering edge.

Figure 9:
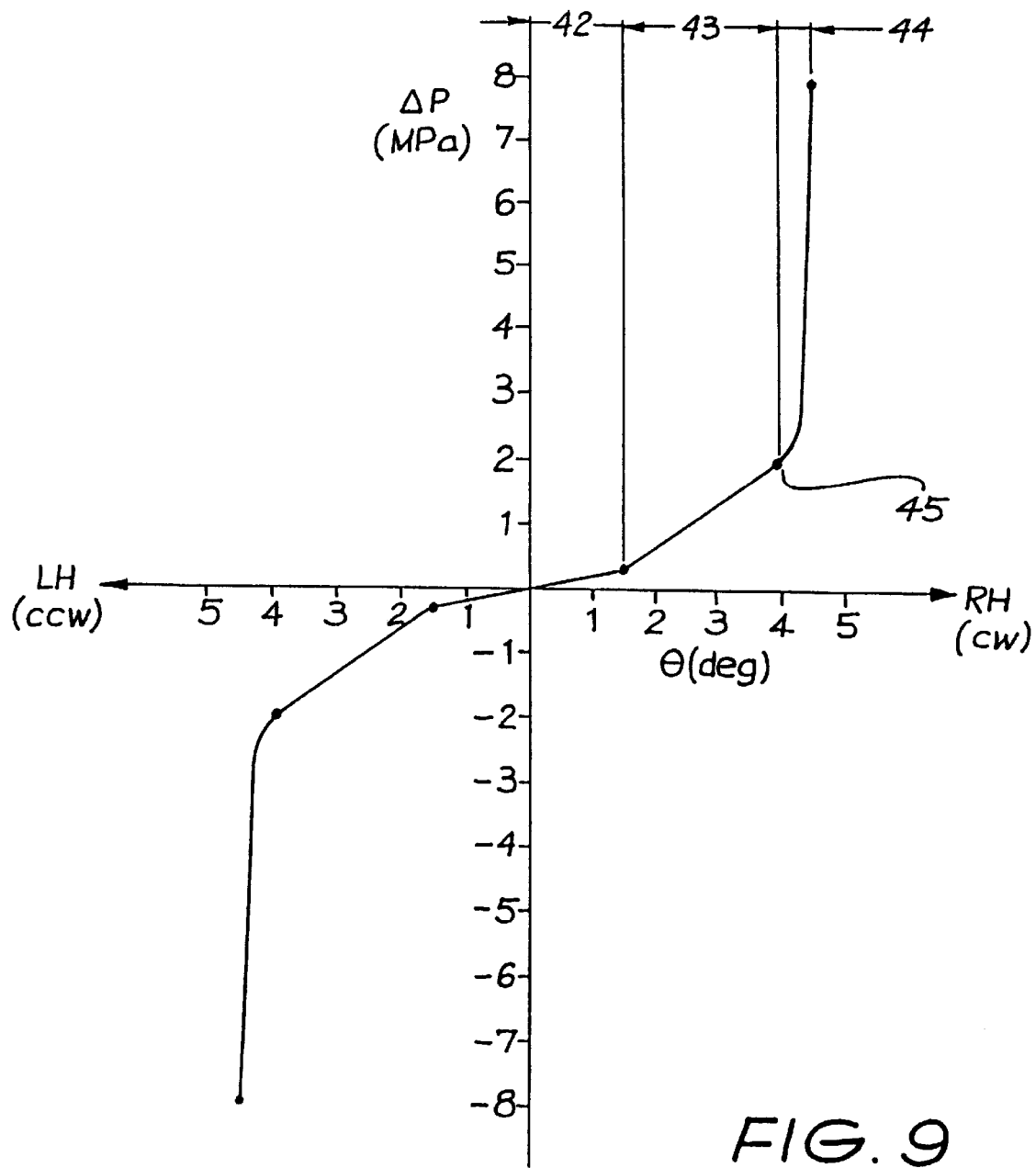
FIG. 9 is a graph plotting the angular boost characteristic of the rotary valve.

FIG. 9 shows the angular boost characteristic of the rotary valve, expressed as differential pressure ΔP on the Y axis plotted as a function of valve operating angle θ on the X axis. The aforementioned input torque based boost characteristic, the basic "finger print" of a rotary valve, is obtained by converting the X axis to input torque units by multiplying the abscissae by the torsional stiffness of torsion bar 12. For example, for a torsion bar stiffness of 2 Nm/deg, a valve operating angle of θ=4 deg corresponds to an input torque of 4×2=8 Nm.

The boost characteristic in FIG. 9 can be considered as comprising 3 regions: an on-centre region 42 of low slope associated with on-centre driving, particularly high-speed on-centre driving under freeway conditions and, in this case, corresponding to valve operating angles up to about 1.5 deg; a cornering region 43 of medium slope associated with the assistance pressures needed during vehicle cornering on winding country roads and, in this case, corresponding to valve operating angle of between about 1.5 deg and 4 deg; and a parking region 44 of high slope associated with the much larger assistance pressures required for stationary dry parking and, in this case, corresponding to valve operating angles beyond about 4 deg. This boost characteristic is of the increasing accepted style earlier referred to, namely an essentially linear cornering region 43 followed by a fast turn-around (as at point 45) to parking region 44.

Figure 10:
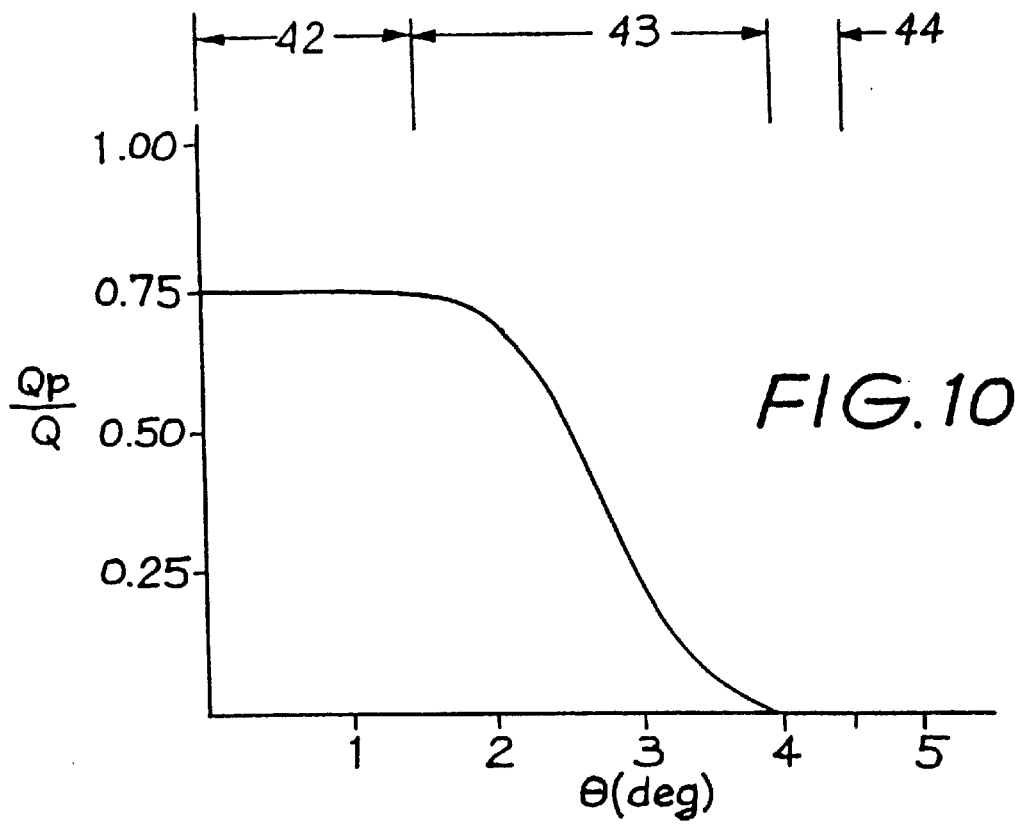
FIG. 10 is a graph plotting the flow division between the primary and secondary bridges in the rotary valve as a function of valve operating angle.
Figure 11:
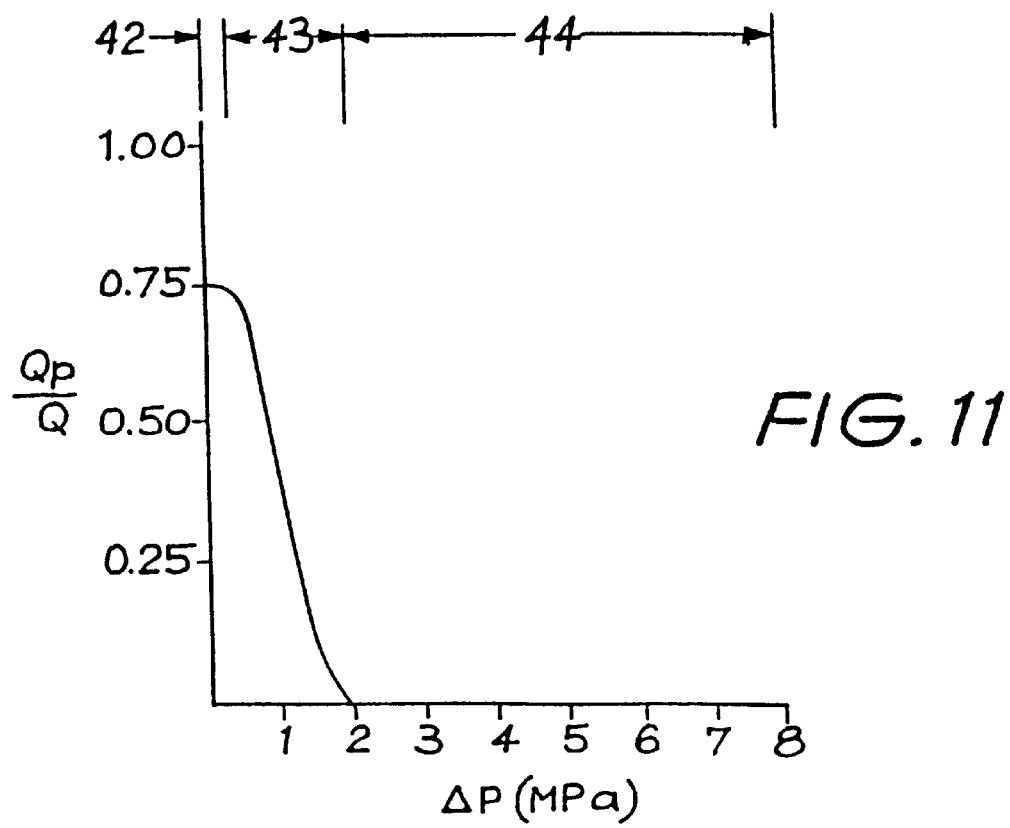
FIG. 11 is a graph plotting the flow division between the primary and secondary bridges in the rotary valve as a function of differential pressure.
Figure 12:
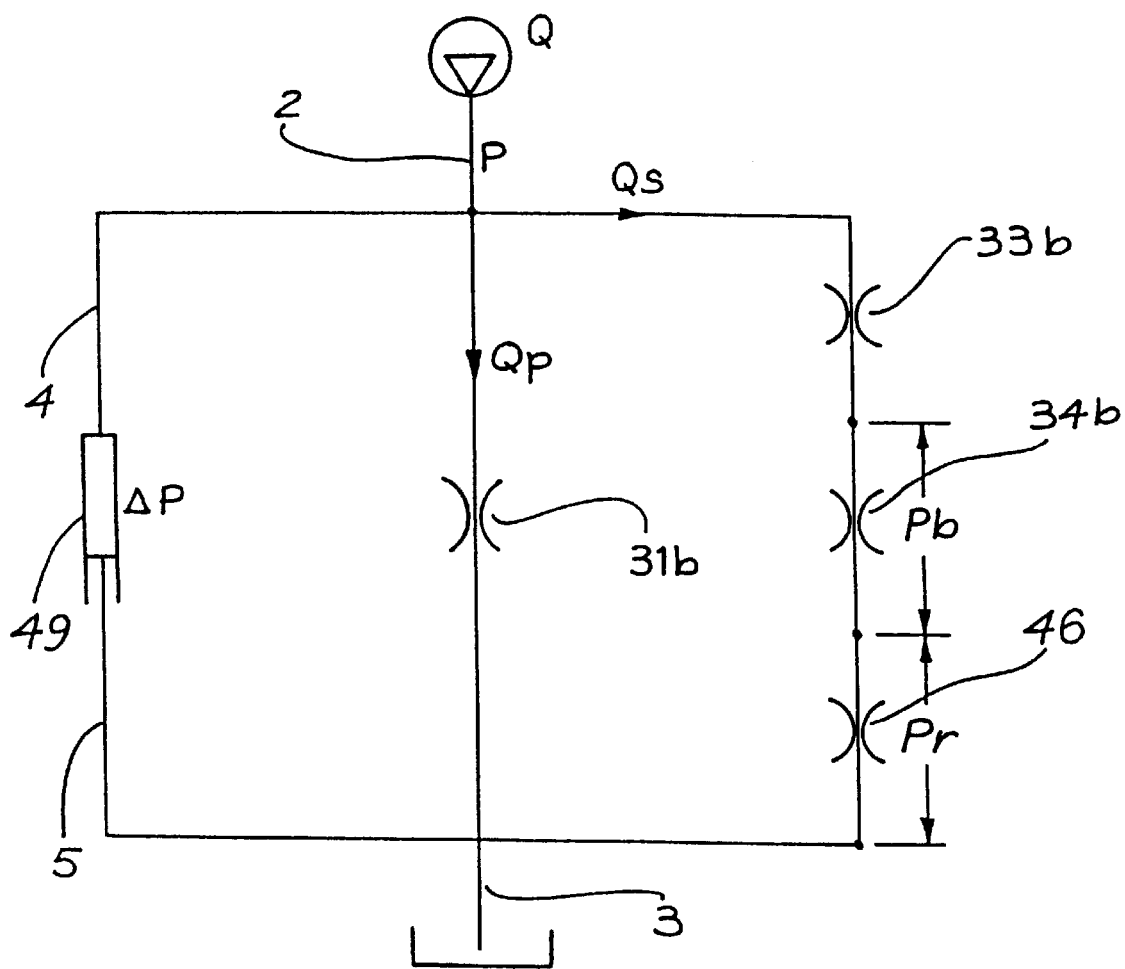
FIG. 12 is a simplified version of the hydraulic "flow diagram" shown in FIG. 4, to assist in the understanding of valve operation in the cornering and parking regions of the boost characteristic.
Figure 13:
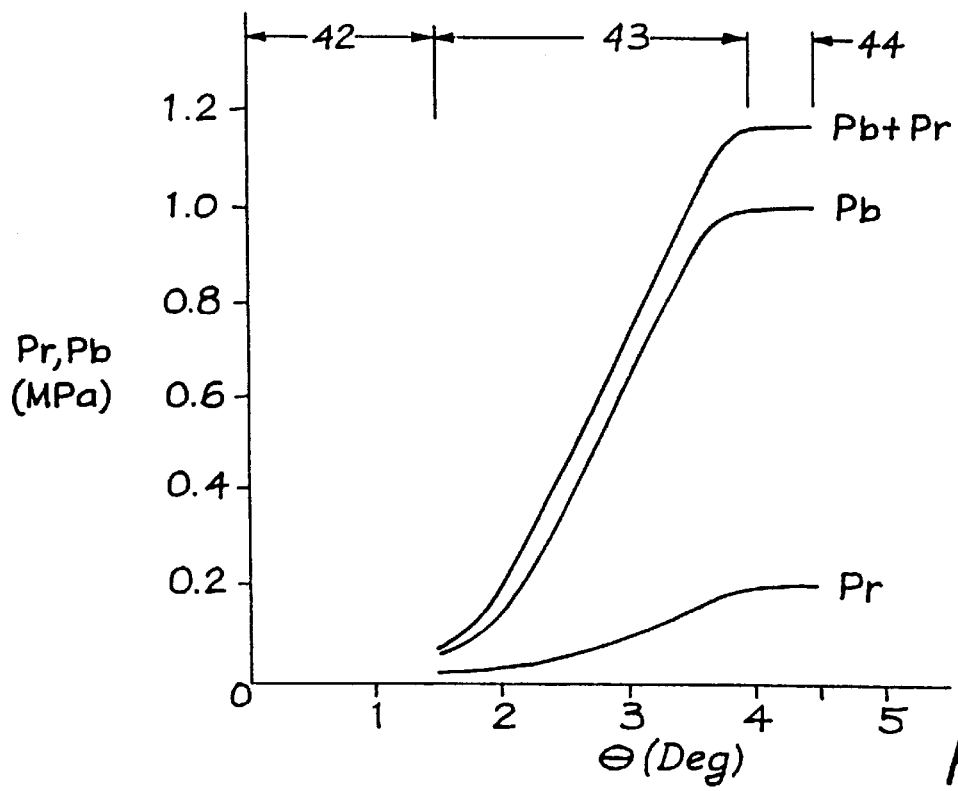
FIG. 13 is a graph plotting back pressures Pb and Pr, developed by orifices 34b and 46 respectively in the rotary valve, as a function of valve operating angle.
Figure 14:
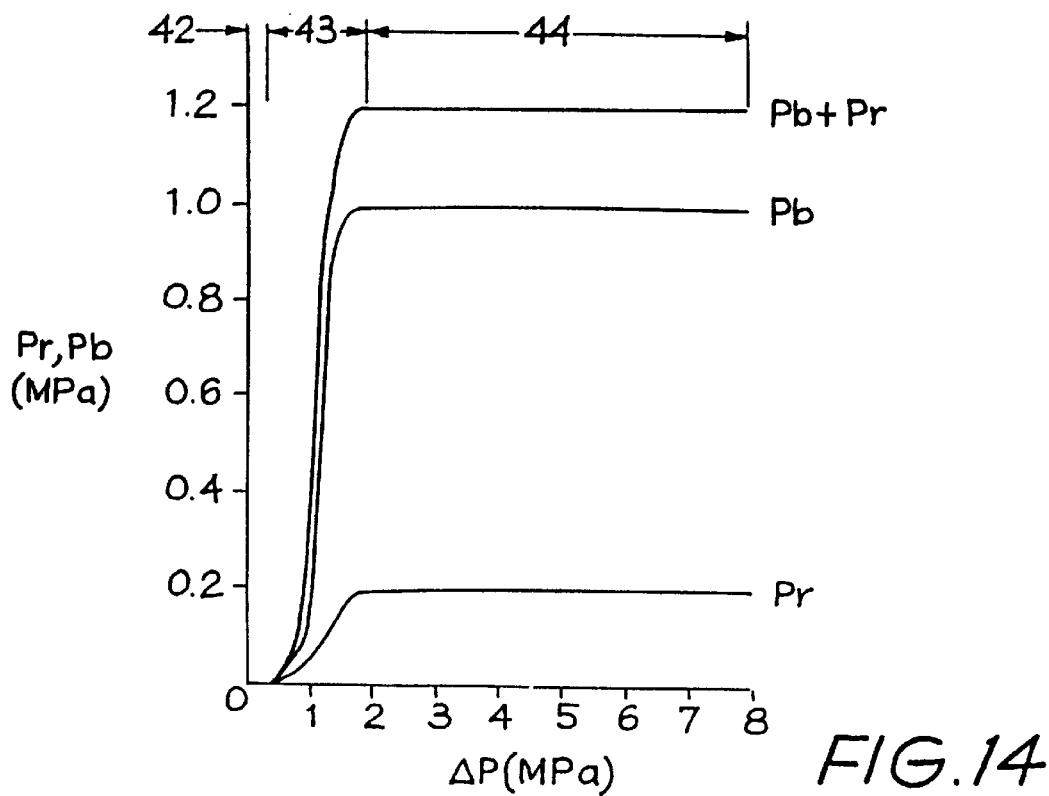
FIG. 14 is a graph plotting back pressures Pb and Pr, developed by orifices 34b and 46 respectively in the rotary valve, as a function of differential pressure.
Figure 15A:
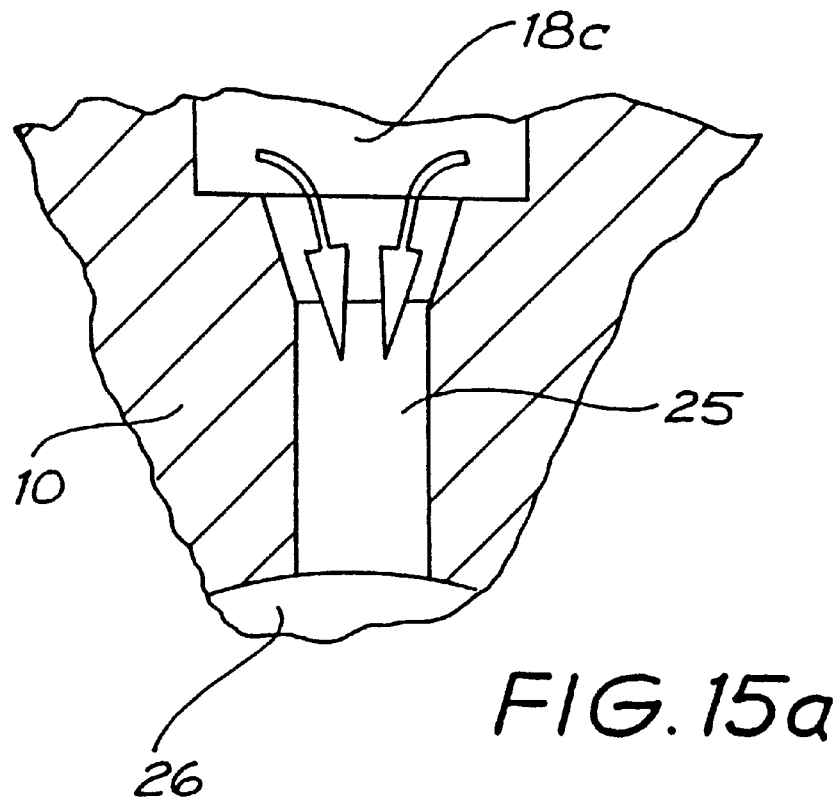
FIGS. 15. a–d are detailed scrap views of region G in FIG. 3 showing various possible embodiments of the entry to radial hole 25.
Figure 15B:
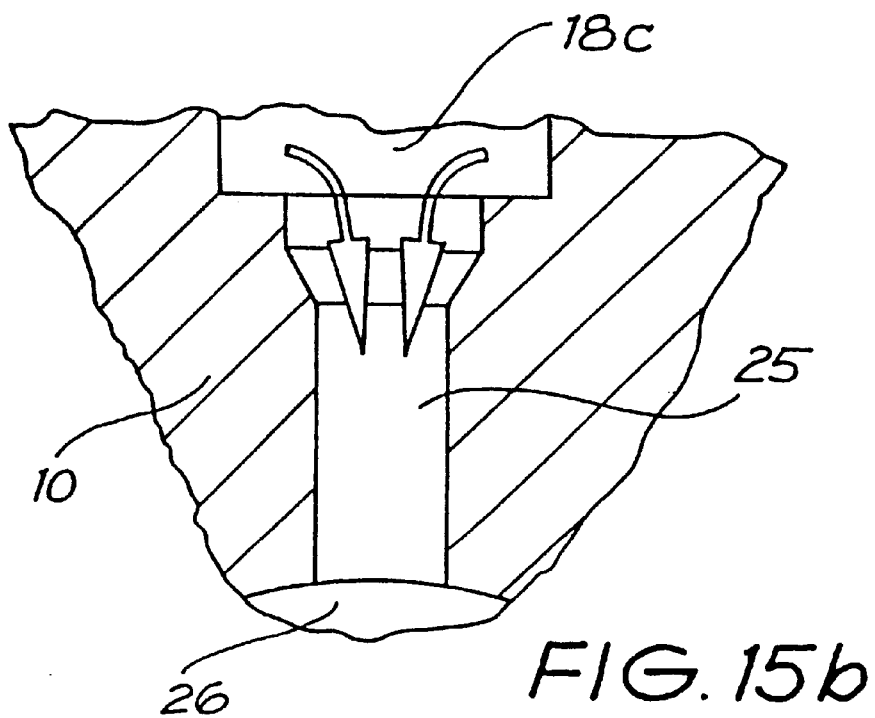
Figure 15C:
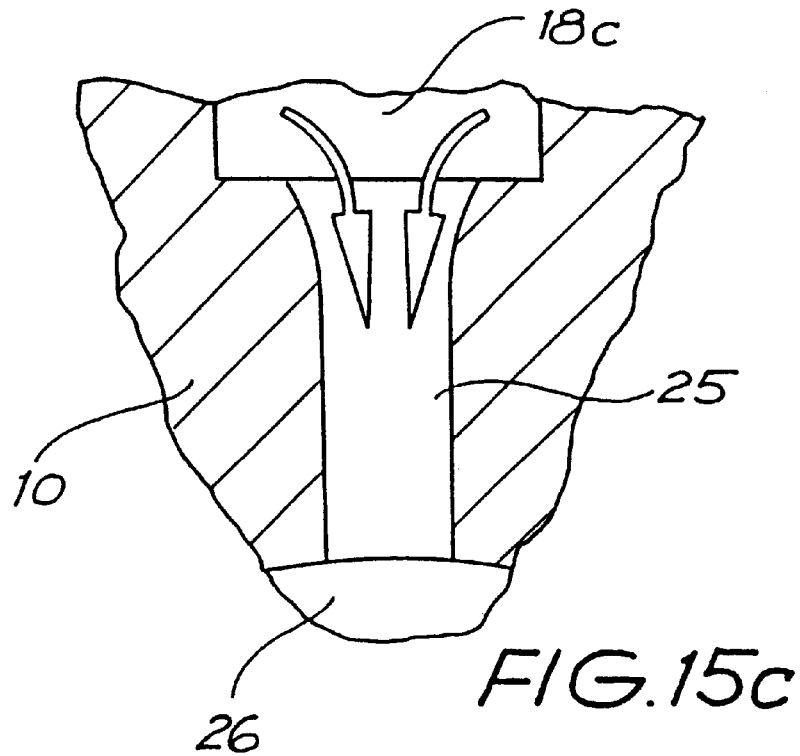
Figure 15D:
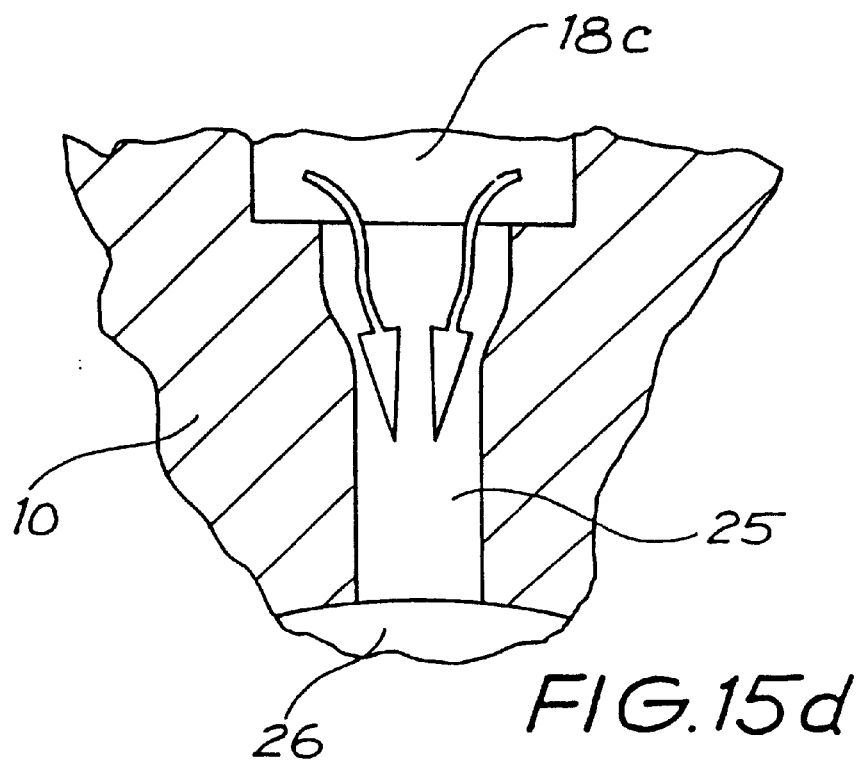
Figure 16:
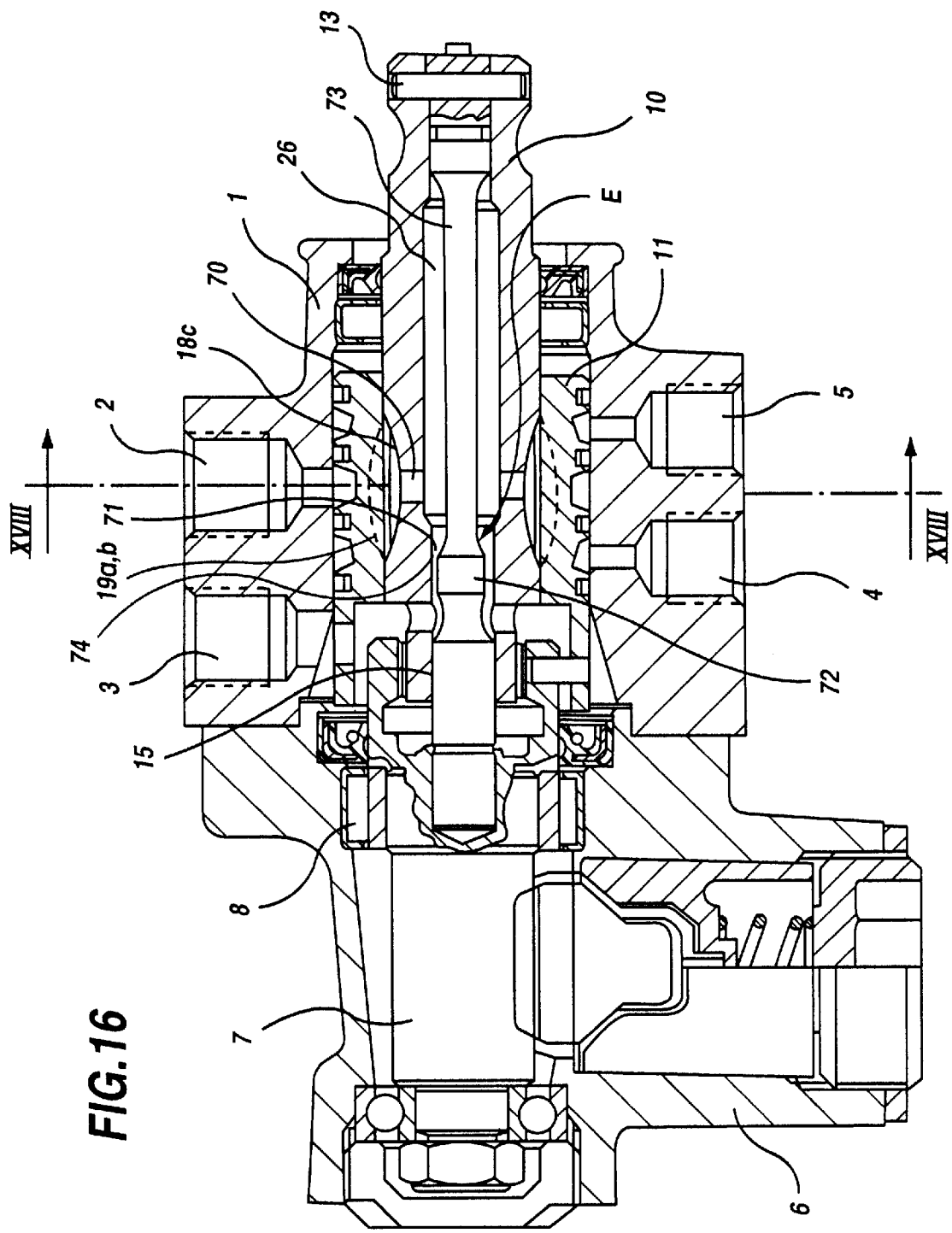
FIG. 16 is an axial cross-sectional view on plane XVI—XVI in FIG. 18 of a rotary valve installed in a valve housing of a power steering gear, according to a second embodiment of the first aspect of the present invention.
Figure 17:
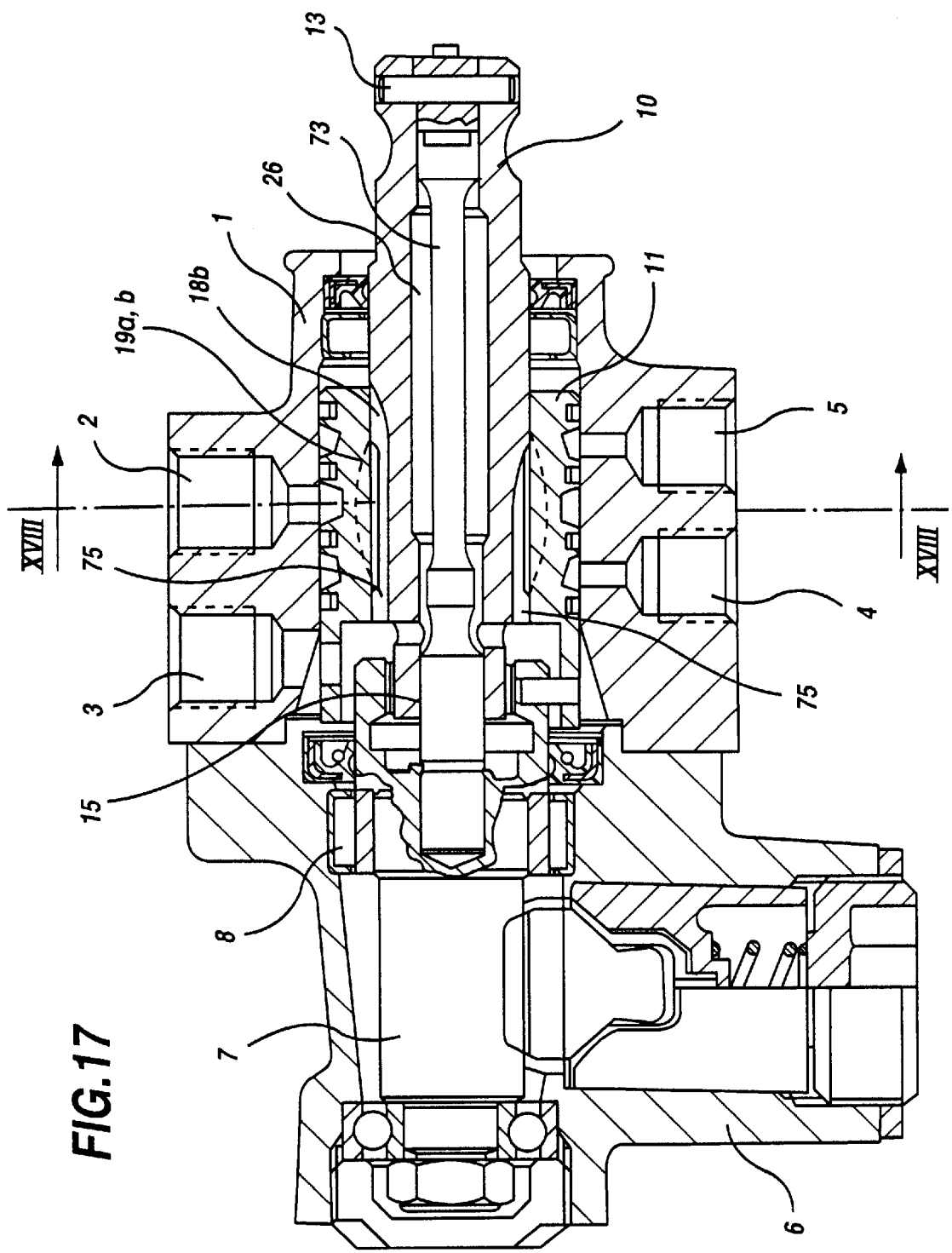
FIG. 17 is an axial cross-sectional view on plane XVII—XVII in FIG. 18 of a rotary valve installed in a valve housing of a power steering gear, according to a second embodiment of the first aspect of the present invention.
Figure 18:
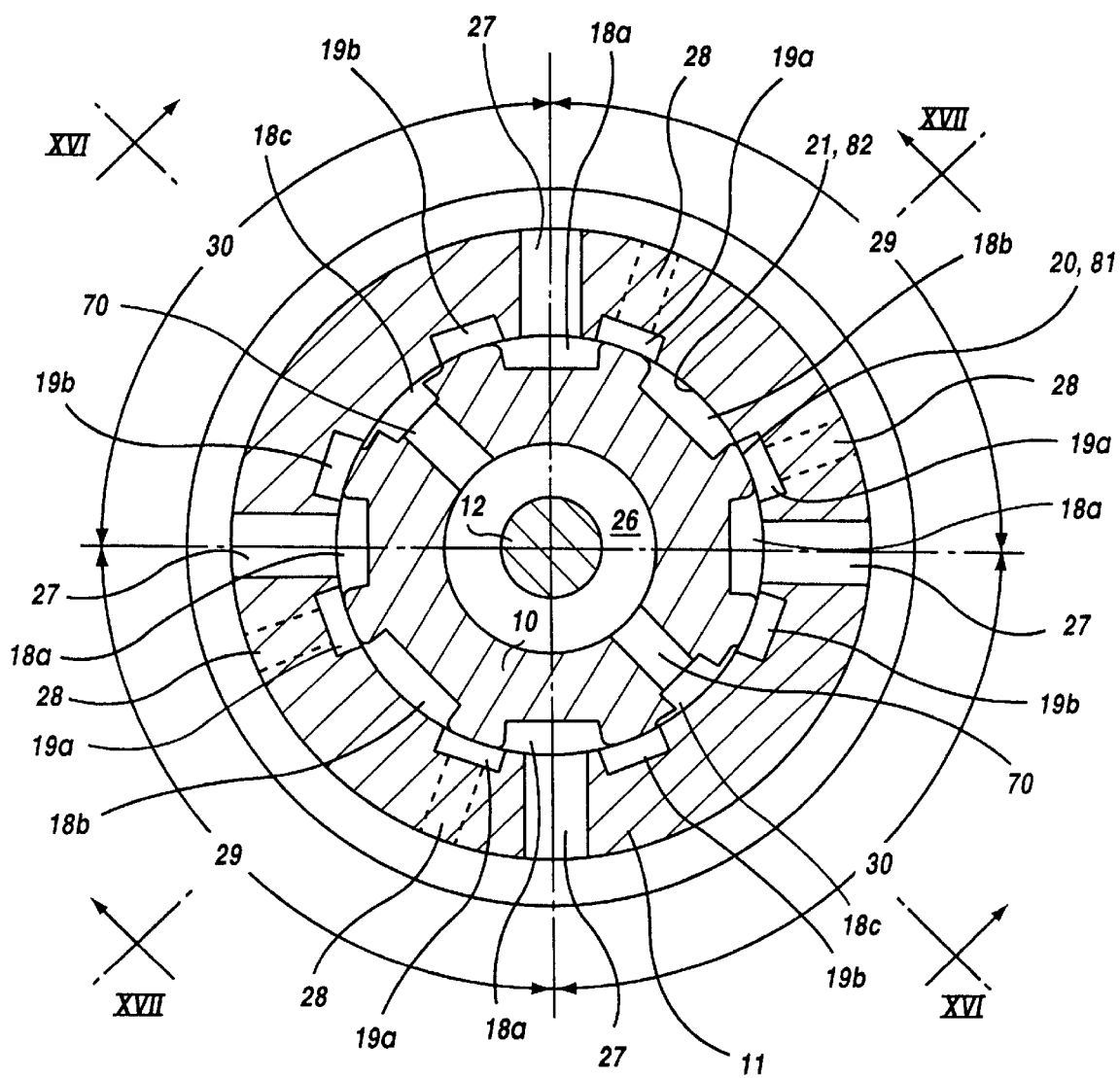
FIG. 18 is a cross-sectional view on plane XVIII—XVIII in FIGS. 16 and 17 of the input-shaft and surrounding sleeve components of the rotary valve, according to a second embodiment of the first aspect of the present invention.

FIG. 10 shows the flow division between primary bridge 29 and secondary bridge 30 as a function of valve operating angle θ. FIG. 11 shows this same relationship plotted as a function of differential pressure ΔP.

Referring back to FIG. 4, in the neutral position of the rotary valve the overall flow restriction provided by the orifices in secondary bridge 30, plus additional orifice 46 in series with secondary bridge 30 (which will be described in detail later), is approximately three times the restriction offered by primary bridge 29. Flow Q therefore divides in inverse proportion to this restriction resulting in approximately 75% of flow Q passing through primary bridge 29 ie. Qp/Q=0.75% in FIG. 10. Also because primary inlet orifices 31a and 31b are geometrically equivalent in the neutral position, as are primary return orifices 32a and 32b, flow Qp evenly divides between flow Qpl in primary left-hand limb 47 and flow Qpr in primary right-hand limb 48, generating zero differential pressure ΔP at cylinder 49.

Figure 8:
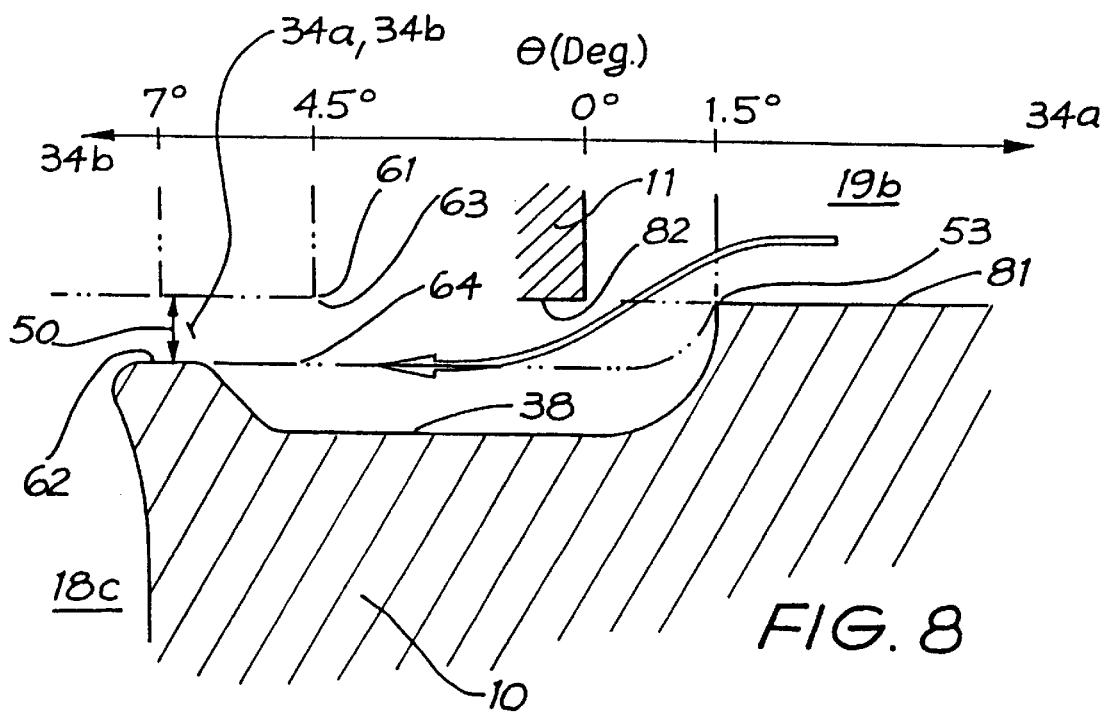
FIG. 8 shows details of the secondary return orifices.

Referring to FIG. 10, the diversion of 75% of flow to primary bridge 29 is maintained more or less constant in on-centre region 42 of the boost characteristic, and is mainly a result of the relatively restrictive secondary return orifices 34a, 34b. As seen in FIG. 8, secondary return orifices 34a, 34b offer a substantially constant restriction area due to throat 50, formed by the circumferential overlap of secondary return metering edge 38 and land 82 of sleeve bore 21. However because of the relatively unrestricted primary inlet orifices 31a, 31b and primary return orifices 32a, 32b, and also the fact that all bridge limbs 47, 48, 51 and 52 are open to flow in on-centre region 42, inlet pressure P generated by the rotary valve is low under these conditions, hence affording low energy losses in on-centre driving.

For increasing valve operating angle in on-centre region 42, primary inlet orifice 31b and primary return orifice 32a progressively close, while primary inlet orifice 31a and primary return orifice 32b progressively open, thereby maintaining the previous described condition in which primary limb flows Qpl and Qpr are approximately equal, hence generating the low slope on-centre region 42 of the boost characteristic.

Figure 6:
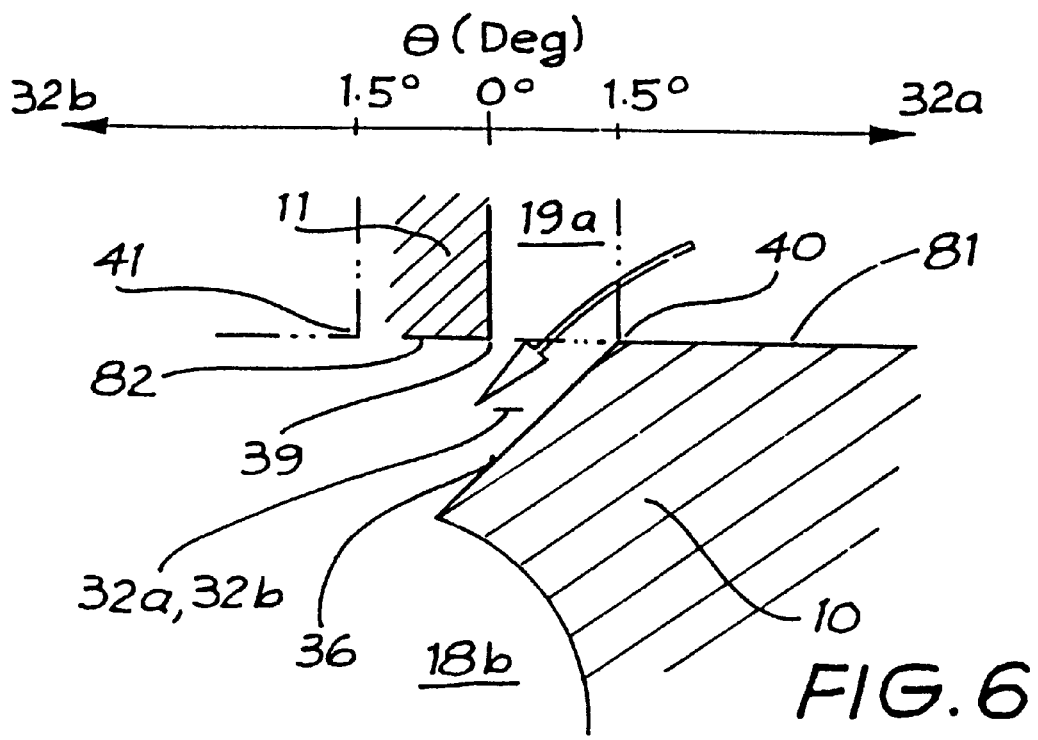
FIG. 6 shows details of the primary return orifices.
Figure 7:
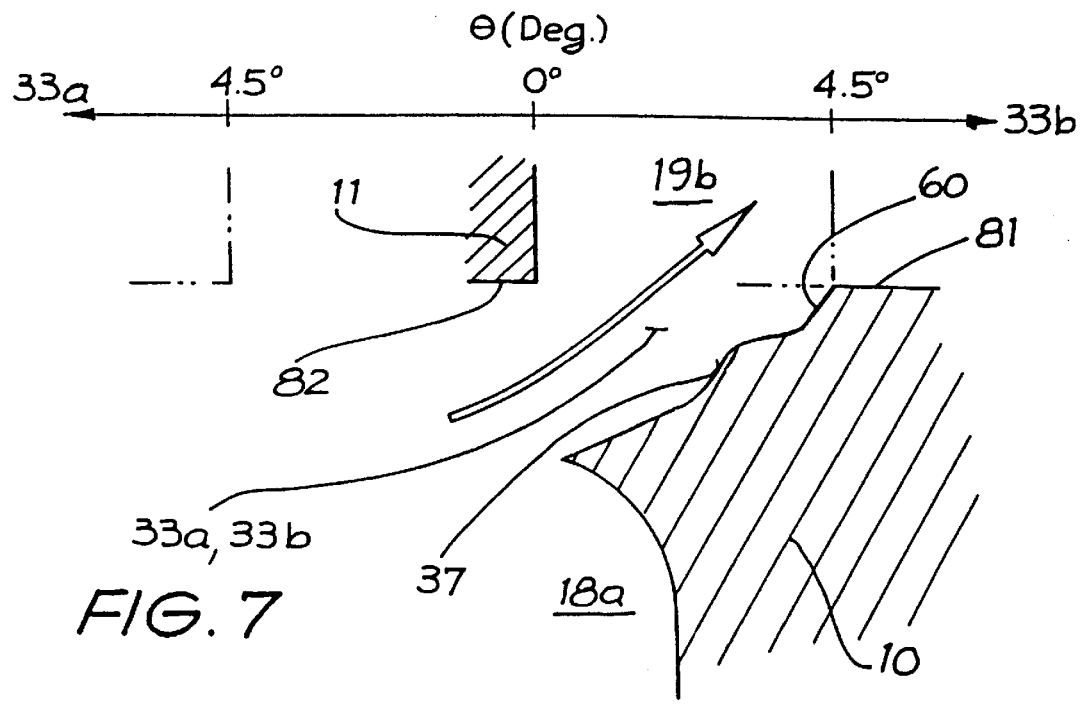
FIG. 7 shows details of the secondary inlet orifices.

However, as the valve operating angle approaches 1.5 deg primary return orifice 32a closes completely, as indicated by sleeve edge position 40 in FIG. 6, diverting all primary flow Qp down primary right-hand limb 48. Simultaneously secondary return orifice 34a, which has also been progressively closing for increasing valve operating angle, now also closes completely, as indicated by slot edge position 53 in FIG. 8, diverting all secondary flow Qs down secondary right-hand limb 52. Now, as can be seen from FIG. 5, 6 and 7, opening orifices 31a, 32b and 33a offer relatively little flow restriction at valve operating angles of 1.5 deg or beyond hence, for the purposes of understanding the method of operation of the network of orifices, they can be ignored. Beyond valve operating angles of 1.5 deg, the network shown in FIG. 4 can therefore be considered to simplify to the arrangement shown in FIG. 12. Right-hand cylinder port 4 now effectively directly hydraulically communicates to inlet port 2 and thus to the pump supply. Similarly left-hand cylinder port 5 now effectively directly hydraulically communicates to return port 3 and thus to the pump reservoir.

In these circumstances all pump supply pressure (and hence valve inlet pressure P) is applied to cylinder 49 (ie. P=ΔP) and is substantially determined by the restriction of the four remaining dominant orifices 31b, 33b, 34b and 46. The geometry of orifices 31b and 33b are such that, as valve operating angle increases beyond 1.5 deg, primary inlet orifice 31b closes at a faster rate than does secondary inlet orifice 33b, thereby diverting primary flow Qp to the secondary bridge and hence correspondingly increasing Qs. Thus, in cornering zone 43, as is evident in FIGS. 10 and 11, the flow ratio Qp/Q progressively reduces from about 0.75 at a valve operating angle of 1.5 deg and eventually reaches 0 (zero) at a valve operating angle of 4 deg . where primary inlet orifice 31b fully closes. The geometry of orifices 31b and 33b therefore predominantly determine the shape of the boost characteristic in cornering zone 43, in this case a linear boost characteristic. In cornering zone 43, as differential pressure P builds up and is directly applied across orifice 31b, flow is simultaneously progressively diverted away from orifice 31b according to the mechanism described above. For example, looking at FIG. 11 it is seen that Qp has dropped to about one-half its on-centre value when differential pressure P reaches 1 MPa. This action is arranged such that orifice 31b never produces any substantial cavitation noise since, as is well known in the art, valve cavitation noise generated in a given orifice reduces with rate flow through the orifice for a given fixed pressure drop.

Now, in the absence of orifices 34b or 46, the corresponding increase in secondary flow Qs through orifice 33b would certainly cause this orifice to produce cavitation noise. This increase in noise would not only be caused by the increase in secondary flow Qs but also the increasing restriction of orifice 33b for increasing valve operating angle. However increase in secondary flow Qs, for example by the factor of four exampled by this embodiment (refer to FIGS. 10 and 11), dramatically increases the back pressures Pb and Pr generated by orifices 34b and 46 respectively. In the embodiment shown Pb and Pr are arranged to reach 1 MPa and 200 kPa respectively when secondary flow Qs reaches its maximum value. This rise in back pressures Pb and Pr is demonstrated graphically in FIGS. 13 and 14.

Once orifice 31b has fully closed off at the end of cornering zone 43, all pump flow now passes through orifices 33b, 34b and 46 in series. Hence back pressures Pb and Pr are held constant in parking zone 44, which extends from valve operating angles 4 deg to 4.5 deg and in which differential pressure correspondingly rises from 2 MPa to 8 MPa. Sharp turnaround 45 between cornering zone 43 and parking zone 44 is aided by the total diversion of flow to secondary bridge 30 and hence to orifice 33b, plus the relatively steep "close-off angle" of metering edge 37 as at region 60 (refer to FIG. 7).

In this manner the back pressure developed by orifices 34b and 46 in series (lie. Pr+Pb) "tracks" (or follows) the increase in pressure developed across potentially cavitating orifice 33b during cornering region 43 ie. up to a maximum differential pressure P of 2 MPa. At this time 1.2 MPa of this 2 MPa is actually attributable to back pressure orifices 34b and 46 (refer to FIGS. 13 and 14). This back pressure is then held constant at 1.2 MPa for the remaining parking zone 44 during which time differential pressure rises to 8 MPa. The 1.2 MPa back pressure generated at the exit orifice 33b is sufficient to suppress substantially all cavitation noise from this orifice, even up to the maximum differential pressure of 8 MPa used for parking.

Referring to FIG. 8, it is seen that orifice 34b is generated by metering edge 38 which circumferentially overlaps the adjacent land 82 of sleeve bore 21 for all valve operating angles from the neutral position up to the maximum valve operating angle of 4.5 deg corresponding to slot edge position 61. Radially disposed "throat" (or point of minimum cross-sectional area to flow) 50 serves to ensure that orifice 34b provides a substantially constant restriction area to oil flow through this range of valve operating angles and beyond, 7 deg in this case matching the fail-safe angle of the rotary valve where mechanical stops at the interface of input-shaft 10 and pinion 7 prevent any further relative rotation between input-shaft 10 and sleeve 11.

The shape of metering edge 38, including region 62 (of locally reduced metering edge depth which forms throat 50 in combination with land 82 of sleeve bore 21), also aids in smoothing the normally turbent oil flow as it passes sleeve slot edge 63. For less demanding applications where this turbulent flow problem does not necessarily propagate as valve noise, metering edge 38 can be made with a simpler flat bottom form 64 (ie. a substantially constant metering edge depth), still providing an approximately constant restriction area for orifice 34b.

If residual cavitation noise is generated at sleeve slot edge 63, back pressure can be applied to orifice 34b via the presence of downstream fixed orifice 46. In this first embodiment of the first aspect of the present invention, secondary return holes 25 in input-shaft 10 (see FIG. 3) are of reduced diameter compared to primary return holes 24, and produce a back pressure Pr of 200 kPa at maximum secondary flow Os (refer to FIGS. 13 and 14). Turbulence generation in these holes can be reduced (if necessary) if a conical (FIG. 15a), recessed conical (FIG. 15b), axi-symmetric convex tapered (FIG. 15c) or recessed axi-symmetric convex tapered (FIG. 15d) entry to holes 25 is employed. Such entry profiles, and numerous others, can be readily machined via a "stepped drill" arrangement to smoothen the inlet flow to holes 25.

Orifices 34b and 46 in series provide a staged pressure reduction downstream of orifice 33b, enabling large back pressures to be applied to this secondary inlet orifice without generation of any substantial cavitation noise. For example, at maximum parking differential pressure of 8 MPa, the pressure drop generated by orifice 33b is 6.8 MPa, the pressure drop generated by orifice 34b is 1 MPa and the pressure drop generated by orifice 46 is 200 kPa. An important feature of the present invention is that this by-pass mode valve arrangement enables back pressure Pb+Pr to be applied directly to cylinder 49 for all valve operating angles beyond 1.5 deg (ie. throughout cornering zone 43 and parking zone 44) corresponding to the region of close-off of primary return orifice 32a. This is particularly beneficial in parking zone 44 corresponding to valve operating angles beyond 4 deg where, primary inlet orifice 31b having now closed off, back pressure Pb+Pr reaches its maximum value of 1.2 MPa. This relatively high magnitude of back pressure is used usefully to produce a force on the piston in cylinder 49, rather than wastefully dissipating energy as heat.

Input-shaft metering edges 35, 36, 37 and 38 can be readily manufactured using coining or roll-imprinting processes well known in the art. Such relatively steep (ie high slope with respect to adjacent land 81 of input-shaft 10) metering edges enable good control of the boost characteristic, hence steering effort levels, and according to the present invention has the potential to reduce noise levels in the rotary valve to less than 55 dBA.

FIGS. 16, 17, 18, 19a–d and 20 show a second embodiment of the first aspect of the present invention in which fixed orifices 46, rather than being generated by reduced diameter radial holes 25, are generated by a restriction to axial oil flow within bore 26 of input-shaft 10. Secondary return holes 70 in this second embodiment are not intended to be restrictive, but serve to communicate hydraulic oil from secondary bridges 30 to bore 26 of input-shaft 10 whence oil flow turns perpendicularly to flow axially along bore 26 (refer to FIG. 16). However prior to reaching return port 3, the flow must pass through annular restriction 71 formed by the interaction of diametrically enlarged portion 72 of torsion bar 73 and reamed portion 74 of input-shaft bore 26. This annular restriction 71 constitutes the two fixed orifices 46, previously described in reference to the first embodiment of the present invention. According to this second embodiment, hydraulic oil from primary bridge 29 is communicated more directly to return port 3 (refer to FIG. 17) so that it is not required to flow through bore 26 of input-shaft 10, and hence is not subject to annular restriction 71. This is achieved by axially extending grooves 18b of input-shaft 10 associated with primary return orifices 32a,b to form axially disposed channels 75. Channels 75, two of which are required according to this second embodiment, can be readily manufactured by processes well known in the art such as milling or plunge grinding. Note that at least one of these two channels 75 must be extended axially in the opposite direction to the main flow direction in order to bleed leakage oil from the cavity on the input side (right side in FIG. 17) of sleeve 11.

FIGS. 19a–d show various possible embodiments for diametrically enlarged portion 72 of torsion bar 73.

FIG. 19a shows in more detail diametrically enlarged portion 72 of torsion bar 73, forming annular restriction 71 via its interaction with reamed (or otherwise accurately diametrically sized) portion 74 of bore 26 of input-shaft 10. The general direction of return oil flow from secondary bridges 30 is shown by large arrows and, as seen, annular restriction 71 constitutes orifices 46 and generates the back pressure Pb of 200 kPa previously referred to. Because of the large circumferential length of annular restriction 71 (typically 20–30 mm), flow noises in certain applications will be less than flow noises generated by reduced diameter radial holes 25 employed in the first embodiment of the present invention.

As shown in FIG. 19b, restriction 71 may also be staged, that is diametrically enlarged portion 72 comprises a series of axially separated, circumferentially disposed lands. This staging means that the back pressure generated by restriction 71 is generated in a series of discrete stages, in the case of FIG. 19b in three stages. The major benefit of this arrangement, compared lo the simple cylindrical form of enlarged portion 72 of torsion bar 73 shown in FIG. 19a, is that the back pressure generated by staged restriction 71 will be less variable as a function of oil viscosity and hence oil temperature. This is because most of the back pressure generation occurs around the sharp edges associated with the circumferentially disposed lands.

Figure 19C:
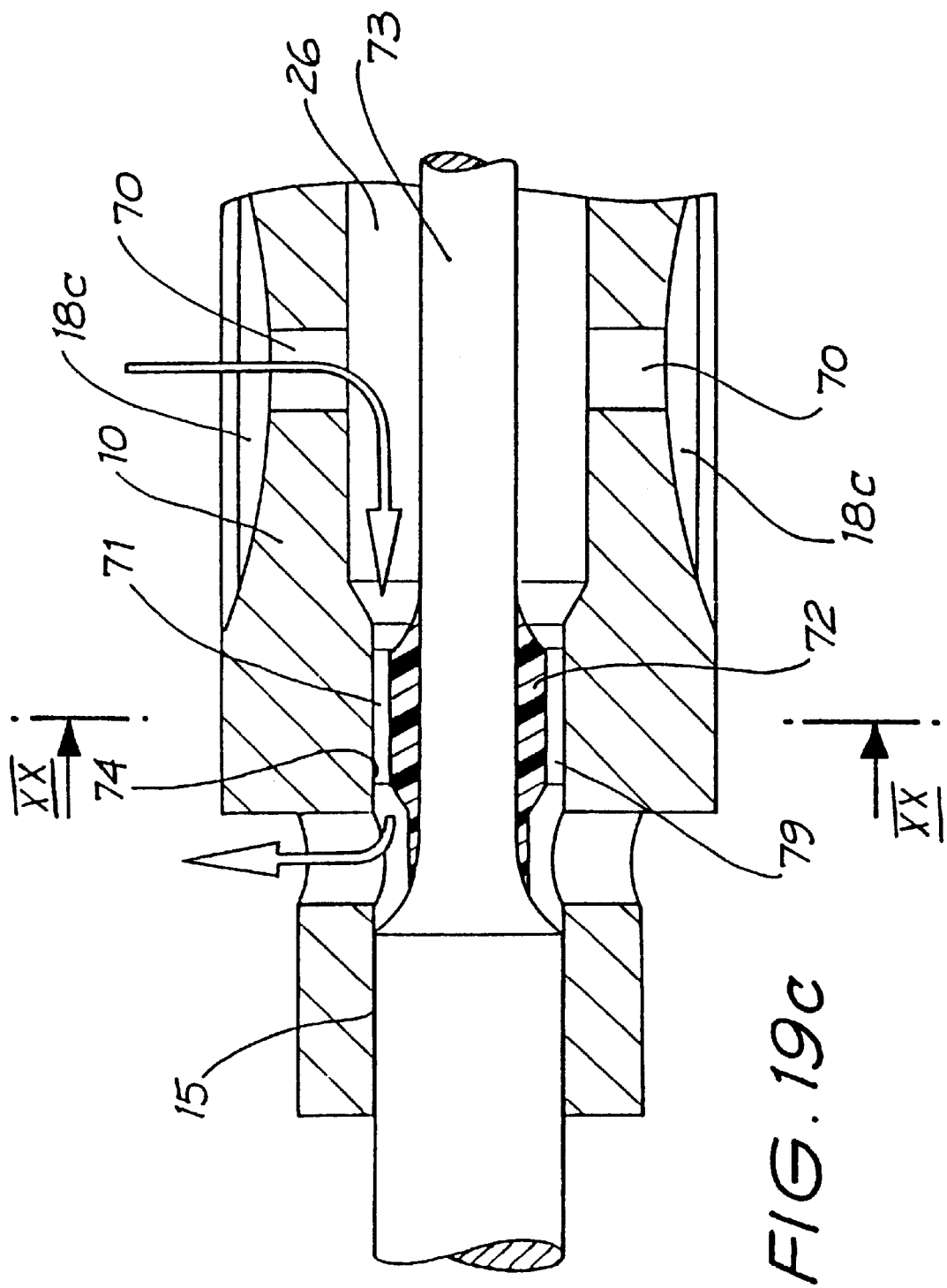
FIGS. 19 a–d are enlarged scrap views of region E in FIGS. 16 and 26, showing various embodiments for the diametrically enlarged portion of the torsion bar.

In applications where torsion bar 73 is stressed to its maximum endurance limit, diametrically enlarged portion 72 may be plastic moulded around the otherwise conventional torsion bar as a separate, subsequent operation as shown in FIG. 19c. In this embodiment the outside diameter of diametrically enlarged portion 72 is fluted as at 79 (refer to FIG. 20) and interference-fitted into reamed portion 74 of bore 26, thereby ensuring the radial depth accuracy of annular restriction 71. In this embodiment, plastic moulded diametrically enlarged portion 72 can also be arranged to generate a staged restriction similar to that shown in FIG. 19b.

Figure 19D:
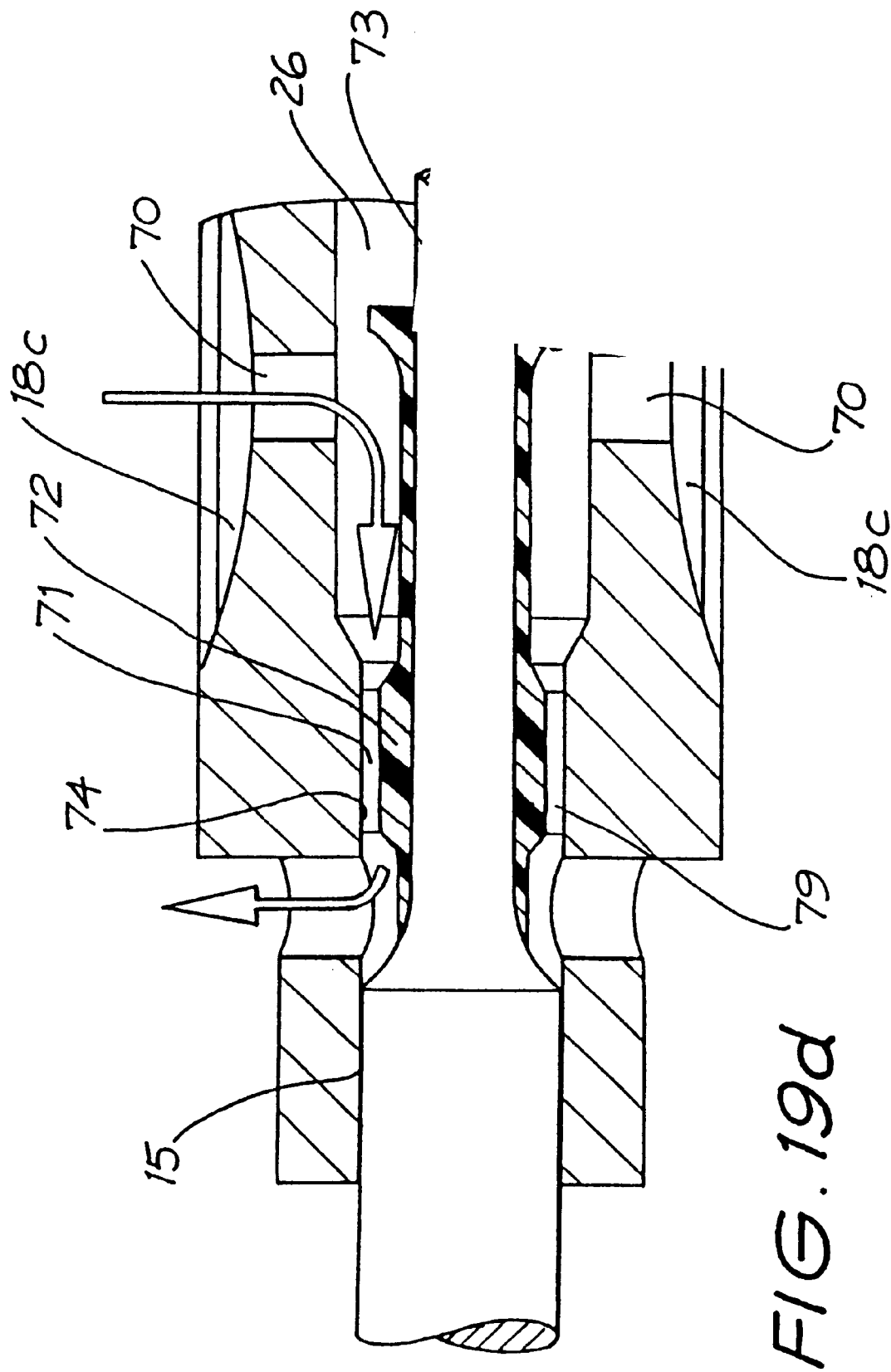
Figure 20:
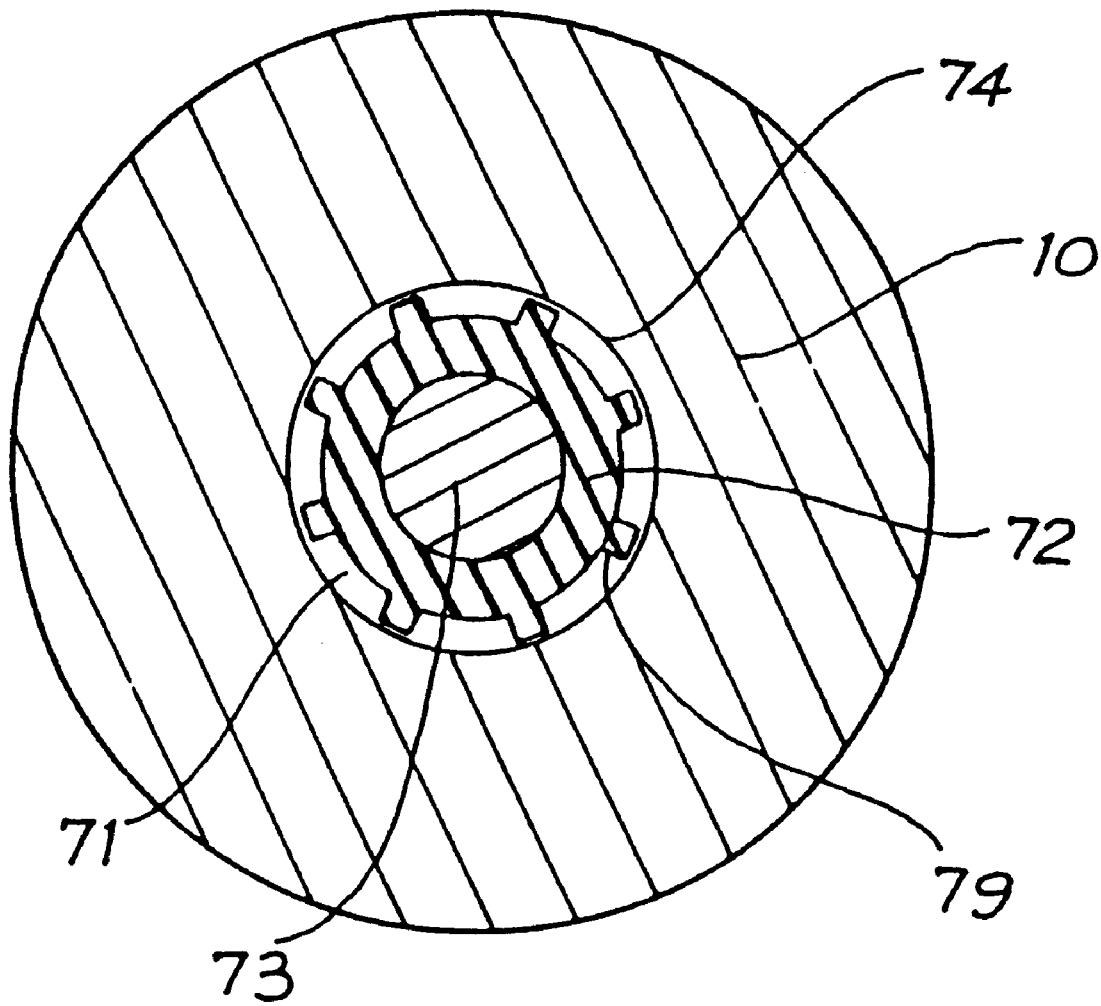
FIG. 20 is a sectional view on plane XX—XX in FIG. 19c.

FIG. 19d shows another embodiment where diametrically enlarged portion 72 is extended axially to overlap secondary return hole 70. The flow is also smoothened by employing conical portion 76 to redirect the flow from the radial direction in hole 70 to the axial direction in bore 26. The use of a plastic material surrounding torsion bar 73 has also been found to assist in the dampening of turbulence noise generated when the radial oil flow through hole 70 impinges on torsion bar 73.

Figure 21:
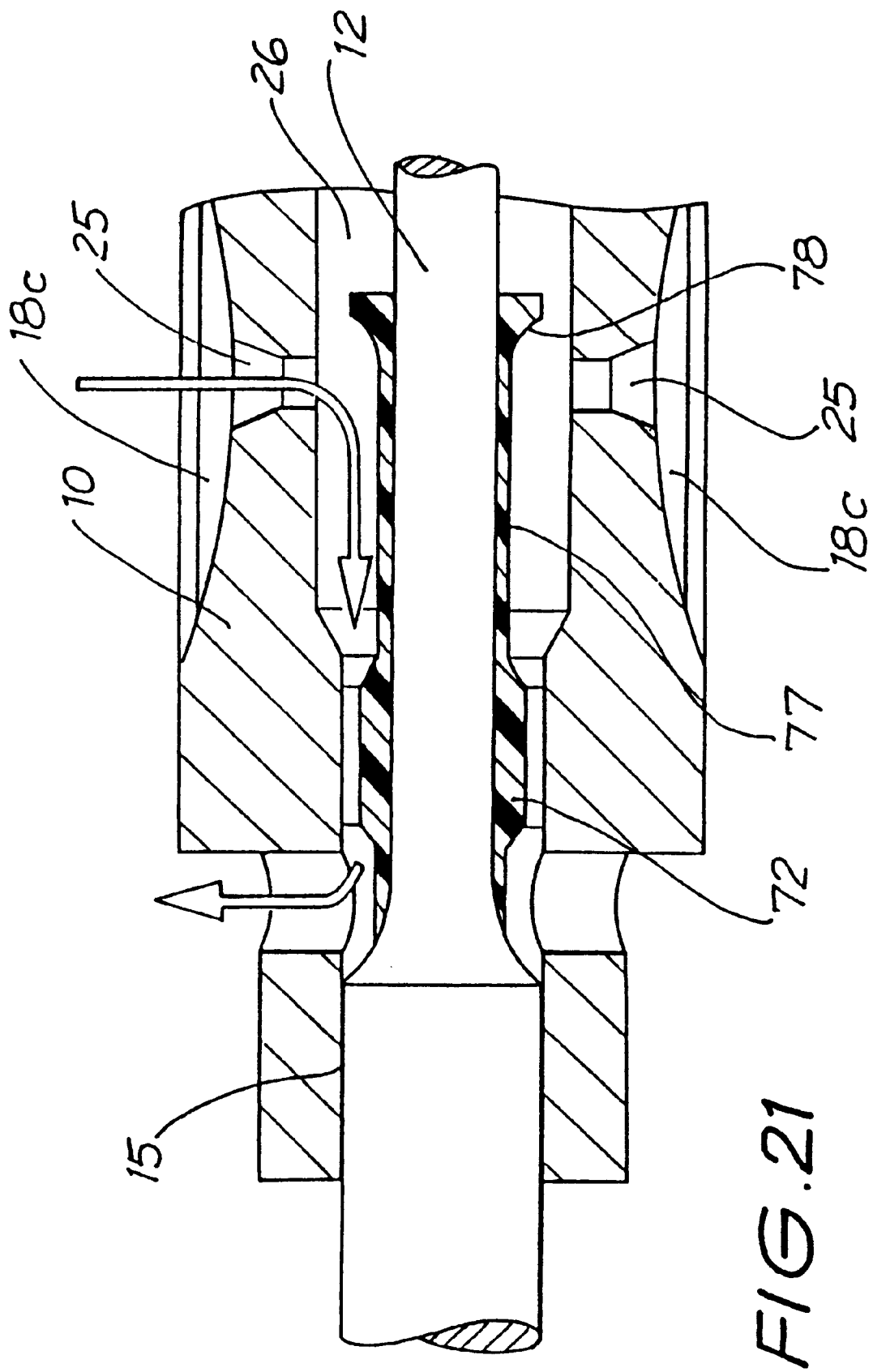
FIG. 21 is an alternative version of the first embodiment of the first aspect of the present invention shown in FIG. 1, where the torsion bar incorporates a surrounding plastic moulding.

To this end, it is also possible to employ a plastic moulding 77 around torsion bar 12 according to the first embodiment of the first aspect of the present invention. In this latter case diametrically enlarged portion 72, provides an additional back pressure generating capability and hence augments reduced diameter radial drill holes 25. This arrangement is shown in FIG. 21 where optional conical portion 78 serves the same function as conical portion 76 in the second embodiment of the first aspect of the present invention.

Figure 22:
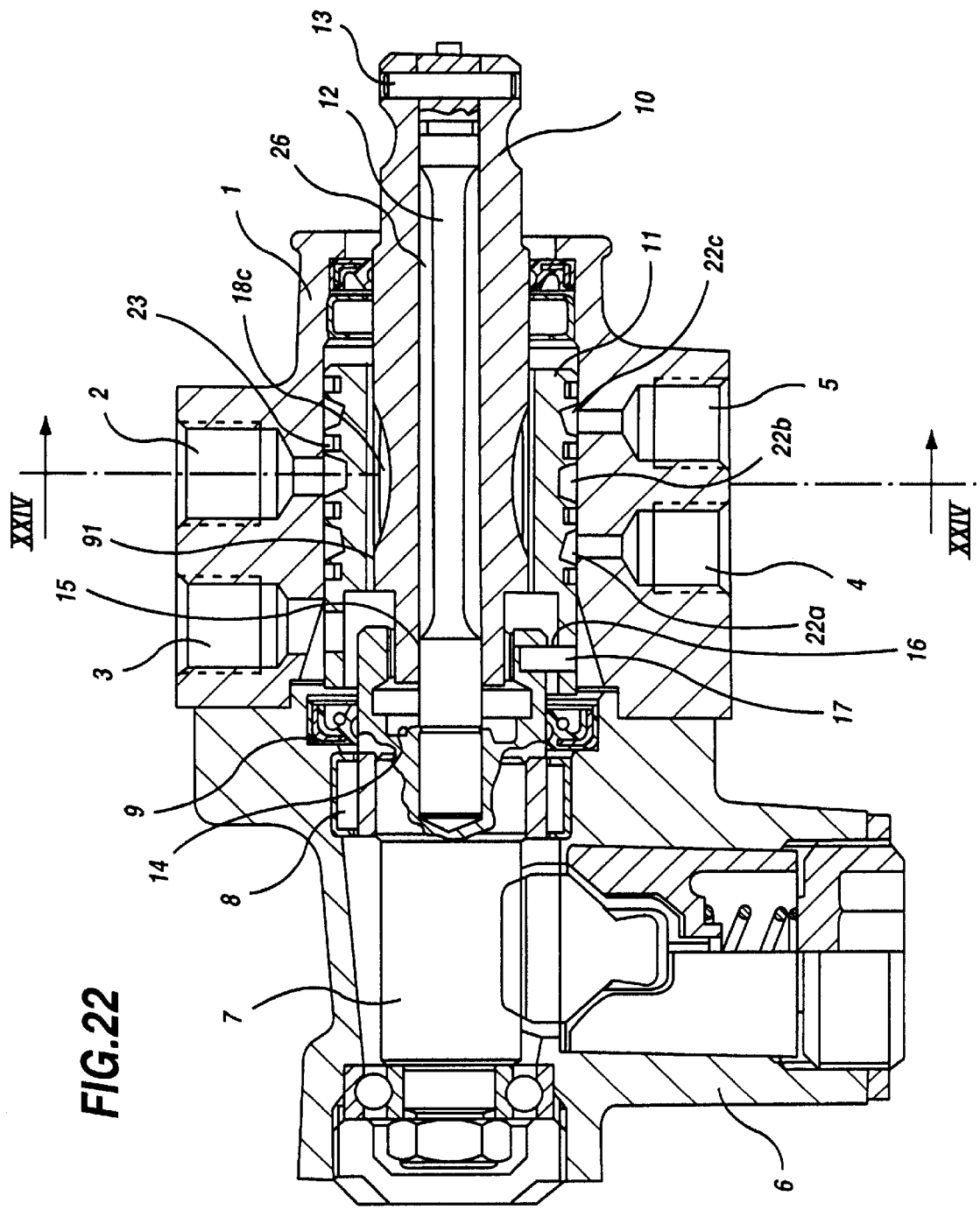
FIG. 22 is an axial cross-sectional view on plane XXII—XXII in FIG. 24 of a rotary valve installed in a valve housing of a power steering gear, according to a third embodiment of the first aspect of the present invention.
Figure 23:
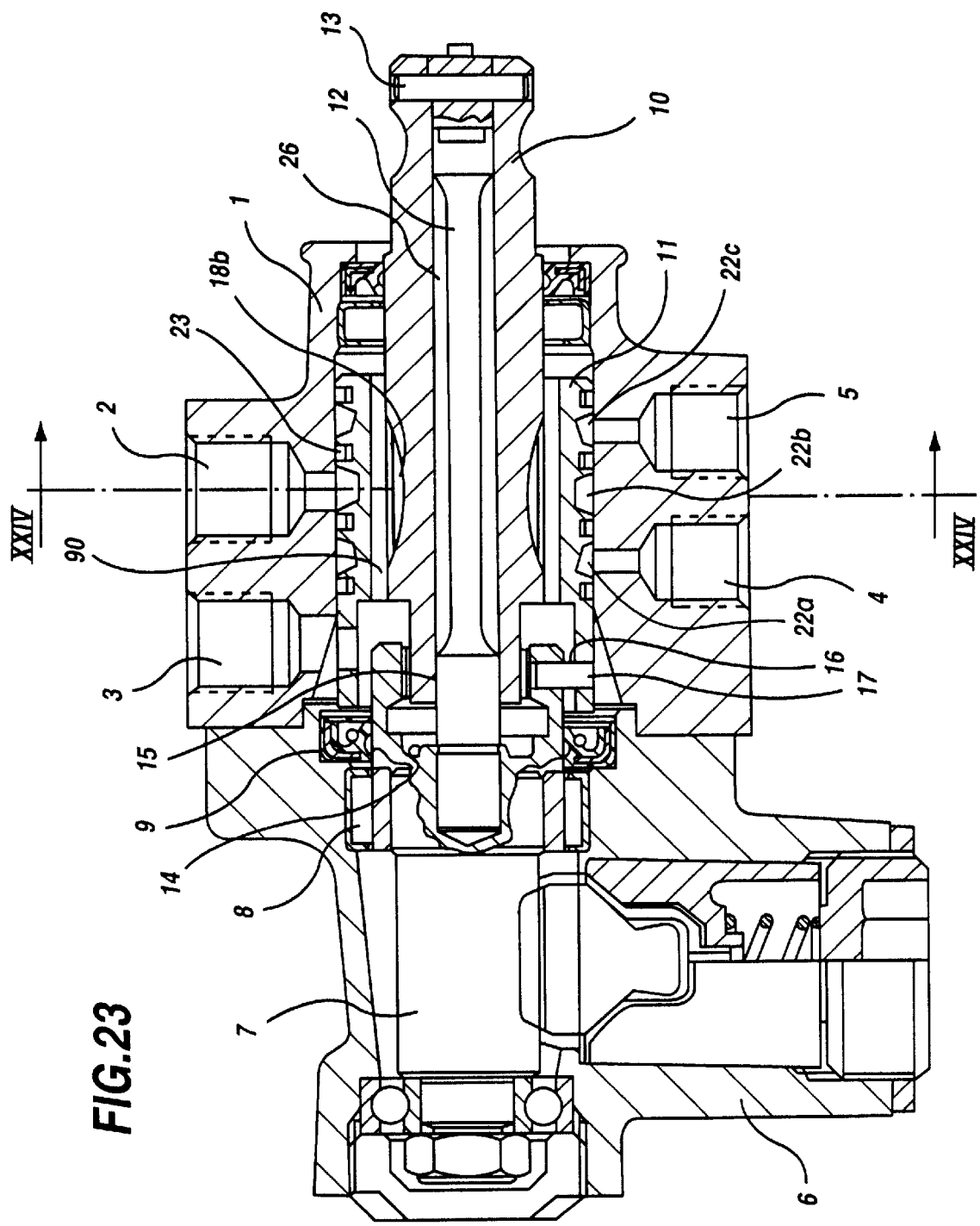
FIG. 23 is an axial cross-sectional view on plane XXIII—XXIII in FIG. 24 of a rotary valve installed in a valve housing of a power steering gear, according to a third embodiment of the first aspect of the present invention.
Figure 24:
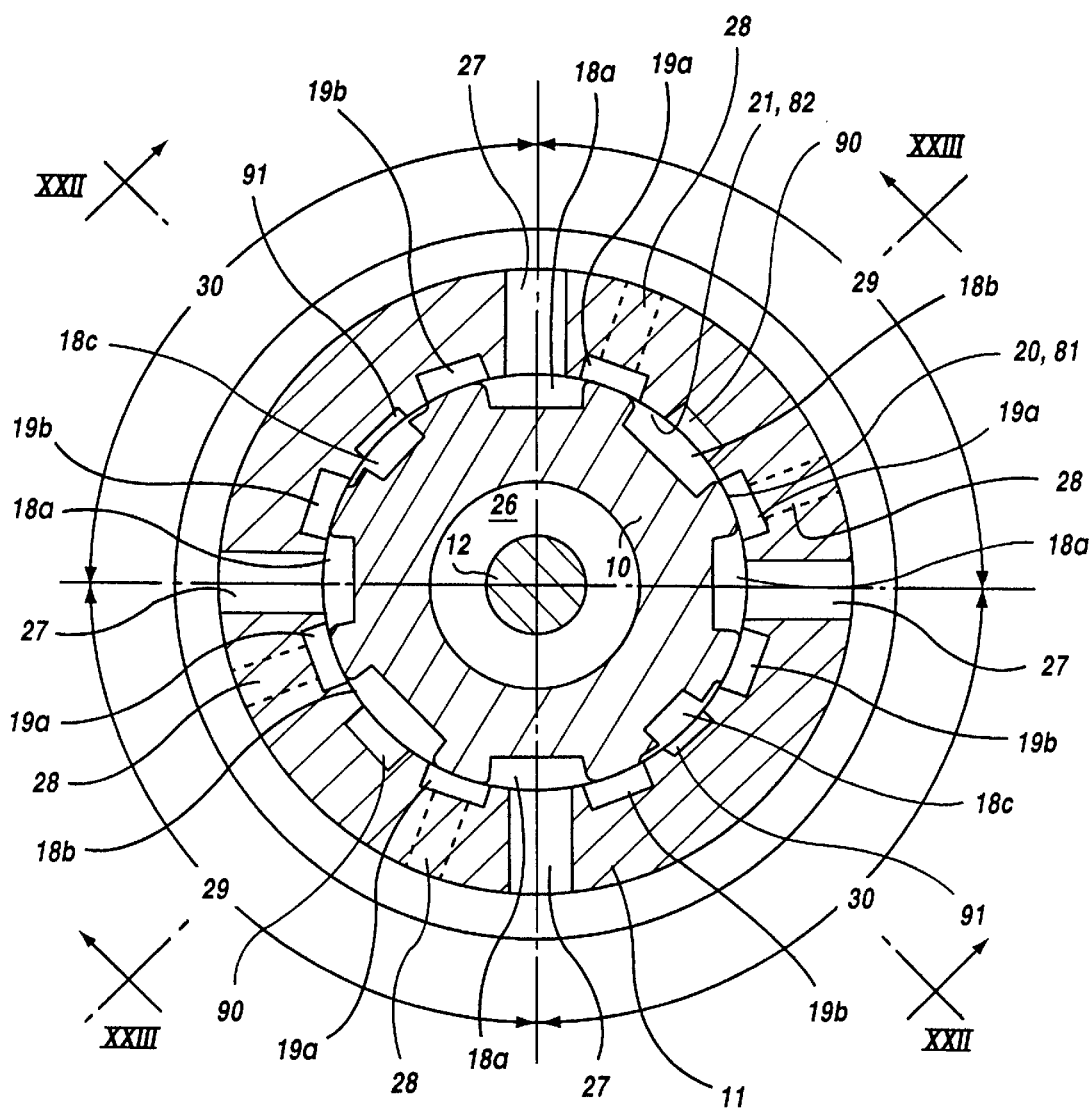
FIG. 24 is a cross-sectional view on plane XXIV–XXIV in FIGS. 22 and 23 of the input-shaft and surrounding sleeve components of the rotary valve, according to a third embodiment of the first aspect of the present invention.

FIGS. 22, 23 and 24 show a third embodiment of the first aspect of the present invention in which fixed orifices 46 are generated by a restriction to axial oil flow outside bore 26 of input-shaft 10, indeed the secondary return path does not pass through bore 26. Axially extending primary return channels 90 and secondary return channels 91 are preferably broached in sleeve bore 21 and are respectively circumferentially aligned with (and hence hydraulically communicate with) primary return grooves 18b and secondary return grooves 18c respectively, thereby communicating hydraulic fluid to return port 3 without the need for hydraulic communication to bore 26 of input-shaft 10. The radial depth of secondary return channels 91 is small compared to their width, hence creating a high aspect ratio restriction 46 in the secondary return path via its interaction with adjacent input-shaft outside diameter 20. The radial depth of primary return channels 90 is relatively large compared to the depth of secondary return channels 91, the former therefore generating minimum restriction in the primary return path.

In a fourth embodiment of the first aspect of the present invention (not shown as a separate figure), secondary return grooves 18c can be axially extended as shallow, high aspect ratio channels formed via their interaction with adjacent sleeve bore 21. Such channel-like extensions of secondary return grooves 18c can be readily achieved via milling or grinding operations well known in the art, and will appear similar to channel 75 shown in FIG. 17 in reference to another earlier embodiment except that the radial depth would need to be less in order to generate the necessary restriction 46 in the secondary return path. Primary return grooves 18b can be similarly axially extended as a radially deeper channel to facilitate a relatively unrestricted primary return path to return port 3.

Both third and fourth embodiments of the first aspect of the present invention offer the advantage that, if both primary and secondary return paths are facilitated with channels, no drill holes are required in the input-shaft. This feature potentially simplifies and reduces cost of manufacture of this component.

Figure 31:
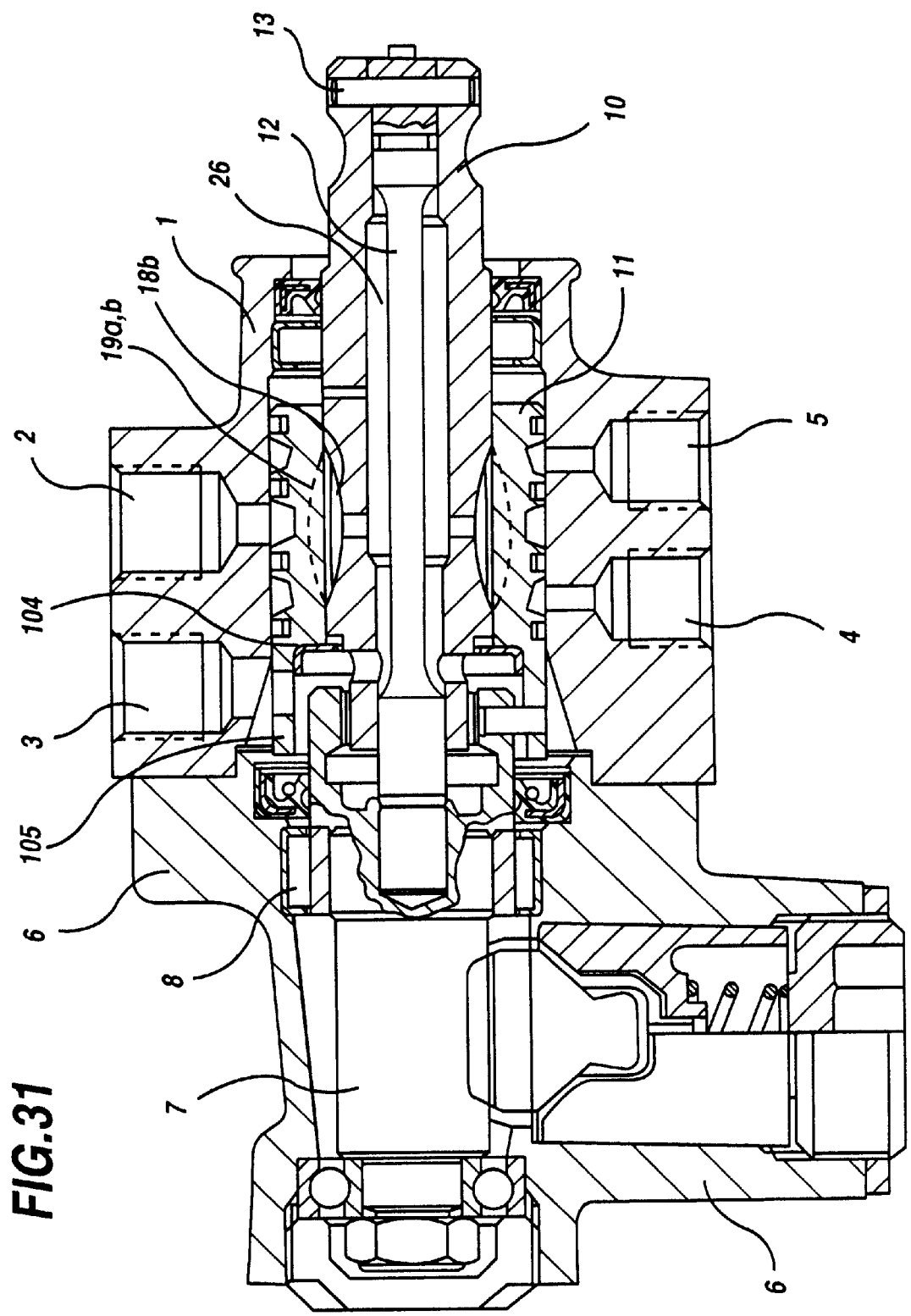
FIG. 31 is an axial cross-sectional view of a rotary valve installed in a valve housing of a power steering gear, according to a fifth embodiment of a first aspect of the present invention, showing the primary return path.
Figure 32:
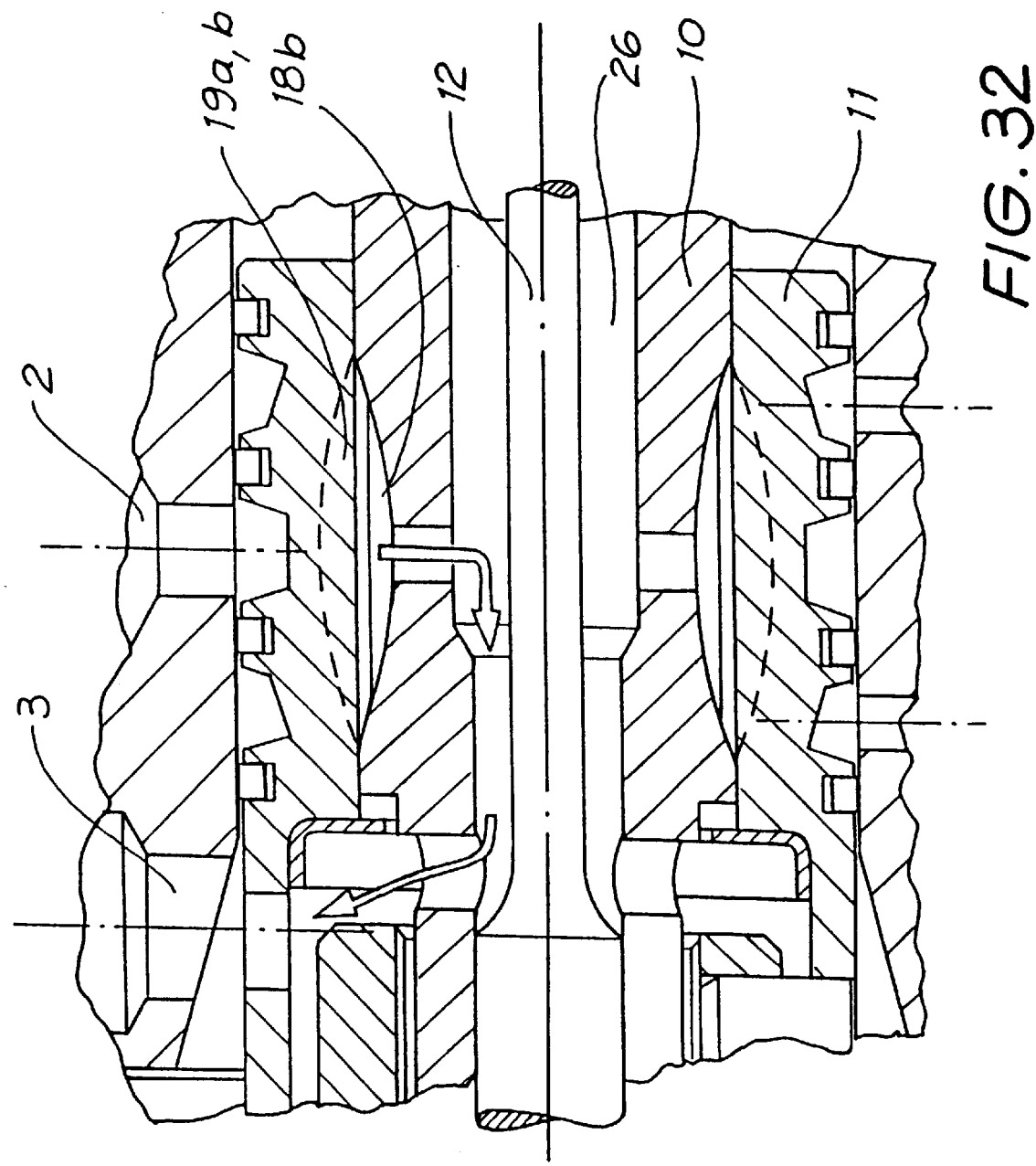
FIG. 32 is an enlarged scrap view of a portion of FIG. 31 showing details of the primary return path.
Figure 33:
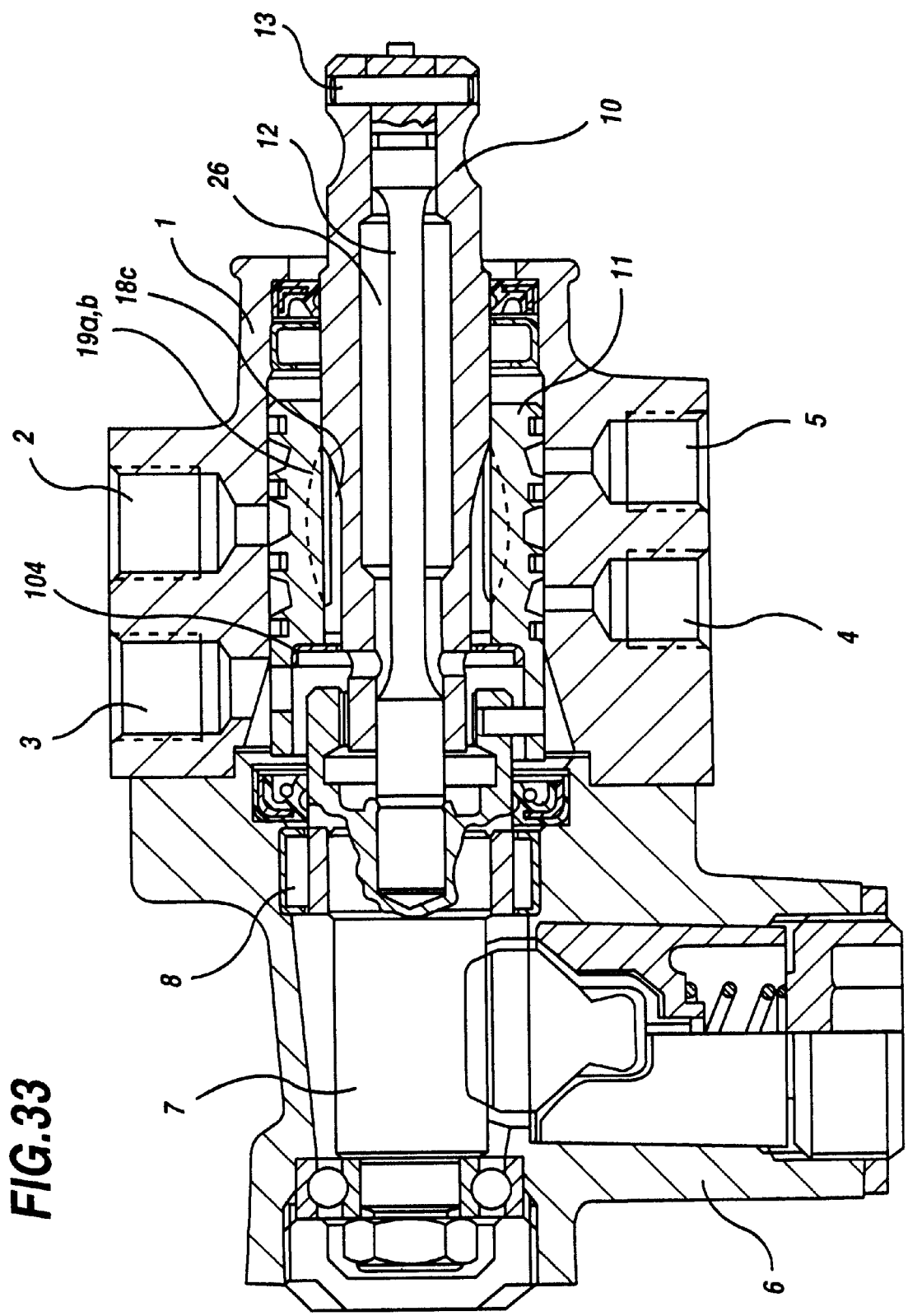
FIG. 33 is an axial cross-sectional view of a rotary valve installed in a valve housing of a power steering gear, according to a second embodiment of a second aspect of the present invention, showing the secondary return path.
Figure 34:
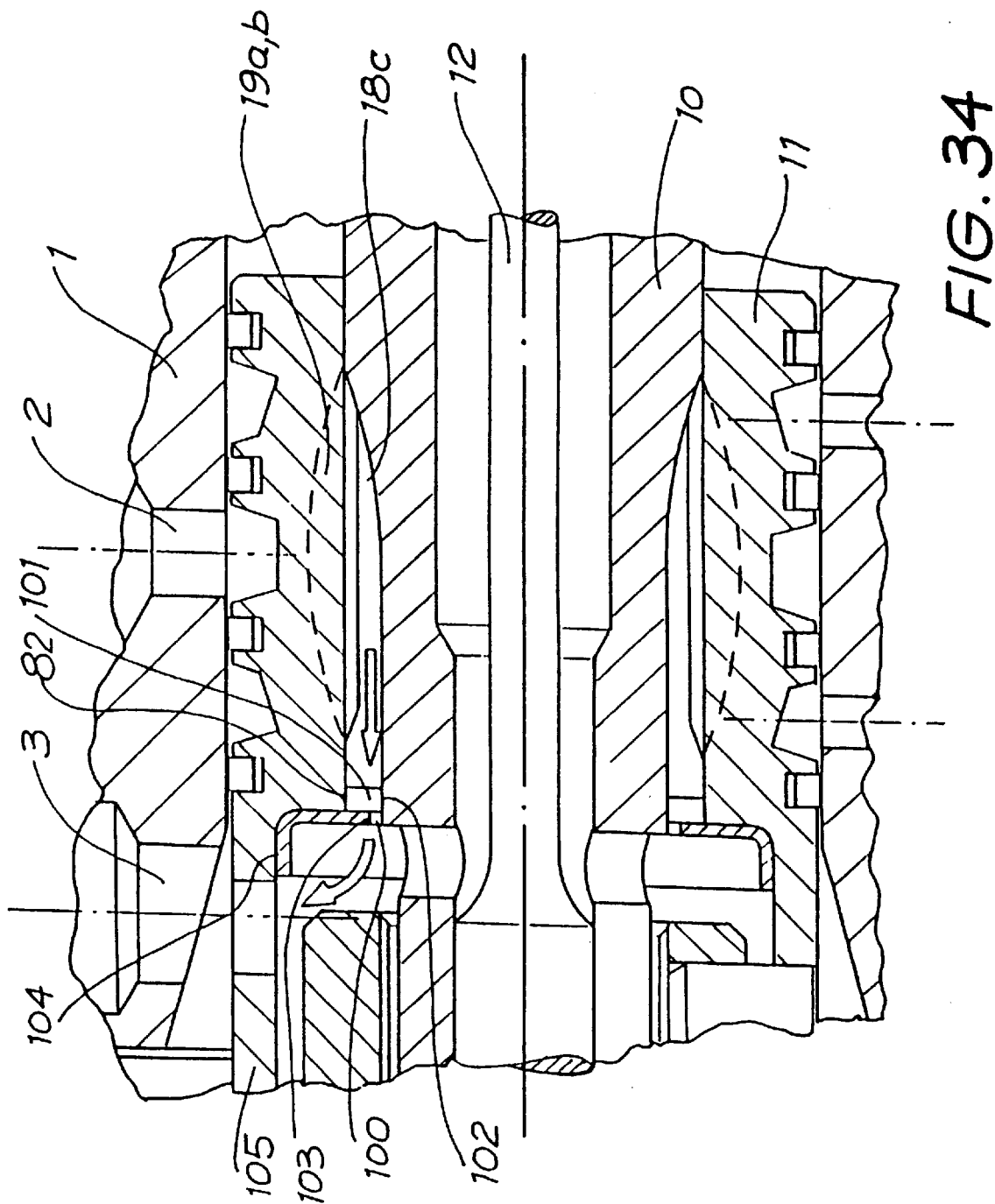
FIG. 34 is an enlarged scrap view of a portion of FIG. 33 showing details of the secondary return path.

FIGS. 29, 30, 31 and 32 show a fifth embodiment of the first aspect of the present invention in which previously referred to fixed orifices 46 are generated by annular restriction 100 formed at the interface of input-shaft 10 and sleeve 11. Secondary return grooves 18c are axially extended to communicate with annular cavity 101 formed by the interaction of reduced diameter portion 102 of the outer periphery of input-shaft 10 and bore 82 of sleeve 11. The annular cavity acts as a manifold to gather secondary return flow, which is then communicated via annular restriction 100 to return port 3. Annular restriction 100 is preferably generated by a predetermined small radial clearance existing between reduced diameter portion 102 of input-shaft 10 and the inside diameter 103 of radially inwardly extending annular pressed metal cup 104, press fitted inside sleeve skirt 105 to seal against the axial extremity of sleeve bore 82. As is seen in FIGS. 31 and 32, the primary return path passes through bore 26 of input-shaft 10 in a similar manner to that described in reference to the first embodiment, thereby not being subject to annular restriction 100.

Figure 37:
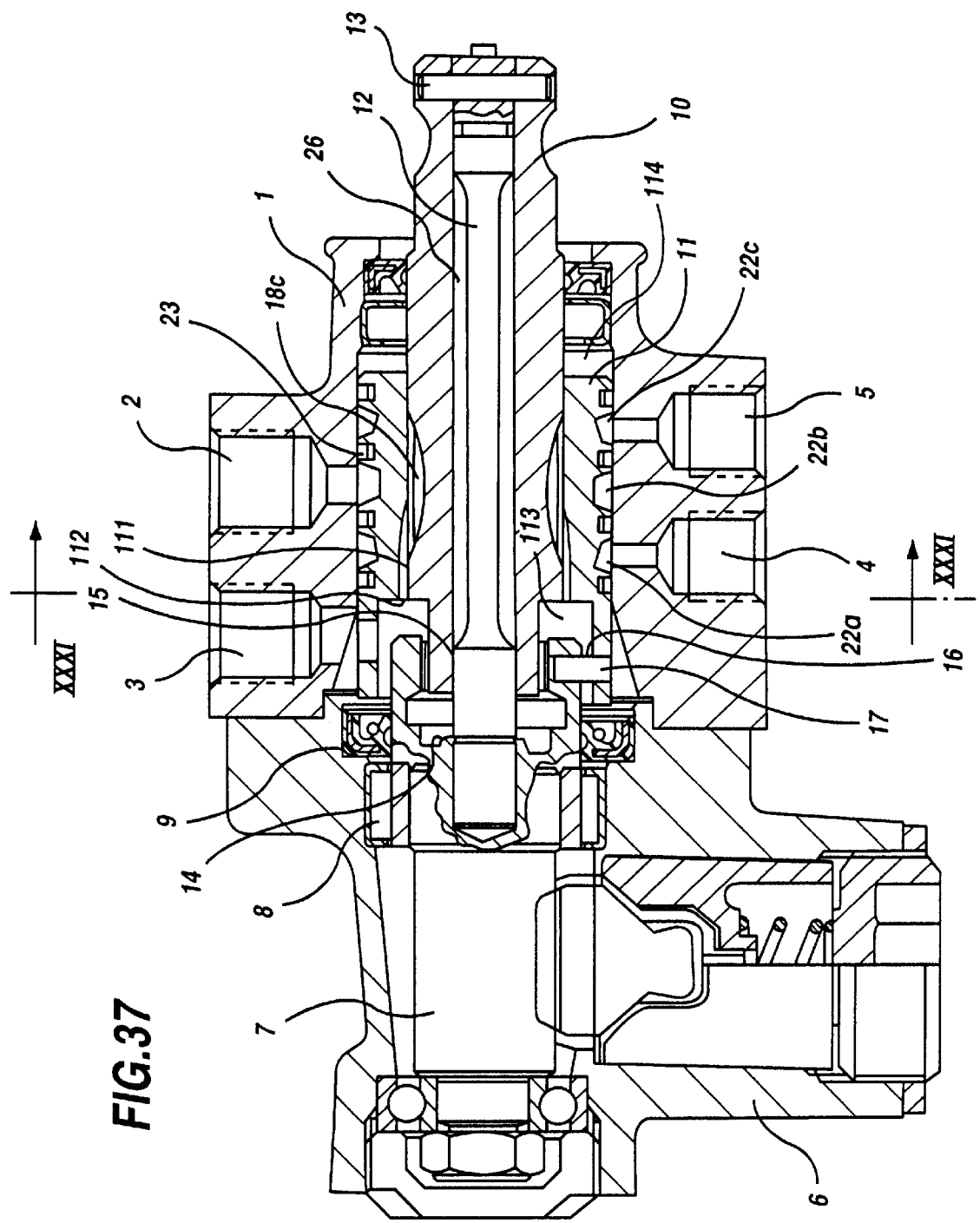
FIG. 37 is an axial cross-sectional view on plane XXIX—XXIX in FIG. 39 of a rotary valve installed in a valve housing of a power steering gear, according to a sixth embodiment of the first aspect of the present invention.
Figure 38:
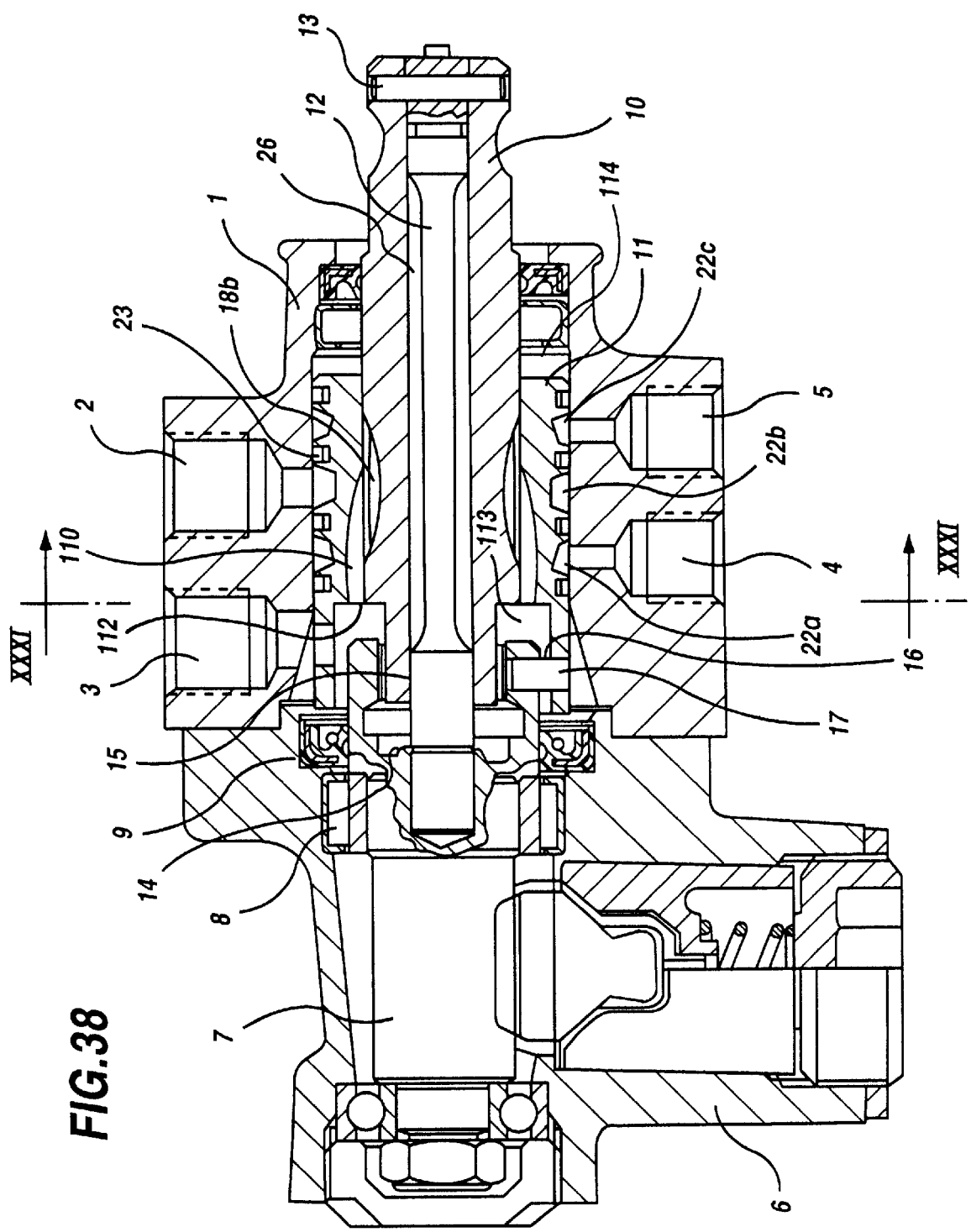
FIG. 38 is an axial cross-sectional view on plane XXX—XXX in FIG. 39 of a rotary valve installed in a valve housing of a power steering gear, according to a sixth embodiment of the first aspect of the present invention.
Figure 39:
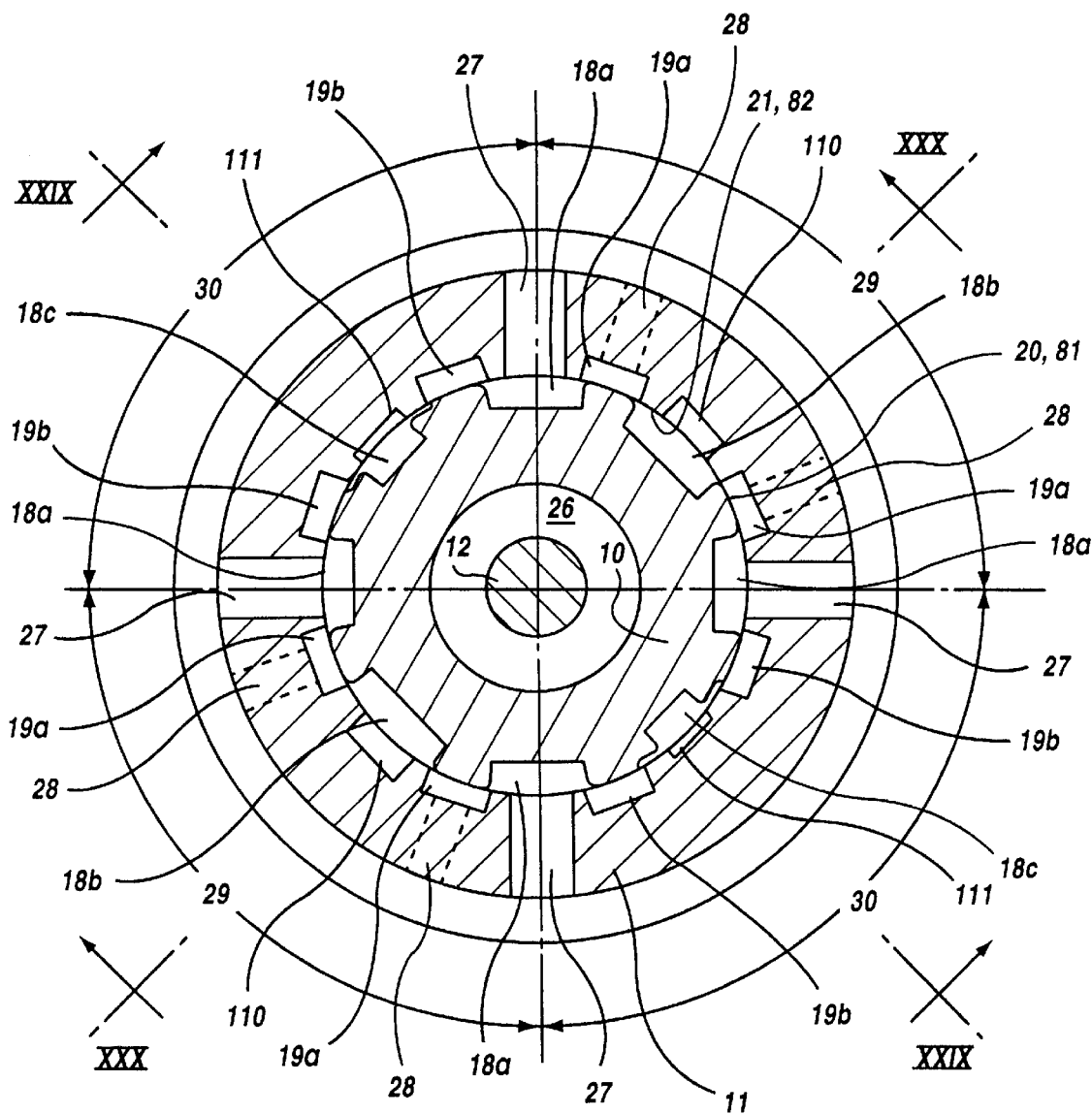
FIG. 39 is a cross-section view on plane XXXI—XXXI in FIGS. 37 and 38 of the input-shaft and surrounding sleeve components of the rotary valve, according to a sixth embodiment of th first aspect of the present invention.

FIGS. 37, 38 and 39 show a sixth embodiment of the first aspect of the present invention. This sixth embodiment is similar to the third embodiment except that primary return channels 110 and secondary return channels 111 are now arcuate in form, rather than longitudinally prismatic as in the case of primary return channels 90 and secondary return channels 91 employed in reference to the third embodiment. Rather than being manufactured by broaching for example, such arcuate channels can be readily formed by sleeve slotting methods well known in the art. Sleeve slotting methods are capable of producing arcuate channels (as shown), but also semi-arcuate or "flat-bottomed" channels (not shown). In this sixth embodiment, the primary and secondary return paths are still external to the input-shaft, again avoiding the need for drill holes in this component to facilitate oil return. However, as compared to channels 90 and 91 in the third embodiment, channels 110 and 111 only extend to one axial extremity 112 of sleeve bore 21, thence communicating oil, as before, to return port 3 via cavity 113. In the region of axial extremity 112, the radial depth of the two secondary return channels 111 is arranged to be substantially less than the radial depth of the two secondary return channels 111 is arranged to be substantially less than the radial depth of the two primary return channels 110, hence creating a high aspect ratio restriction 46 in the secondary return path via (as before) the interaction of the secondary return channel 111 with the adjacent input-shaft outside diameter 20. In other, not shown, embodiments, it is possible that at least one primary or secondary return channel also extends to the opposite extremity sleeve bore 21, providing for communication of leakage oil from cavity 114 via cavity 113 to return port 3.

Figure 25:
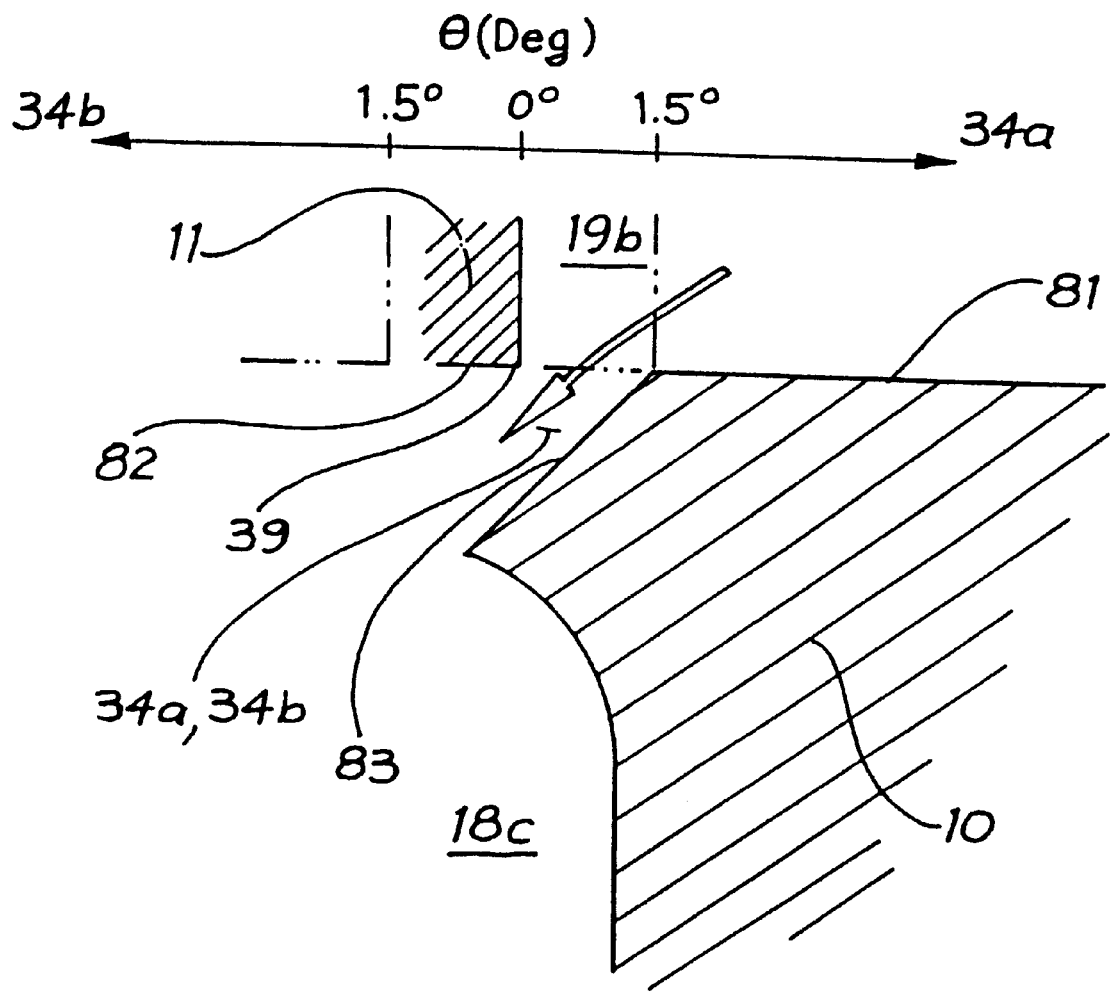
FIG. 25 shows details of the secondary return orifices according to first and second embodiments of the second aspect of the present invention.

According to the second aspect of the present invention, an annular restriction to secondary return oil flow replaces a major part of the function of secondary return orifices 34a,b disclosed in the first aspect of the present invention. The secondary return orifices in this embodiment need not provide the substantially constant restriction area (provided by throat 501 referred to in embodiments according to the first aspect of the present invention, this function now being entirely provided by the annular restriction. According to both embodiments of the second aspect of the present invention, secondary return orifices 34a,b are 1.5 deg close-off orifices whose function is controlled by much simpler metering edge 83 (refer to FIG. 25). Primary inlet orifices 31a,b, primary return orifices 32a,b and secondary inlet orifices 33a,b remain unchanged from the first aspect of the present invention (refer back to FIGS. 5, 6 and 7). Primary return orifices 32a,b and secondary return orifices 34a,b are therefore identical in geometry in these embodiments of the second aspect of the present invention, quite distinct from embodiments described in reference to the first aspect of the present invention.

Figure 26:
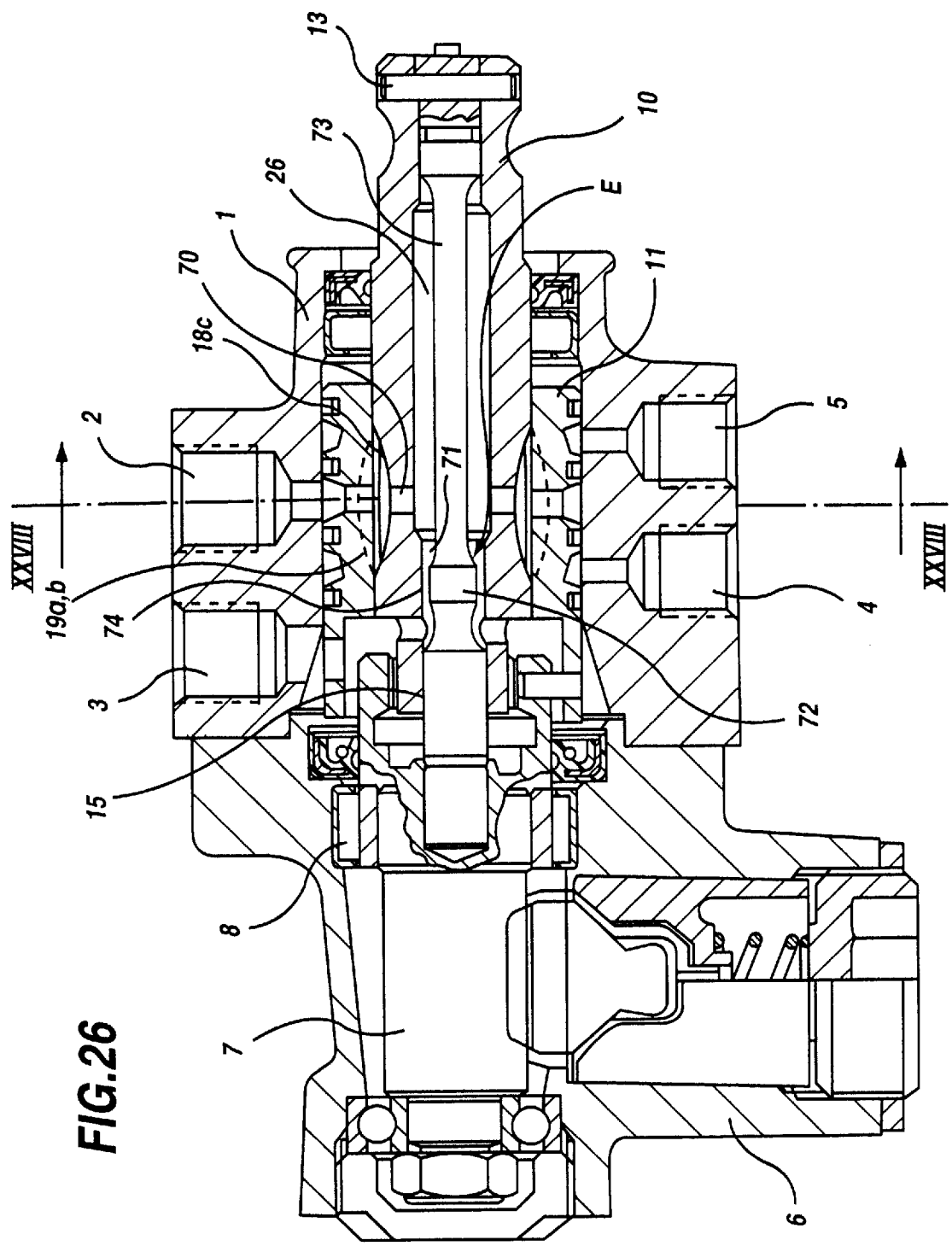
FIG. 26 is an axial cross-sectional view on plane XXVI—XXVI in FIG. 28 of a rotary valve installed in a valve housing of a power steering gear, according to a first embodiment of the second aspect of the present invention.
Figure 27:
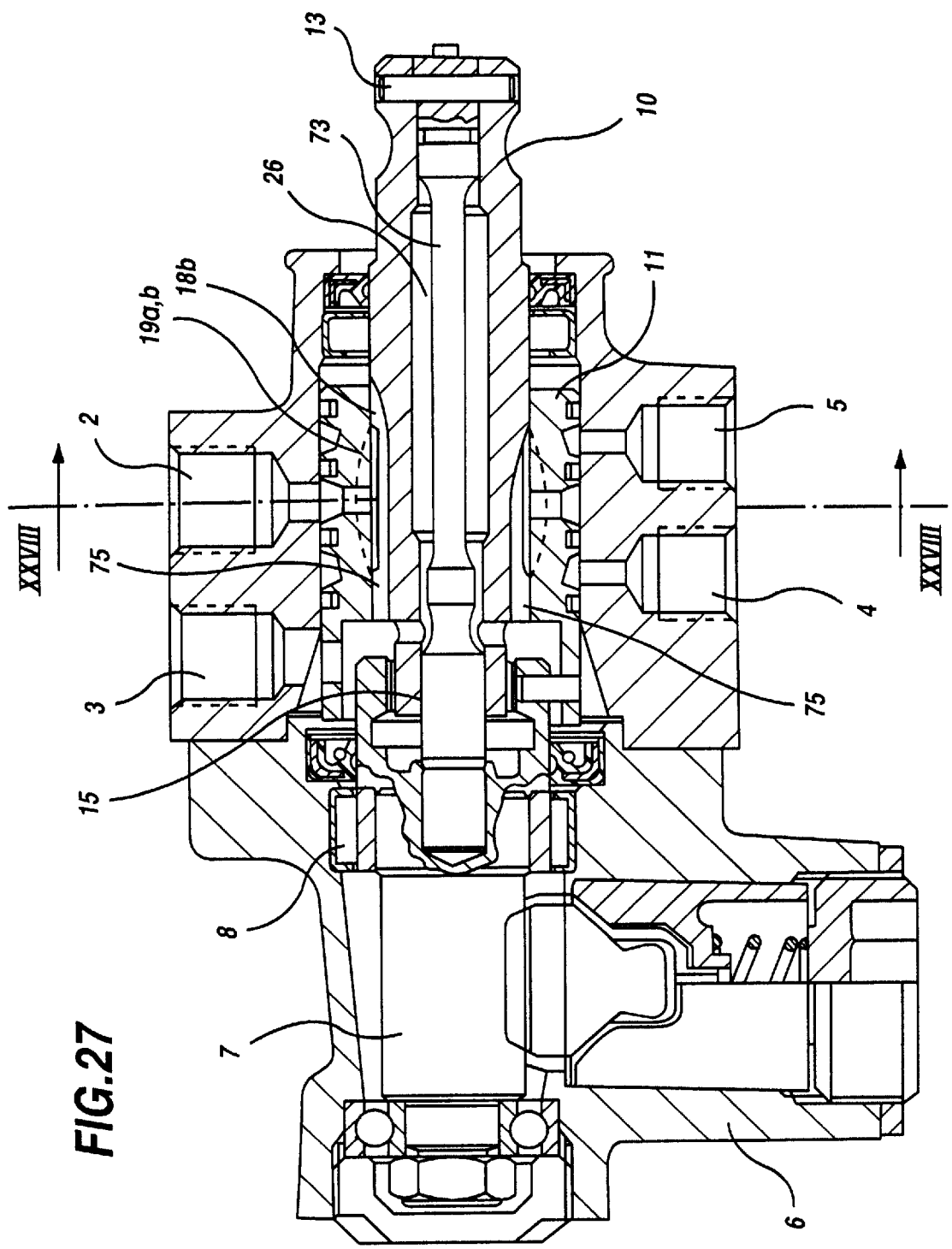
FIG. 27 is an axial cross-sectional view on plane XXVII—XXVII in FIG. 28 of a rotary valve installed in a valve housing of a power steering gear, according to a first embodiment of the second aspect of the present invention.
Figure 28:
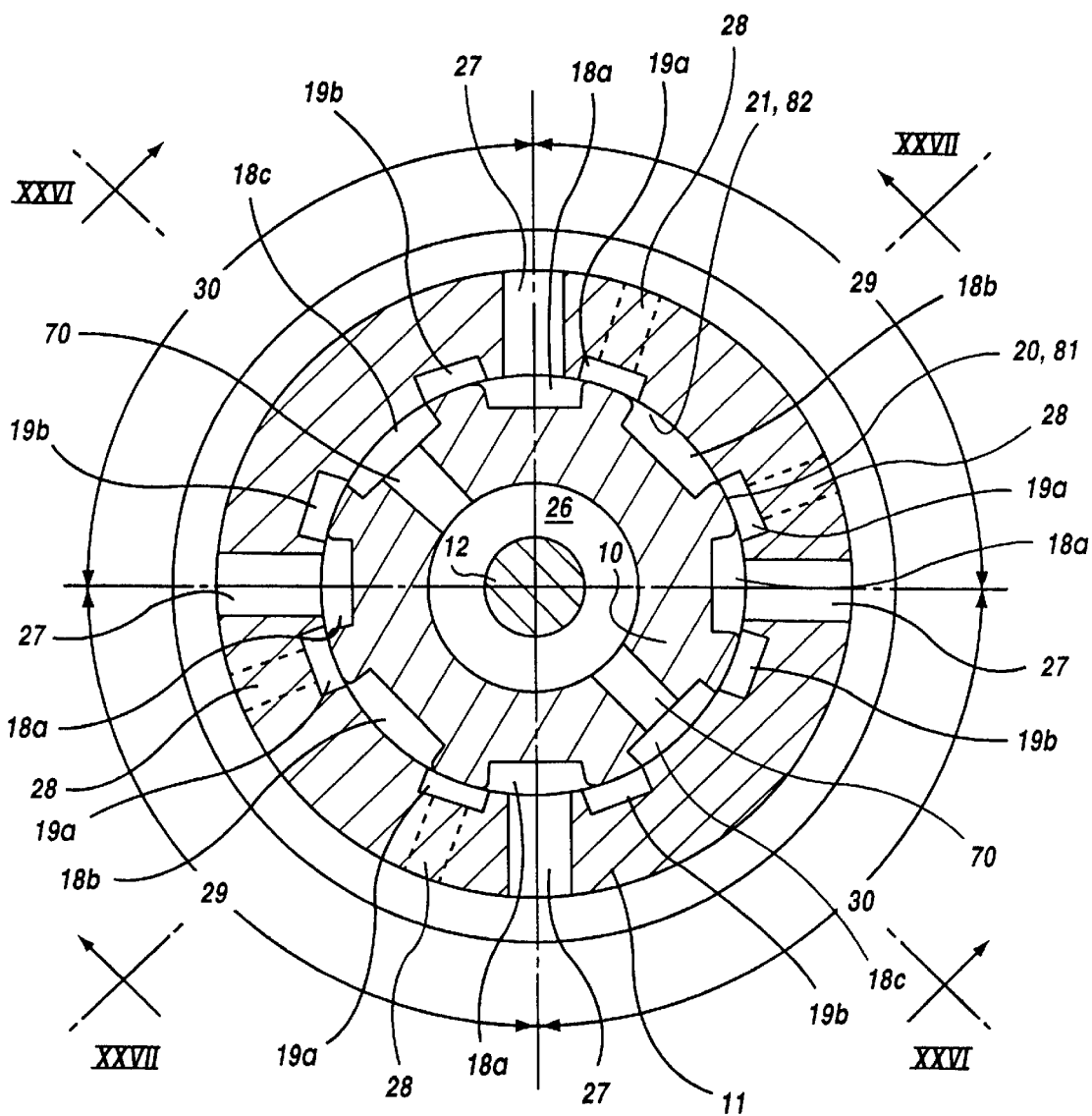
FIG. 28 is a cross-sectional view on plane XXVIII—XXVIII in FIGS. 26 and 27 of the input-shaft and surrounding sleeve components of the rotary valve, according to a first embodiment of the second aspect of the present invention.
Figure 29:
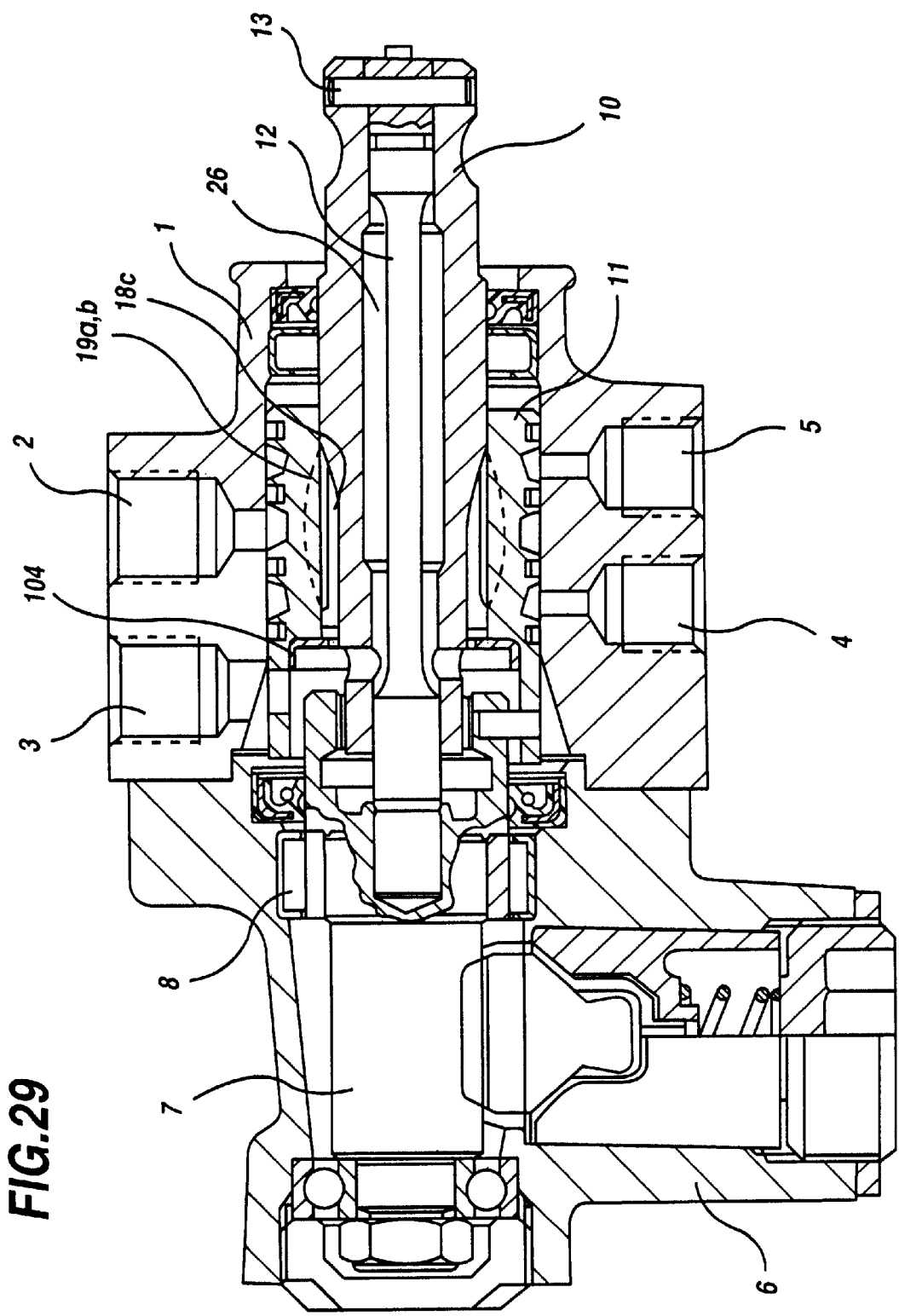
FIG. 29 is an axial cross-sectional view of a rotary valve installed in a valve housing of a power steering gear, according to a fifth embodiment of a first aspect of the present invention, showing the secondary return path.
Figure 30:
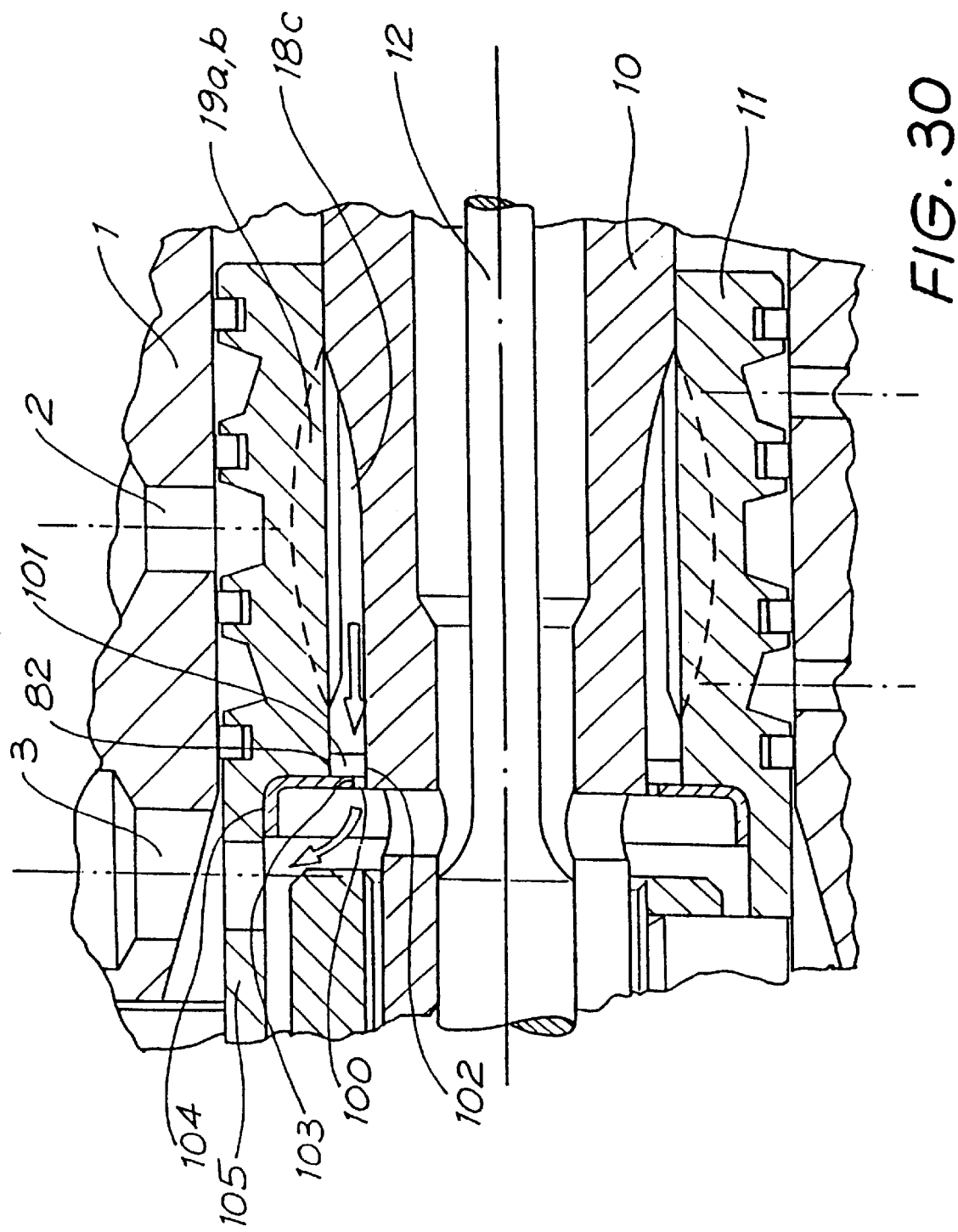
FIG. 30 is an enlarged scrap view of a portion of FIG. 29 showing details of the secondary return path.

FIGS. 26, 27 and 28 show more general views of the first embodiment of the second aspect of the present invention. It is seen that, as in the case of the second embodiment of the first aspect of the present invention, back pressure in the secondary return path is generated by annular restriction 71 formed by diametrically enlarged portion 72 of torsion bar 73 and its coaction with accurately diametrically sized region 74 of input-shaft bore 26. FIGS. 26 and 27 are in fact identical to FIGS. 16 and 17 respectively. FIG. 28 is similar to FIG. 18, except for the differing geometry of secondary return orifices 34a,b. All other aspects of this embodiment of the second aspect of the present invention can be considered as being according to FIGS. 19 and 20, already described in reference to the second embodiment of the first aspect of the present invention.

Figure 35:
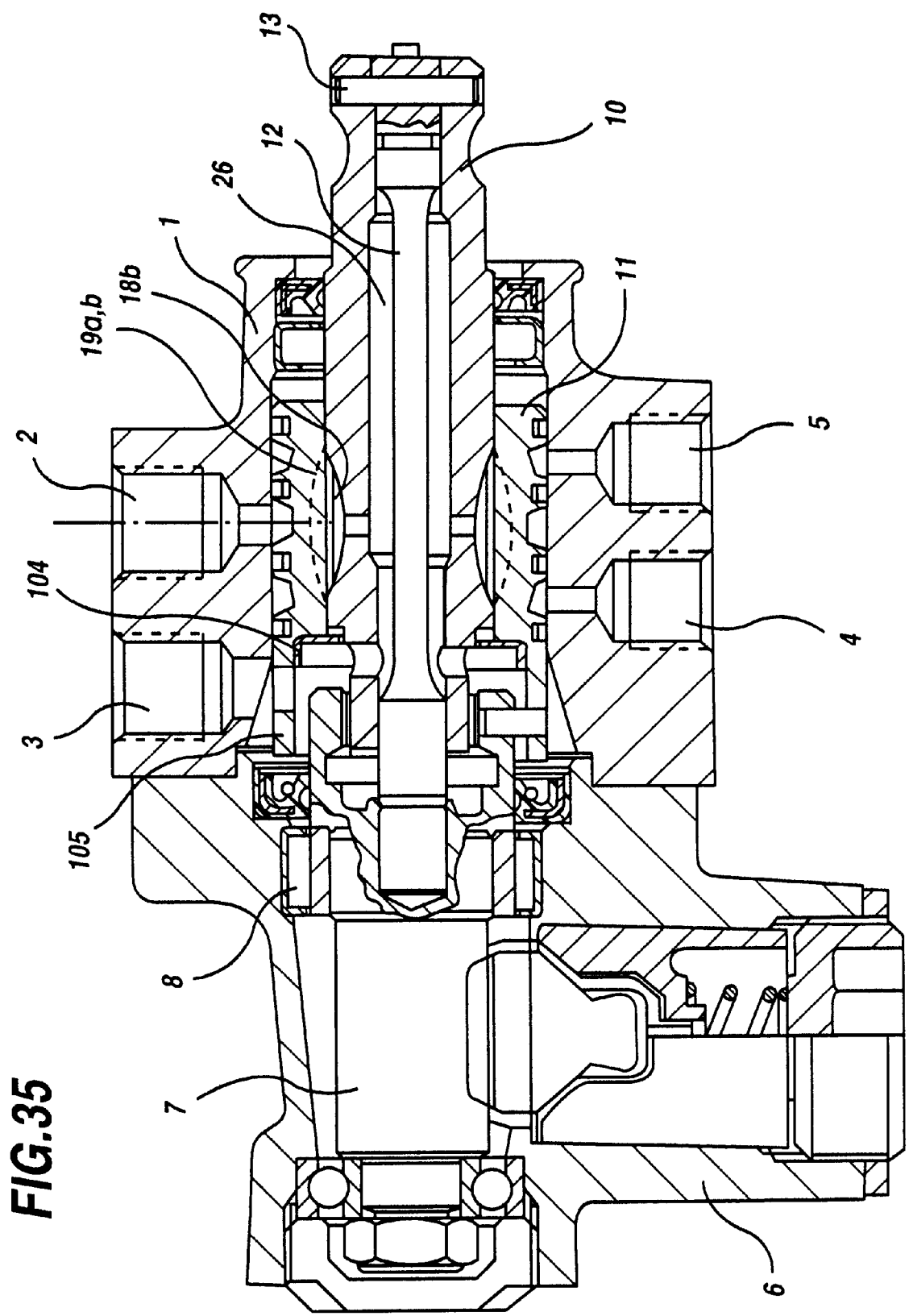
FIG. 35 is an axial cross-sectional view of a rotary valve installed in a valve housing of a power steering gear, according to a second embodiment of a second aspect of the present invention, showing the primary return path.
Figure 36:
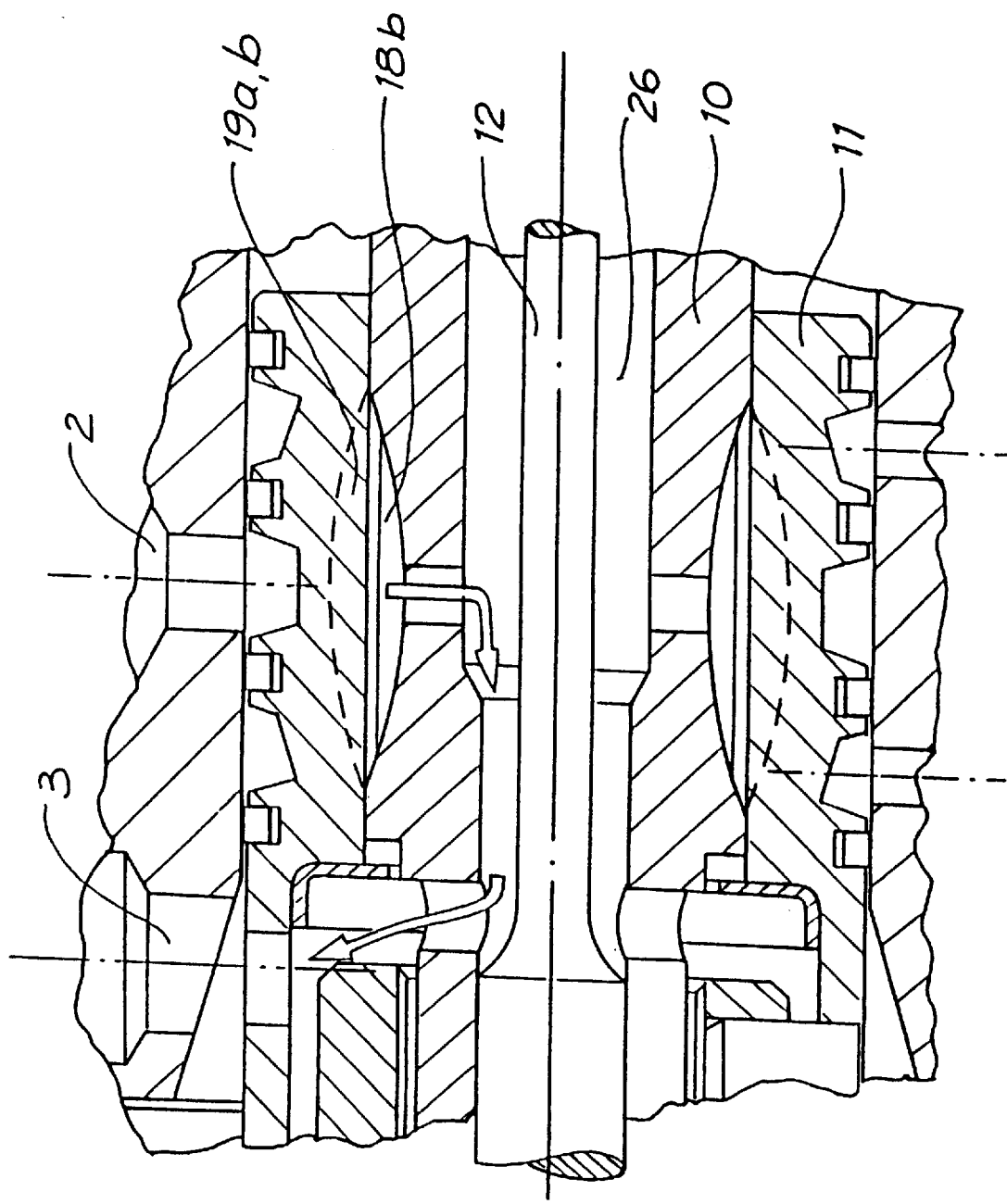
FIG. 36 is an enlarged scrap view of a portion of FIG. 35 showing details of the primary return path.

FIGS. 33, 34, 35 and 36 show a second embodiment of the second aspect of the present invention in which baclk pressure in the secondary return path is generated by annular restriction 100 formed at the interface of input-shaft 10 and sleeve 11. Secondary return grooves 18c are axially extended to communicate with annular cavity 101 formed by the interaction of reduced diameter portion 102 of the outer periphery of input-shaft 10 and bore 82 of sleeve 11. The annular cavity acts as a manifold to gather secondary return flow, which is then communicated via annular restriction 100 to return port 3. Annular restriction 100 is preferably generated by a predetermined small radial clearance existing between reduced diameter portion 102 of input-shaft 10 and the inside diameter 103 of radially inwardly extending annular pressed metal cup 104, press fitted inside sleeve skirt 105 to seal against the axial extremity of sleeve bore 82. As seen in FIGS. 35 and 36, the primary return path passes through bore 26 of input-shaft 10 in a similar manner to that described in reference to the first embodiment of the first aspect of the present invention, thereby not being subject To annular restriction 100.

According to these first and second embodiments, in the absence of any substantial back pressure generation by secondary return orifices 34a,b when secondary inlet orifices 33a,b are closing, all back pressure to suppress cavitation noises in these latter orifices must necessarily be provided by annular restrictions 71 and 100 respectively. These annular restrictions must therefore now supply a back pressure up to 1.2 MPa or more, as opposed to the 200 kPa (say) required to be supplied by orifice 46 according to the respective second and fifth embodiments of the first aspect of the present invention.

In these circumstances noise generation in annular restrictions 71 and 100 is minimised by their high aspect ratio, such terminology in the present specification meaning the ratio of the general proportions of the cross-section of the restriction, this ratio always expressed numerically as unity or greater. In the case of the first embodiment, this aspect ratio is more specifically the circumferential length of annular restriction 71 (ie. approximately πD where D is the diameter of diametrically enlarged portion 72) divided by the radial depth of the restriction (ie. the radial clearance between the outside diameter of diametrically enlarged portion 72 and accurately diametrically sized region 74). In the case of the second embodiment, this aspect ratio is the circumferential length of annular restriction 100 (ie. approximately πD where D is the diameter of reduced diameter portion 102) divided by the radial depth of the restriction (ie. the radial clearance between reduced diameter portion 102 and inside diameter 103). In order that restrictions 71 and 100 in these embodiments do not generate cavitation noise, an aspect ratio of greater than 50 has been found to be required. However, for certain applications where lesser levels of back pressure may be required to be developed by these annular restrictions, aspect ratios as low as 10 may be still practical.

The staging of restriction 71 shown in FIG. 19b will provide a particular benefit in the first embodiment because it serves to dramatically reduce the viscosity sensitivity of this restriction, which is now of relatively small cross-sectional area in order to generate the larger amount of back pressure. The staging of annular restriction 71 also assists in minimising noise generation in this orifice.

It will be recognised by persons skilled in the art that numerous variations and modifications may be made to the invention without departing from the spirit or scope of the invention.

I claim:

1. A sleeve for a rotary valve of a hydraulic power steering gear, the rotary valve comprising a valve housing having an inlet port to receive hydraulic fluid from a pump, a return port to return hydraulic fluid to the pump, and cylinder ports to communicate hydraulic fluid to left and right hand cylinder chambers of the power steering gear, an input-shaft journalled within said sleeve, an array of eight axially extending blind-ended slots formed in the bore of said sleeve, and array of two primary and two secondary axially extending return channels also formed in the bore of said sleeve and interposed between respective adjacent slots, said primary return channels being substantially diametrically opposed within said bore, said secondary return channels also being substantially diametrically opposed within said bore and being angularly spaced from said primary channels by substantially 90 degrees, said channels extending to at least one axial extremity of said bore and arranged to axially communicate hydraulic fluid to the return port externally with respect to said input-shaft, wherein the radial depth of said secondary return channels is substantially less than the radial depth of said primary return channels at said axial extremity.

2. A sleeve for a rotary valve of a power steering gear as claimed in claim 1, wherein said radial depth of each of said secondary return channels is small compared to their width.

3. A sleeve for a rotary valve of a hydraulic power steering gear as claimed in claim 1, wherein said input-shaft of the valve has in its outer periphery eight axially extending grooves separated by lands, said eight sleeve slots circumferentially aligned with the lands on the input-shaft, the interfaces between the co-acting input-shaft grooves and sleeve slots defining axially extending orifices controlling fluid flow within the valve, the orifices opening and closing when relative rotation occurs between the input-shaft and sleeve from a neutral position, the orifices being ported as a network such that they form two primary and two secondary hydraulic Wheatstone bridges arranged in parallel, each said bridge comprising two limbs hydraulically communicating the inlet and return ports, each said limb containing an inlet orifice hydraulically communicating to the inlet port and a return orifice hydraulically communicating to the return port, the magnitude of the hydraulic flow through each bridge varying in accordance with the restriction offered by the respective inlet and return orifices in that bridge, the limbs of the primary bridge incorporating means providing hydraulic communication to one of the cylinder ports at a point of interconnection of the respective inlet and return orifices in that limb, the limbs of the secondary bridge not incorporating means providing hydraulic communication to the cylinder ports, and wherein hydraulic flow from the primary bridge is hydraulically communicated to the return port by a primary return path formed by the interaction of each of said primary return channels of said sleeve with the adjacent outside surface of said input-shaft, and the hydraulic flow from the secondary bridge is hydraulically communicated to the return port via a secondary return path formed by the interaction of each of the secondary return channels of said sleeve with said adjacent outside surface of said input-shaft.

4. A sleeve for a rotary valve of a power steering gear as claimed in claim 1, wherein said secondary return channels are arcuate.

5. A sleeve for a rotary valve of a power steering gear as claimed in claim 1, wherein said primary return channels are arcuate.

6. A sleeve for a rotary valve of a hydraulic power steering gear, the rotary valve comprising a valve housing having an inlet port to receive hydraulic fluid from a pump, a return port to return hydraulic fluid to the pump, and cylinder ports to communicate hydraulic fluid to left and right hand cylinder chambers of the power steering gear, an input-shaft journalled within said sleeve, an array of eight axially extending blind-ended slots formed in the bore of said sleeve, an array of two primary and two secondary axially extending return channels also formed in the bore of said sleeve and interposed between respective adjacent slots, said primary return channels being substantially diametrically opposed within said bore, said secondary return channels also being substantially diametrically opposed within said bore and being angularly spaced from said primary channels by substantially 90 degrees, said channels extending to at least one axial extremity of said bore and arranged to axially communicate hydraulic fluid to the return port externally with respect to said input-shaft, wherein the radial depth of said secondary return channels is substantially less than the radial depth of said primary return channels near said axial extremity.

7. A sleeve for a rotary valve of a power steering gear as claimed in claim 6, wherein said radial depth of each of said secondary return channels is small compared to their width.

8. A sleeve for a rotary valve of a hydraulic power steering gear as claimed in claim 6, wherein said input-shaft of the valve has in its outer periphery eight axially extending grooves separated by lands, said eight sleeve slots circumferentially aligned with the lands on the input-shaft, the interfaces between the co-acting input-shaft grooves and sleeve slots defining axially extending orifices controlling fluid flow within the valve, the orifices opening and closing when relative rotation occurs between the input-shaft and sleeve from a neutral position, the orifices being ported as a network such that they form two primary and two secondary hydraulic Wheatstone bridges arranged in parallel, each said bridge comprising two limbs hydraulically communicating the inlet and return ports, each said limb containing an inlet orifice hydraulically communicating to the inlet port and a return orifice hydraulically communicating to the return port, the magnitude of the hydraulic flow through each bridge varying in accordance with the restriction offered by the respective inlet and return orifices in that bridge, the limbs of the primary bridge incorporating means providing hydraulic communication to one of the cylinder ports at a point of interconnection of the respective inlet and return orifices in that limb, the limbs of the secondary bridge not incorporating means providing hydraulic communication to the cylinder ports, and wherein hydraulic flow from the primary bridge is hydraulically communicated to the return port by a primary return path formed by the interaction of each of said primary return channels of said sleeve with the adjacent outside surface of said input-shaft, and the hydraulic flow from the secondary bridge is hydraulically communicated to the return port via a secondary return path formed by the interaction of each of the secondary return channels of said sleeve with said adjacent outside surface of said input-shaft.

9. A sleeve for a rotary valve of a power steering gear as claimed in claim 6, wherein said secondary return channels are arcuate.

10. A sleeve for a rotary valve of a power steering gear as claimed in claim 6, wherein said primary return channels are arcuate.

\* \* \* \* \*